United States Patent
Koinuma

(10) Patent No.: US 8,166,273 B2
(45) Date of Patent: Apr. 24, 2012

(54) DEGENERATION METHOD AND INFORMATION PROCESSING APPARATUS

(75) Inventor: Hideyuki Koinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 12/505,601

(22) Filed: Jul. 20, 2009

(65) Prior Publication Data

US 2009/0292897 A1 Nov. 26, 2009

Related U.S. Application Data

(63) Continuation of application No. PCT/JP2007/052356, filed on Feb. 9, 2007.

(51) Int. Cl.
*G06F 12/16* (2006.01)
(52) U.S. Cl. ........ 711/173; 711/162; 711/170; 711/171; 714/6.1; 714/6.23
(58) Field of Classification Search .............. 711/162, 711/170, 171, 173; 714/6.1, 6.23
See application file for complete search history.

(56) References Cited

U.S. PATENT DOCUMENTS

| | | | | |
|---|---|---|---|---|
| 3,896,418 A | * | 7/1975 | Brown | 711/150 |
| 5,805,790 A | | 9/1998 | Nota et al. | |
| RE36,462 E | * | 12/1999 | Chang et al. | 711/209 |
| 6,438,714 B1 | * | 8/2002 | Canestaro et al. | 714/42 |
| 6,701,334 B1 | * | 3/2004 | Ye et al. | 1/1 |
| 6,851,074 B2 | * | 2/2005 | Miloiicic et al. | 714/20 |
| 2002/0152349 A1 | * | 10/2002 | Kageyama et al. | 711/1 |
| 2002/0178338 A1 | * | 11/2002 | Shibuya et al. | 711/173 |
| 2007/0124552 A1 | * | 5/2007 | Chen | 711/162 |

FOREIGN PATENT DOCUMENTS

| | | |
|---|---|---|
| JP | 3-25534 | 2/1991 |
| JP | 8-263454 | 10/1996 |
| JP | 11-65869 | 3/1999 |
| JP | 2002-77970 | 3/2002 |

OTHER PUBLICATIONS

International Search Report mailed May 1, 2007 for corresponding International Application No. PCT/JP2007/052356.

* cited by examiner

*Primary Examiner* — Jae Yu
(74) *Attorney, Agent, or Firm* — Staas & Halsey LLP

(57) ABSTRACT

By including detecting an abnormality in a first system common unit; reading a priority indication, from the storage portion, indicating whether or not the first system common unit is to be degenerated when an abnormality occurs in the first system common unit for each of the partitioned portions; carrying out, when an abnormality is detected in a partitioned portion to which the priority indication is set, suspend processing on the information processing apparatus by the system control portion on the partitioned portion; and carrying out degeneration processing for suspending operation of the first system common unit and switching to the second system common unit, quick recovery is achieved when a significant partition is down due to a fault experienced in a common unit.

12 Claims, 50 Drawing Sheets

FIG. 2

| CPU No. | Domain ID |
|---|---|
| CPU#0 | DID#2 |
| CPU#1 | DID#1 |
| CPU#2 | DID#2 |
| CPU#3 | Not-assigned |
| CPU#4 | DID#5 |

Table T1

FIG. 3

| DIMM No. | Domain ID |
|---|---|
| DIMM#00 | DID#4 |
| DIMM#01 | Not-assigned |
| DIMM#02 | DID#2 |
| DIMM#03 | DID#2 |

Table T2

FIG. 4

| PCI Slot No. | Domain ID |
|---|---|
| PCI#0 | DID#1 |
| PCI#1 | DID#1 |
| PCI#2 | DID#2 |
| PCI#3 | Not-assigned |

Table T3

FIG. 5

| Domain ID | Significance Flag |
|---|---|
| DID#0 | – |
| DID#1 | – |
| DID#2 | Y |
| | |

Table T4

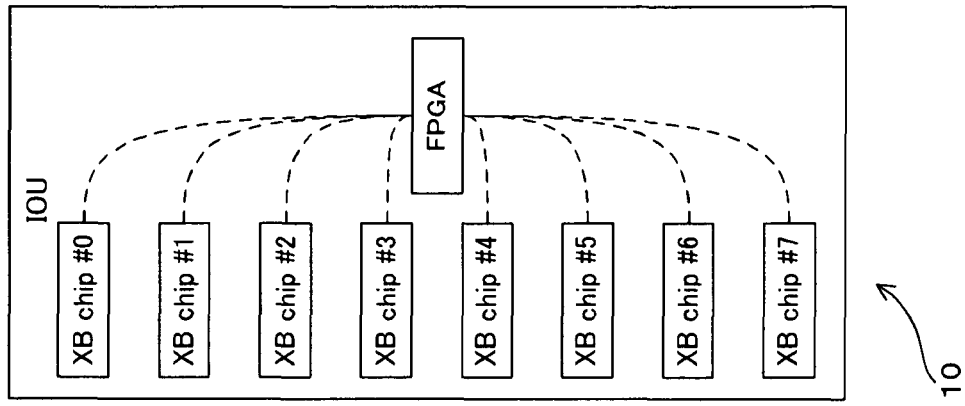
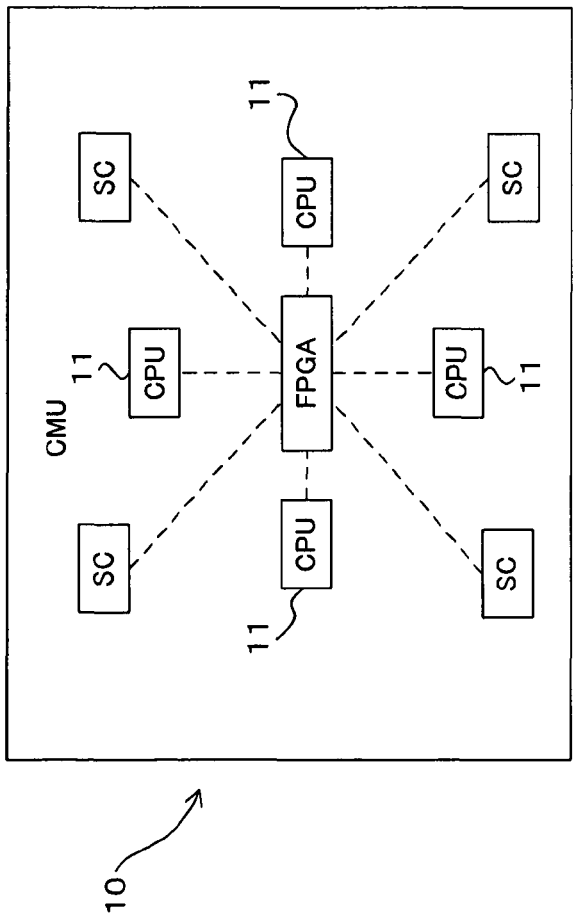
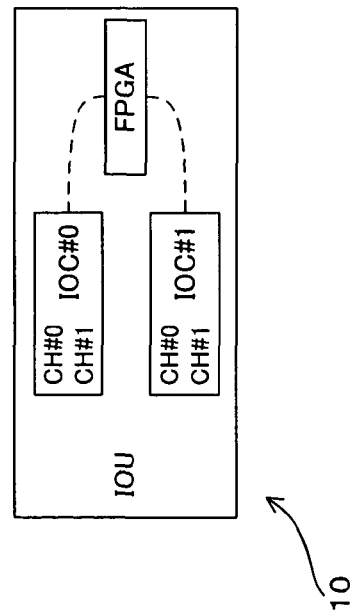

FIG. 20

| Offset | Valid | DID | DIMM valid | IOC valid | IOC# |
|---|---|---|---|---|---|
| 0 | 1 | 0x03 | 0b00000001 | 1 | 1 |
| 4 | | | | | |

DEGENERATION METHOD AND INFORMATION PROCESSING APPARATUS

CROSS-REFERENCE TO RELATED APPLICATION

This application is a continuation Application of a PCT international application No. PCT/JP 2007/052356 filed on Feb. 9, 2007 in Japan, the entire contents of which are incorporated by reference.

FIELD

The present invention relates to a technique for handling a fault in hardware resources shared by multiple physical partitions in a server system or the like having a partitioning function, for example.

BACKGROUND

In server systems being operated on a backbone system, an operation with high availability and flexible allocation of resources (hardware resources) is needed. As a technique to achieve such high availability and flexible allocation of resources, a function known as "multi-domain" or "multi-partition" has been used in a server system in which a single system is divided into multiple domains (partitions), and a respective operating system is executed on each of the domains.

Another technique known as "virtual machine" (VM) has also been used in which a single system is operated as if it is multiple systems (VMs) with the assistance of software and/or firmware (sometimes, assistance by hardware may be needed), and an OS is executed on a respective VM. On the contrary, in a domain system, most of each domain is "physically" independent.

FIGS. 50 and 51 are drawings illustrating an exemplary configuration of a multi-domain system in a server system, wherein FIG. 50 is a diagram illustrating the system prior to establishment of domains, and FIG. 51 is a diagram illustrating the system following establishment of domains.

A server system 100 depicted in FIGS. 50 and 51 is configured to include a common unit 101, CPUs (Central Processing Units) 102-1 and 102-2, memories (MEMs) 103-1 and 103-2, input/outputs (I/Os) 104-1 and 104-2, and multiple domains can be established by combining these components, namely, the CPUs 102-1 and 102-2, the memories 103-1 and 103-2, and the I/Os 104-1 and 104-2 in various combinations.

For example, as depicted in FIG. 51, the CPU 102-1, the memory 103-1, and the I/O 104-1 are combined to establish a domain D1, or the CPU 102-2, the memory 103-2, and the I/O 104-2 are combined to establish a domain D2. Alternatively, in the domain system, the configuration of a domain that has been previously established can be modified, e.g., a CPU in any location in the system may be assigned to the domain, or any number of CPUs may be assigned to a single domain.

Although the example depicted in FIGS. 50 and 51 provides an ideal multi-domain system, in most of cases, multiple CPUs, or a CPU and a memory are mounted on a single board and such combination for the mounting may be a limiting factor.

Furthermore, in the server system 100 which allows establishment of domains, in order to permit any modification of domain configuration, there exists the common unit 101, such as a cross bar, clock, or the like, which is shared among the multiple domains.

The server system 100 is adapted to minimize the common unit 101 and/or to provide redundancy and duplication in order to avoid a situation where all domains are down simultaneously.

Although the system is configured so that any fault, such as a failure, in the portion of the system other than the common unit 101 typically does not affect other systems, it is highly possible that the common unit 101 may bring down all of the domains. For example, especially when operated in a high frequency, it is difficult to switch the cross bar, clock, or the like, to the normal running system or to degenerate the affected system without causing any down of the domain.

FIG. 52 is a diagram illustrating an example when a fault occurs in a site other than a common unit in a multi-domain system, and FIG. 53 is a diagram illustrating an example when a fault occurs in the common unit 101 in the multi-domain system.

In a conventional multi-domain system, as depicted in FIG. 52, for example, when a failure occurs in the CPU 102-1 in the domain D1, only the domain D1 is brought to system down (partial degeneration) while continuing the operation of the domain D2, thereby shutting down only the domain D1 that has been affected by the failure.

On the contrary, in the multi-domain system, as depicted in FIG. 53, although both the domains D1 and D2 are brought to down in many cases when a failure occurs in the common unit 101, the fault site may affect only a particular domain even when the failure occurs in the common unit 101.

As described above, even when a fault occurs in the common unit 101 and the fault site is only related to a particular domain, conventional multi-domain systems are configured to give a higher priority to continue the operation of the (surviving) domain that is not affected by the failure without carrying out degeneration on the common unit 101 that may cause the entire system down.

However, some users set different significances on different domains that are established. In such a case, when a failure occurs in the common unit 101 which brings a domain having a higher significance into down, recovery of the highly significant domain may be delayed since a conventional multi-domain system gives a higher priority to continue the operation of the surviving domain.

SUMMARY

In order to achieve the above-identified object, a degeneration method for an information processing apparatus according to the present invention comprises a plurality of partitioned portions each having a processing unit assigned thereto, a first system common unit shared by the multiple partitioned portions, a second system common unit shared by the partitioned portions, a storage portion, and a system control portion for controlling a system, the method comprising: detecting an abnormality in the first system common unit by the system control portion; reading a priority indication, from the storage portion, indicating whether or not the first system common unit is to be degenerated when an abnormality occurs in the first system common unit for each of the partitioned portions; carrying out, when an abnormality is detected in a partitioned portion to which the priority indication is set, suspend processing on the information processing apparatus by the system control portion; and carrying out degeneration processing for suspending operation of the first system common unit and switching to the second system common unit.

Furthermore, a degeneration method for an information processing apparatus according to the present invention comprises a plurality of partitioned portions each having a processing unit assigned thereto, a first system common unit shared by the plurality of partitioned portions, a second system common unit shared by the partitioned portions, a storage portion, and a system control portion for controlling a system, the method comprising: detecting an abnormality in the first system common unit by the system control portion; detecting an abnormality in the partitioned portion common unit by the system control portion; searching for an priority indication, by the system control portion, indicating whether or not the system common unit is to be degenerated when an abnormality occurs in the first system common unit from the storage portion using identification indication of the partitioned portion in which the abnormality is detected; carrying out suspend processing on the information processing apparatus when the priority indication that is found by the system control portion is set for a partitioned portion corresponding to the identification indication; and carrying out degeneration processing for suspending operation of the first system common unit and switching to the second system common unit.

In addition, an information processing apparatus according to the present invention comprise: a plurality of partitioned portions including processing units; a first system common unit that is shared by the plurality of partitioned portions and executes normal operation; a second system common unit that is shared by the plurality of partitioned portions and is stood by for degeneration; a system control portion comprising: a system control means that detects an abnormality in the plurality of partitioned portions and the first system common unit; a storage means that stores identification indications provided to each of the plurality of partitioned portions, and priority indications corresponding to each of the identification indications and indicating whether or not the first system common unit is to be degenerated when an abnormality occurs in the first system common unit for each identification indication; a partition degeneration control means that controls degeneration for suspending the partitioned portion in which the abnormality is detected and switching to other normal partitioned portion; and a system control portion that carries out degeneration processing for suspending operation of the first system common unit and switching to the second system common unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating a Table T1 stored in a flash ROM of a service processor as one example of an embodiment;

FIG. 3 is a diagram illustrating a Table T2 stored in the flash ROM in the service processor as one example of an embodiment;

FIG. 4 is a diagram illustrating a Table T3 stored in the flash ROM in the service processor as one example of an embodiment;

FIG. 5 is a diagram illustrating a Table T4 stored in the flash ROM in the service processor as one example of an embodiment;

FIGS. 9(a), (b), and (c) are diagrams illustrating examples of connection of interrupt lines for notifying the service processor with an abnormality when the abnormality is detected in each chip in the server as one example of an embodiment;

FIG. 20 is a diagram illustrating a FACEmap in the server as one example of an embodiment;

Hereinafter, embodiments of the present invention will be described with reference to the drawings.

Figure 1:
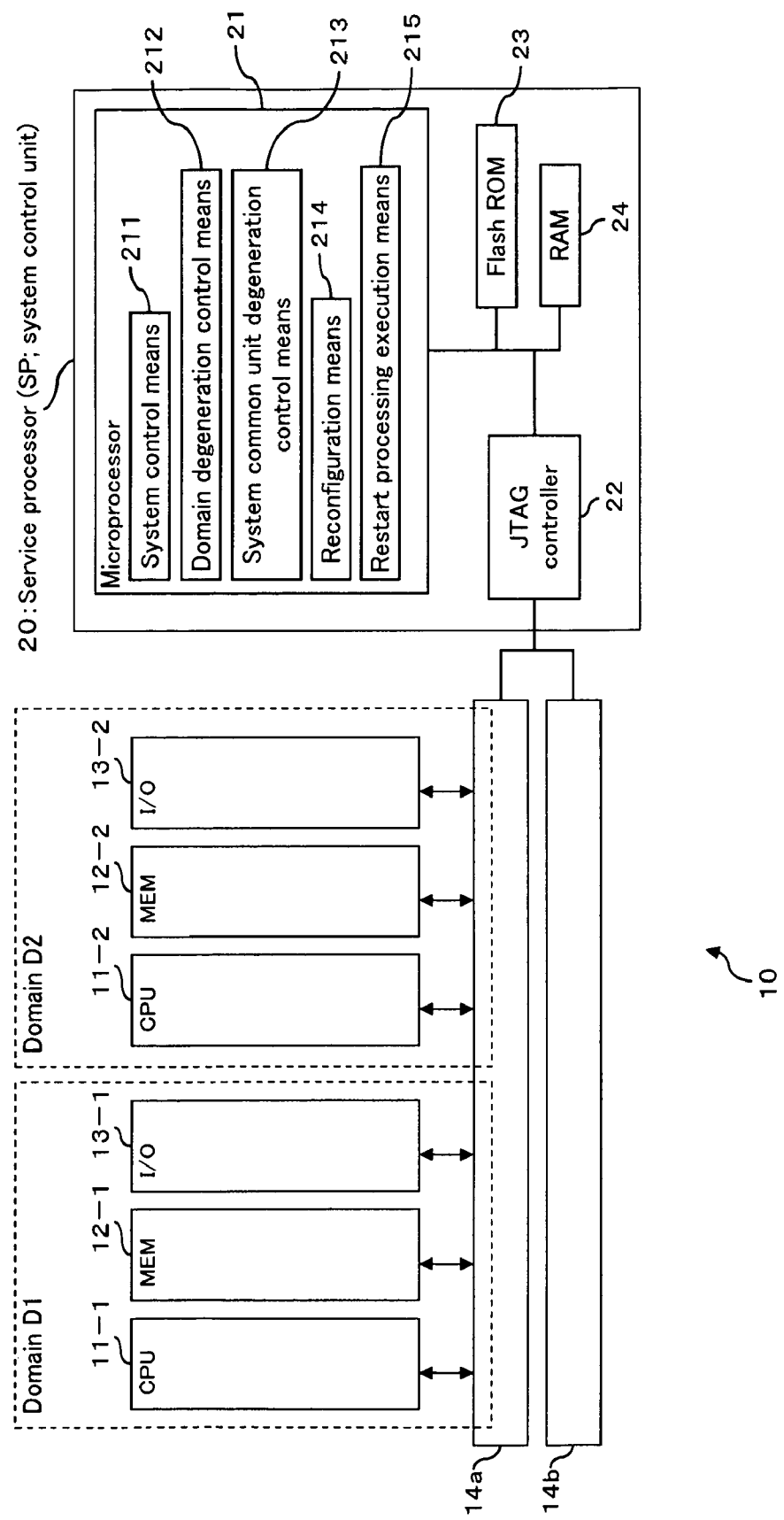
FIG. 1 is a logical block diagram illustrating an exemplary hardware configuration of a server (information processing apparatus) as one example of an embodiment.

FIG. 1 is a logical block diagram illustrating an exemplary hardware configuration of a server (information processing apparatus) as one example of an embodiment.

The server 10 is an information processing apparatus (computer) being operated in a backbone system, for example, and includes CPUs 11-1 and 11-2, memories (MEMs) 12-1 and 12-2, input/outputs (I/O) 13-1 and 13-2, common units 14a and 14b, and a service processor (SP) 20, as depicted in FIG. 1. The server 10 also has a domain function (partitioning function) that enables a system having a domain (partition) structure.

The domain function of the server 10 allows establishment of multiple domains (partitions; partitioned portions) by combining any of the CPUs 11-1 and 11-2, the memories 12-1 and 12-2, and the I/Os 13-1 and 13-2 in various combinations.

For example, in the example depicted in FIG. 1, a domain (partitioned portion) D1 is established by the combination of the CPU 11-1, the memory 12-1, and the I/O 13-1, and a domain (partitioned portion) D2 is established by the combination of the CPU 11-2, the memory 12-2, and the I/O 13-2.

Note that the reference symbol 11-1 or 11-2 is used hereinafter for referring to a specific CPU while reference symbol 11 is used when reference is made to any of the multiple CPUs. Similarly, the reference symbol 12-1 or 12-2 is used hereinafter for referring to a specific memory while reference symbol 12 is used when reference is made to any of the multiple memories, or the reference symbol 13-1 or 13-2 is used hereinafter for referring to a specific I/O unit while reference symbol 13 is used when reference is made to any of the multiple I/O units. Furthermore, the reference symbol D1 or D2 is used for referring to a specific domain while reference symbol 11 is used when reference is made to any of the multiple domains.

In addition, although the server 10 is depicted to include two CPUs 11, two memories 12, and two I/Os 13 in the example depicted in FIG. 1, this not limiting, and three or more CPUs 11, memories 12, and I/Os 13 may be provided, alternatively, the numbers of CPUs 11, memories 12, and I/O 13 may be different each other, and the numbers may be varied without departing from the spirit of the present invention.

Furthermore, although two domains D1 and D2 are established in the example depicted in FIG. 1, this not limiting, and three or more domains may be established, and the numbers may be varied without departing from the spirit of the present invention.

Here, the domain is the unit on which an OS is executed, and one domain D is configured to include at least one CPU 11.

The common units 14a and 14b represent units that are shared by multiple (two in this example) domains D1, D2, . . . , such as a cross bar, a clock, or a system controller, for example. For example, a system controller and a cross bar have a function to establish domains, and are adapted to configure which CPU 11, memory 12, and I/O 13 belong to which domain D. More specifically, a system controller and a cross bar include tables in their respective chips (which will be described later with reference to FIG. 2-4), and any access beyond the borders of a domain defined by the tables is denied.

In addition, in this embodiment, during the normal operation when no fault (abnormality), e.g., failure, occurs in the server 10, the common unit 14*a* (first system common unit) is used and is shared between the domains D1 and D2.

When any fault or the like is detected in the common unit 14*a*, a switching to the common unit 14*b* is occurred for replacing the common unit 14*a*.

The common unit 14*b* (second system common unit) is shared between the domains D1 and D2, and is stood by for degeneration, and is adapted to be used instead of the common unit 14*a* in the case where any fault, such as a failure, occurs in the common unit 14*a*.

The common unit 14*b* has the same or substantially the same configuration as that of the common unit 14*a*, and the common unit 14*a* and the common unit 14*b* can be used in the interchangeable manner. When the common units 14*a* and 14*b* are clocks, for example, two or more clocks having the same or substantially the same configuration are provided. Thus, if an abnormality is detected in the clock of 14*a*, degeneration processing is carried out for switching to another clock for replacing the clock in which the abnormality is detected.

Furthermore, the common unit 14*b* may have the configuration different from that of the common unit 14*a*. Suppose the case where the common units 14*a* and 14*b* are cross bars, for example. During the normal state where no abnormality is detected, two or more cross bars are used in parallel. Upon detection of any abnormality in one of the two or more cross bars, the cross bar in which the abnormality is detected is isolated for evacuation, and degeneration processing may be carried out for making the server 10 to be operated using the surviving cross bar.

In this case, the condition where two or more cross bars are used in parallel may correspond to the common unit 14*a*, and the condition where the cross bar in which the abnormality is detected and isolated may correspond to the common unit 14*b*.

The reference symbol 14*a* or 14*b* is used hereinafter when reference is made to one of multiple common units while reference symbol 14 is used when reference is made to any of the common units.

In addition, in the server 10, the CPUs 11 and the common units 14 have a function to detect any abnormality in the domains D and/or the common units 14.

For example, both the CPUs 11 and the common units 14 are configured to have a scan chain function (scan chain means, not shown) that reads internal information on the CPUs 11 and/or the common units 14, for example, by confirming (diagnosing) that an access to each internal node is possible, thereby detecting any abnormality of domains D and/or the common units 14, if any.

In addition, the scan chain function is controlled and carried out by a system control means 211 of a service processor 20 as will described later.

Furthermore, the CPUs 11 and/or the common units 14 include an interrupt notifying function (interrupt notifying means) that outputs an interrupt signal to the service processor 20. Upon detecting any abnormality in the domains D and/or common units 14 by the scan chain function, the interrupt notifying function notifies the service processor 20 with the abnormality by outputting an interrupt signal thereto.

In addition, the configurations of the established domains may be modified arbitrarily in the server 10.

The service processor 20 is a subsystem that manages the system of the server 10, and is configured to include a microprocessor 21, a JTAG controller 22, a flash read only memory (flash ROM) 23, and a random access memory (RAM) 24, as depicted in FIG. 1.

The flash ROM 23 is a storage unit (storing portion) that stores firmware for controlling the service processor 20 or the system, and various functions related to system administration of the server 10 are embodied when the firmware is executed by microprocessor 21.

In addition, the flash ROM 23 stores various information for setting up ASICs, e.g., the CPUs or the SCs, for the domains.

FIGS. 2-5 are diagrams illustrating examples of Tables T1-T4 stored in the flash ROM 23 in the server as one example of an embodiment. FIGS. 2, 3, 4, and 5, illustrate examples of the Tables T1, T2, T3, and T4, respectively.

Note that hereinafter, descriptions of the elements having the same reference symbols as the elements described previously will be emitted since they refer to the same or substantially the same elements described above.

The Table T1 depicted in FIG. 2 is adapted to define the relationship between CPU numbers (CPU #n, where n is an integer) identifying the CPUs 11 and the domain IDs, and one entry is generated for each of the CPUs 11 included in the system. Note that the domain IDs are identifiers assigned to each domain D to identify that domain D. In addition, the CPU numbers are identifiers of the CPUs 11, and have been uniquely assigned to each of the CPUs 11.

The Table T2 depicted in FIG. 3 is adapted to define the relationship between dual inline memory module (DIMM) numbers (DIMM #m, where m is an integer) identifying the memories 12 and the domain IDs, and one entry is generated for each of the memories 12 included in the system. In addition, the DIMM numbers are identifiers of the DIMMs 12, and have been uniquely assigned to each of the DIMMs 12.

The Table T3 depicted in FIG. 4 is adapted to define the relationship between peripheral components interconnect (PCI) numbers (PCI #s, where is an integer) identifying PCI slots (not shown) and the domain IDs, and one entry is generated for each of the PCI slots included in the system. In addition, the PCI slot numbers are identifiers of the PCI slots, and have been uniquely assigned to each of the PCI slots.

In the server 10, the ASICs (Application Specific Integration Circuits) are set up based on the Tables T1-T3 described above.

The Table T4 depicted in FIG. 5 defines the relationship between the domain IDs identifying the domains D and indications of the significances of the domains D, and one entry is generated for each of the domains included in the system. In addition, in the example depicted in FIG. 5, a flag "Y" is used as an indication of the significance of a domain, for example. When an administrator or the like has decided that a particular domain D or the processing being executed on that domain D is significant, a flag "Y" has been set to the domain ID of that domain D.

That is, the Table T4 is defined by associating, for each domain ID, a domain ID assigned to that domain with a flag "Y (priority indication)" indicating that the common unit 14*a* is to be degenerated or not when a failure of the common unit 14*a* occurs.

The flags "Y" in the Table T4 are configured to function as priority indication that is used to determine whether the common unit 14a is to be degenerated or not when the common unit 14a encounters an abnormality, and the flash ROM 23 that stores the Table T4 is configured to function as a storage unit (storage means) that stores the priority indication.

A significance flag that is set to a flag "Y" in the Table T4 indicates that the domain D having the significance flag of flag "Y" is an essential domain D for the system.

When the common unit 14a encounters an abnormality, the microprocessor 21 is configured to read and check a corresponding significance flag from the Table T4, and suspend processing on the server 10 is executed when the abnormality occurs in a domain D to which a flag "Y" is set.

Note that in this embodiment, a flag "Y" is set as priority indication if the common unit 14a is to be degenerated when the common unit 14a encounters an abnormality while the flag is not set if the common unit 14a is not to be degenerated (or alternatively, a flag "0" is set), thereby defining the significances as two scale values (significant or not significant), but this not limiting. The significances of the domains D may be varied without departing from the spirit of the present invention, for example, and significances may be represented by three or more scale values, for example, and information specifying such scales is set as significance flags in Table T4.

The flash ROM 23 is configured to function as a storage means in which identification indications that are set for each of the multiple domains D and priority indications regarding whether the common unit 14a is to be degenerated or not when the common unit 14a encounters an abnormality for each identification indication are related to each other and stored.

The random access memory (RAM) 24 is a storage region (memory) for operating such firmware, and is configured to store date or the like temporarily when the microprocessor 21 executes the firmware, which will be described later.

The microprocessor 21 is a processing unit that implements various functions by executing firmware stored in the flash ROM 23, and, in this embodiment, is configured to execute the multi-domain function described previously, as well as functioning as a system control means 211, a domain degeneration control means (partition degeneration control means) 212, a system common unit degeneration control means 213, a reconfiguration means 214, and a restart processing execution means 215, by executing the firmware.

Note that programs (firmware) for implementing the functions as the system control means 211, the domain degeneration control means 212, the system common unit degeneration control means 213, the reconfiguration means 214, and the restart processing execution means 215 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk, a magneto-optical disk, or the like.

The service processor 20 then reads a program from that storage medium and uses that program after transferring it to the flash ROM 23 or the like. Alternatively, the program may be recoded on a storage device (storage medium), for example, a magnetic disk, an optical disk, a magneto-optical disk, or the like, and the program may be provided from to the storage device to the computer through a communication path. In this case, the service processor 20 may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the service processor 20 includes a function as a computer.

Furthermore, in this embodiment, as the storage medium other than a flexible disk, a CD, a DVD, a magnetic disk, an optical disk, or a magneto-optical disk, an IC card, a ROM cartridge, a magnetic tape, a punch card, an internal storage device (memory, such as a RAM or ROM) of the computer, an external storage device or the like, or any medium that is readable by the computer, including a printed medium having a code, such as a bar code, is printed thereon, may be used.

The system control means 211 is configured to detect any abnormality of the multiple domains D and the common unit 14a, and, for example, is configured to detect an abnormality of the domains D or the common unit 14a by means of notification of an interrupt from an interrupt notifying means included in the CPU 11 and/or the common unit 14a.

The system control means 211 is also configured to detect an abnormality in the domains D or the common unit 14a by controlling a scan chain function of the CPU 11 and/or the common unit 14.

The domain degeneration control means 212 is configured to shut down a domain D in which a abnormality is detected by the system control means 211, and to carry out degeneration control for switching to any of the normal domains D.

The system common unit degeneration control means 213 is configured to suspend execution of the common unit 14a while executing degeneration processing for switching to the system common unit 14b.

The restart processing execution means 215 is configured to carry out restart processing of the server 10, and the reconfiguration means 214 is configured to carry out reconfiguration processing for allocating the CPU 11 to any of the domains D during the restart processing of the server 10 by the restart processing execution means 215.

The functions as the system control means 211, the domain degeneration control means 212, the system common unit degeneration control means 213, the reconfiguration means 214, and the restart processing execution means 215 may be implemented by controlling a JTAG controller 22 by the microprocessor 21. The particular controlling technique for implementing such functions of the JTAG controller 22 may be embodied using various techniques, and detailed description thereof will be omitted.

The JTAG controller 22 is configured to carry out various controls on the ASICs of the main system, i.e., the CPUs 11-1 and 11-2, the memories 12-1 and 12-2, the I/Os 13-1 and 13-2, and the common units 14a and 14b according to the standards of the Joint Test Action Group (JTAG), and is configured to implement the control by checking the status of the ASICs and configuring them based on the control of the microprocessor 21.

Figure 6:
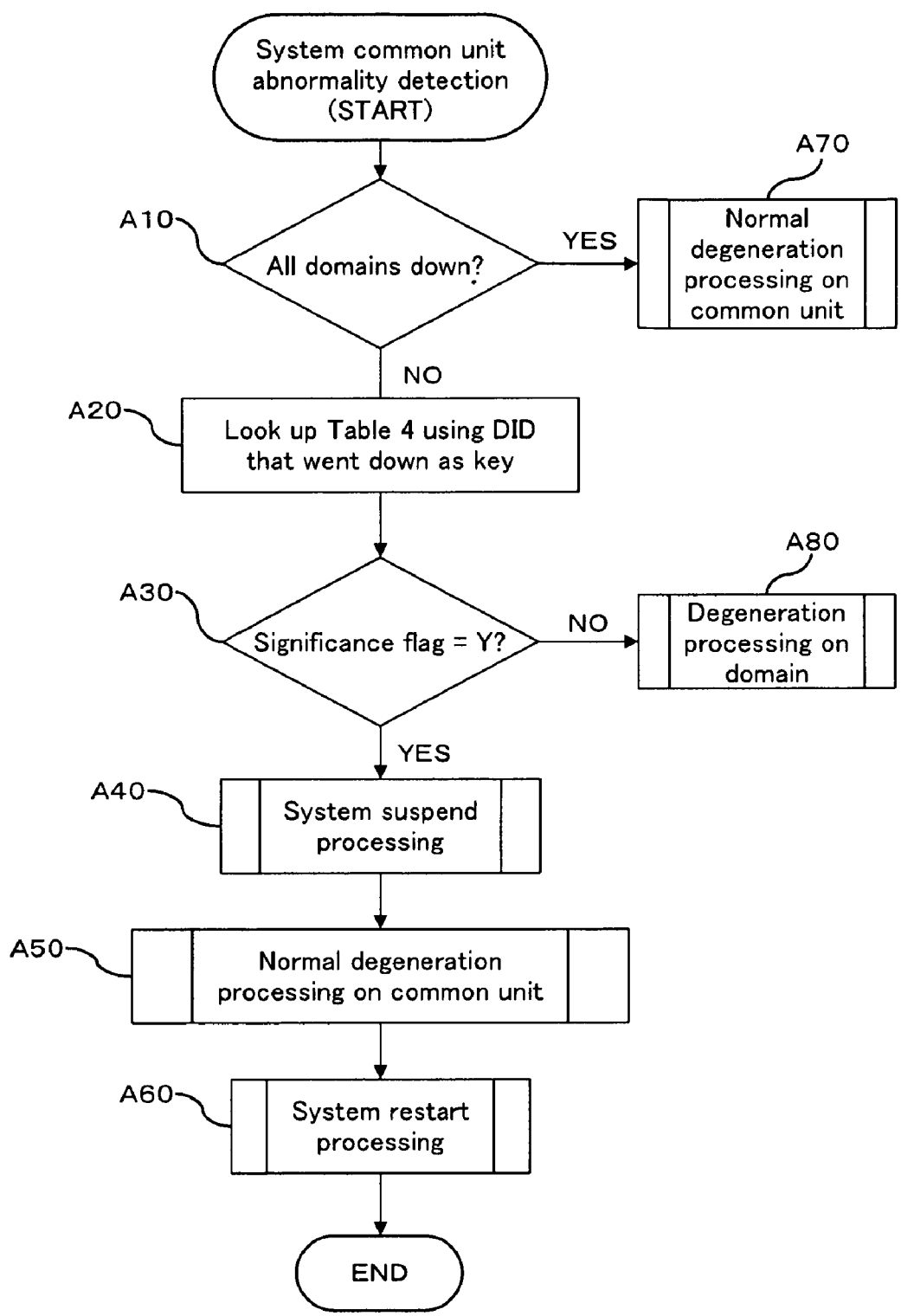
FIG. 6 is a flowchart illustrating processing when an abnormality is detected in the common unit in the server as one example of an embodiment.

The processing executed by the server 10 configured as described above as when an abnormality is detected in the common unit 14a will be described with reference to the flowchart depicted in FIG. 6 (Steps A10-A80) as one example of an embodiment.

When the system control portion 211 detects an abnormality in the common unit 14a by means of the scan chain function included in the CPU 11 and/or the common unit 14a, the domain degeneration control means 212 determines whether or not all of the domains D went down (halted) (Step A10). Note that this determination whether or not all of the domains D went down can be made according to various known techniques, and detailed description thereof will be omitted.

When all of the domains D went down (see the YES route from Step A10), the system common unit degeneration control means 213 suspends the operation of the common unit 14a and carries out degeneration processing to switch to the system common unit 14b (normal degeneration processing) (Step A70).

Otherwise, when a part of the domains D went down (see the NO route from Step A10), the domain degeneration control means 212 obtains the domain ID of the domain D that went down and searches the Table T4 stored in the flash ROM 23 using this domain ID as a key (Step A20).

The domain degeneration control means 212 searches Table T4 and checks whether the flag "Y" is set for the significance flag of the domain ID of the domain that went down (Step A30). When the flag "Y" is not set (see the NO route from Step A30), the domain degeneration control means 212 executes degeneration processing on that domain D (Step A80).

Otherwise, the flag "Y" is set for the significance flag of that domain ID of the domain that went down (see the YES route from Step A30), the microprocessor 21 executes suspend processing on the system (Step A40), and the system common unit degeneration control means 213 suspends the operation of the common unit 14a and carries out degeneration processing for switching to the system common unit 14b (normal degeneration processing) (Step A50).

The restart processing execution means 215 then carries out restart processing on the server 10 (Step A60). At this time, the reconfiguration means 214 carries out reconfiguration processing for allocating the CPU 11 to any of the domains D during the restart processing of the server 10 by the restart processing execution means 215 where necessary.

For example, the reconfiguration means 214 may carry out the reconfiguration processing for allocating the CPU 11, the memory 12, and the I/O 13 that have been allocated to the degenerated domain D to a surviving (that is not degenerated) domain D.

The restarted server 10 implements various functions as a server 10 as a result of the executing each CPU 11 executing the OS, the firmware, and/or other programs.

More specific examples of the server 10 will now be described as one example of an embodiment.

FIGS. 7-19 are drawings illustrating the hardware configuration of multi-domains in the server 10 as one example of an embodiment, and FIG. 20 is a diagram illustrating a FACEmap in the server 10.

Figure 7:
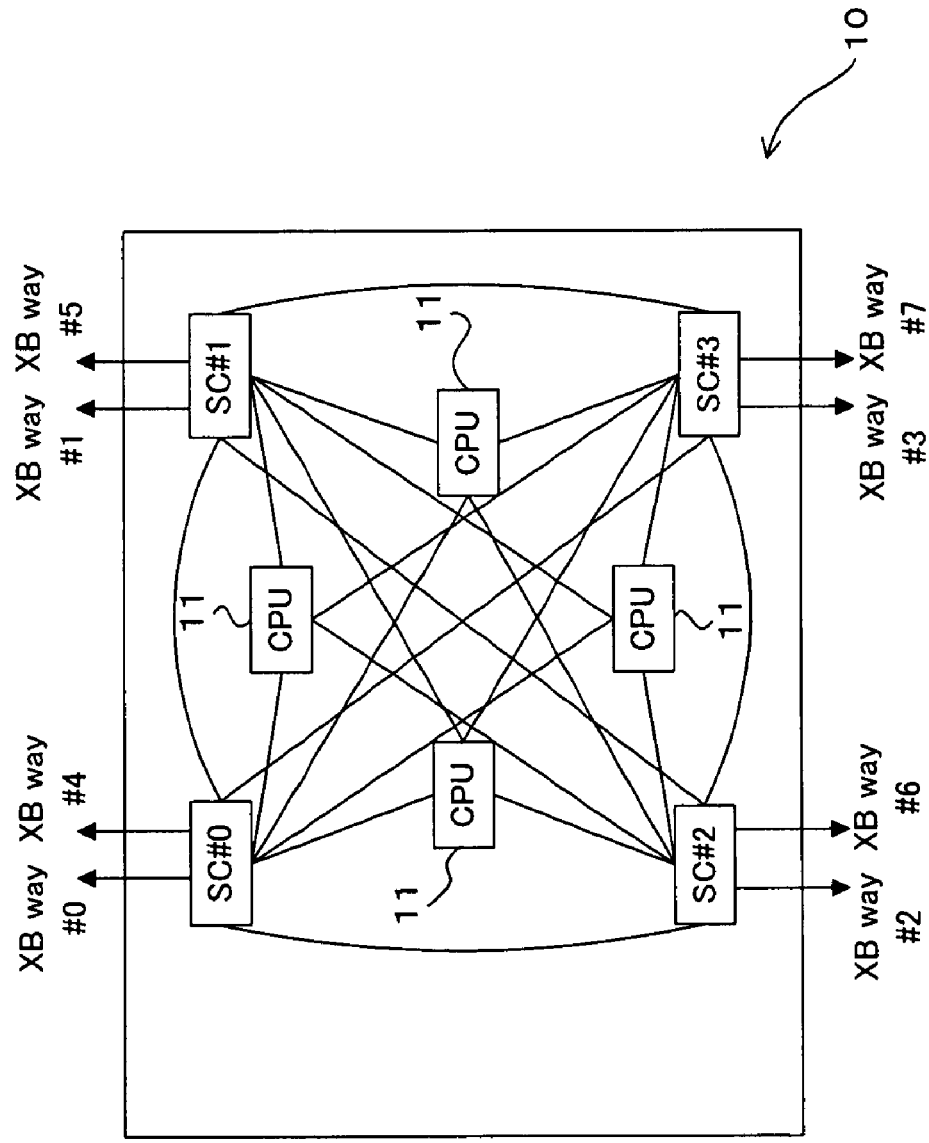
FIG. 7 is a diagram illustrating an exemplary connection of address and data lines within each chip within the CMU (CPU Module Unit) of the server as one example of an embodiment, wherein the CMU is the name of the system board in this embodiment.

FIG. 7 is a diagram illustrating an exemplary connection of address and data lines within each chip within the CMU of the server 10 as one example of an embodiment.

In the example depicted in FIG. 7, the respective CPUs 11 are connected each of the system controllers (SCs) #0-#4. Note that the SCs #0-#4 are configured to manage cache synchronization among the CPUs 11 and the address map for each domain D according to domain settings, and they manage which CPU, memory, and PCI card are to be allocated to which address, for example.

Figure 8:
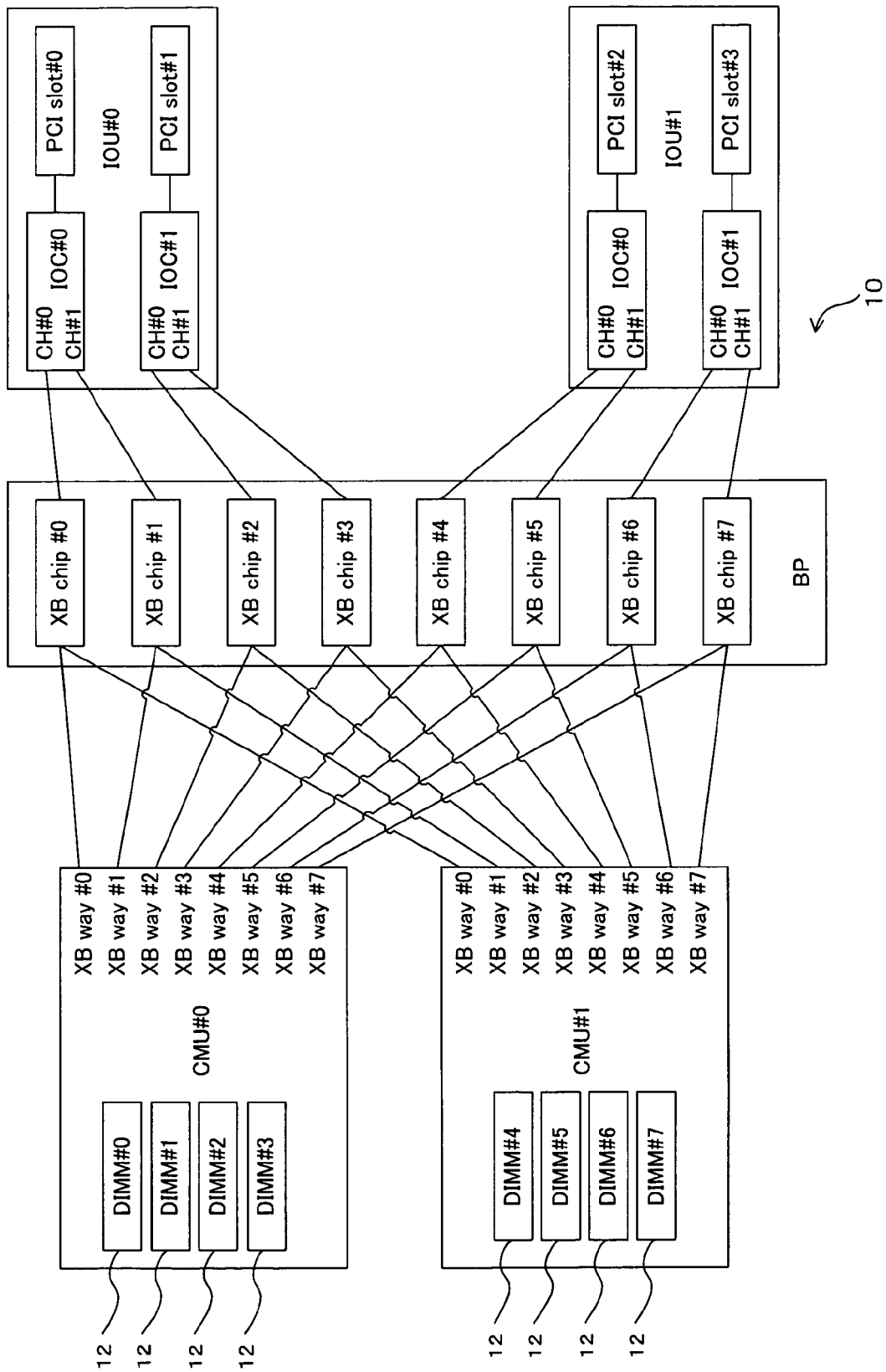
FIG. 8 is a diagram illustrating the system-global connection of addresses and data in the server as one example of an embodiment.

FIG. 8 is a diagram illustrating the system-global connection of addresses and data in the server 10. The example depicted in FIG. 8 is configured to exchange addresses and data on the same bus, and addresses and data are exchanged according to the type of packets transmitted on the same bus.

Note that IO controllers (IOCs) #0 and #1 are configured to serve as bridges between the PCI buses and the SCs and to control the PCI bus protocol. The XB chips #0-#7 are cross bars that control the exchange of packets between the SCs and the IOCs.

FIGS. 9(a), (b), and (c) are diagrams illustrating examples of connections of interrupt lines for notifying the service processors 20 with an abnormality when the abnormality is detected in each chip in the server 10. FIG. 9(a) is a diagram illustrating an example of connections of interrupt lines from the CPUs 11 and the SCs. FIG. 9(b) is a diagram illustrating an example of connections of interrupt lines from the IOCs #0 and #1. FIG. 9(c) is a diagram illustrating an example of connections of interrupt lines from the XB chips #0-#7. Note that each interrupt line is indicated by a broken line in FIGS. 9(a), (b), and (c).

As depicted in FIGS. 9(a), (b), and (c), interrupt lines from the SCs, the CPUs 11, the XB chips #0-#7, and the IOCs #0 and #1 are connected to a field programmable gate array (FPGA), and interrupts are sent to service processors 20 via the FPGA, as will be described later.

Upon an error interrupt, the service processors 20 are configured to obtain detailed information on that error from each register via the JTAG controller 22.

Figure 10C:
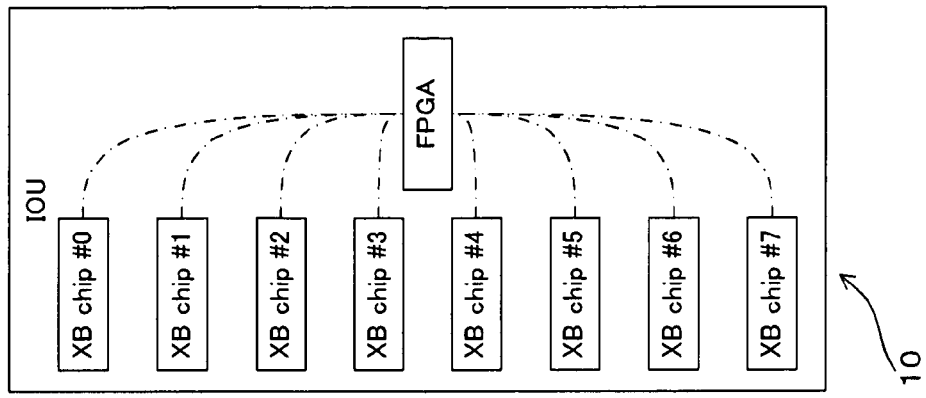
FIGS. 10(a), (b), and (c) are diagrams illustrating examples of connections of JTAG (Joint Test Architecture Group) connection lines between each chip and the FPGA (Field Programmable Gate Array) in the server as one example of an embodiment.
Figure 10A:
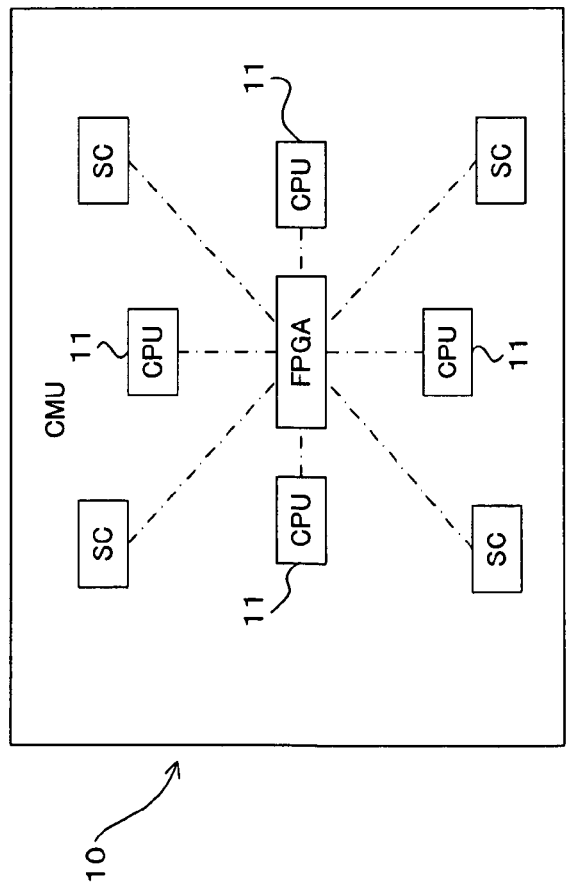
Figure 10B:
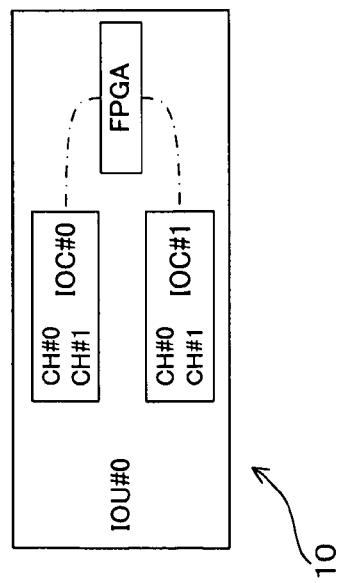

FIGS. 10(a), (b), and (c) are diagrams illustrating examples of connections of JTAG connection lines between each chip and the FPGA in the server 10. FIG. 10(a) is a diagram illustrating an example of connections of JTAG lines from the CPUs 11 and the SCs. FIG. 10(b) is a diagram illustrating an example of connections of JTAG lines from the IOCs #0 and #1. FIG. 10(c) is a diagram illustrating an example of connections of JTAG lines from the XB chips #0-#7. Note that each JTAG line is indicated by an alternate long and short dash line in FIGS. 10(a), (b), and (c).

As depicted in FIGS. 10(a), (b), and (c), the JTAG lines from the SCs, the CPUs 11, the XB chips #0-#7, and the IOCs #0 and #1 are also connected to the FPGA, and interrupts are sent to the service processors 20 via the FPGA, as will be described later.

Setting to each chip and reading of a detailed cause of an abnormality in each chip is executed through the FPGA.

Figure 11:
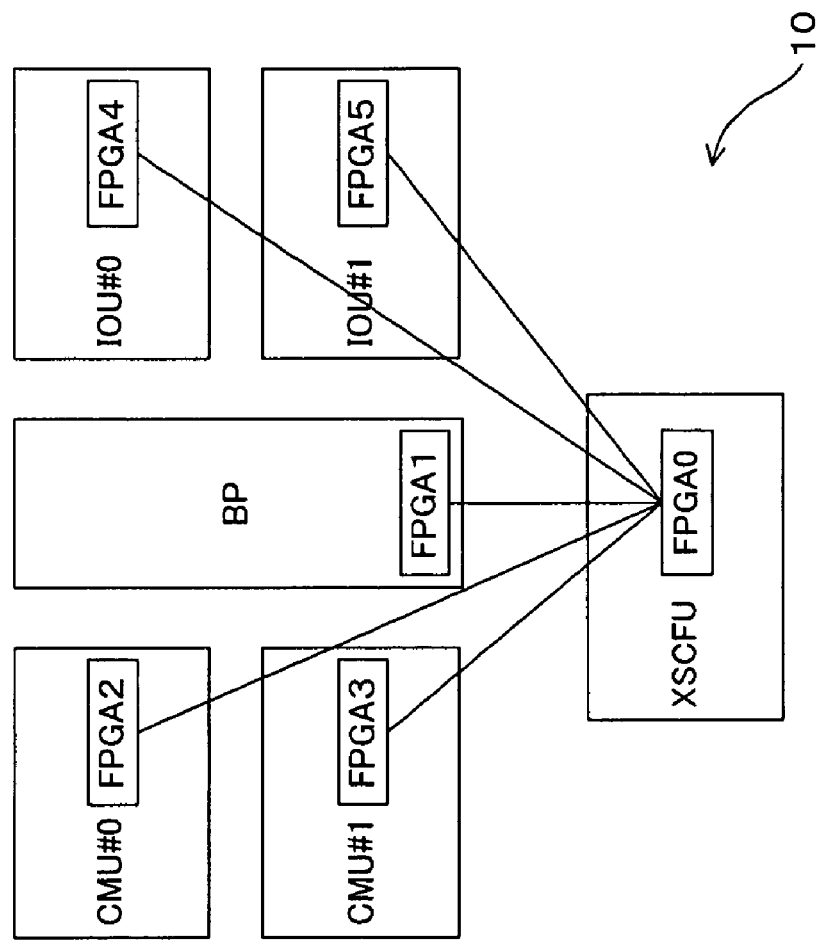
FIG. 11 is a diagram illustrating an example of connections between FPGAs in the system in the server as one example of an embodiment.

FIG. 11 is a diagram illustrating an example of connections between the FPGAs in the system in the server 10. As depicted in FIG. 11, an FPGA 0 mounted on the service processor 20 (an XSCFU, "XSCFU" is the name of the service processor board in this embodiment) is connected to each of FPGAs 1-5 on the respective boards, and control on the FPGAs 1-5 on the respective boards is achieved by communication among the FPGAs 1-5.

Figure 12:
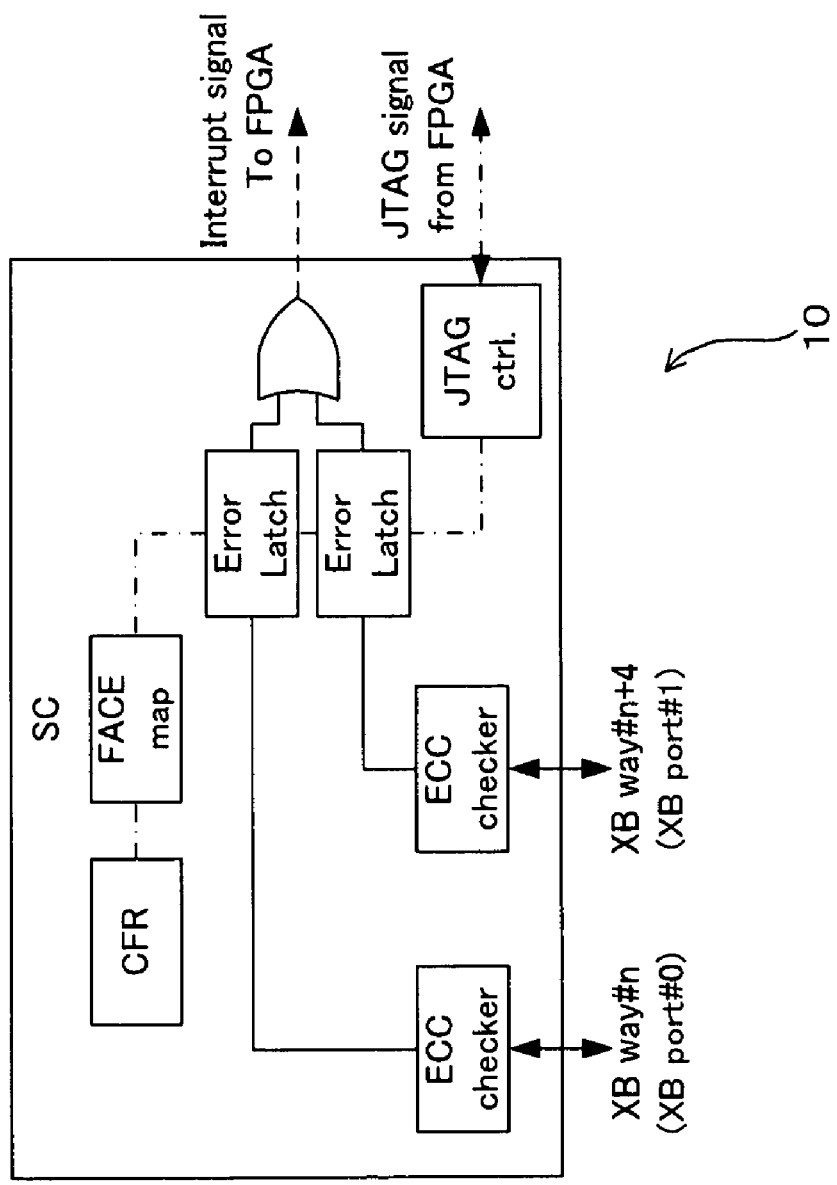
FIG. 12 is a block diagram illustrating the internal configuration of a system controller (SC) chip in the server as one example of an embodiment.

FIG. 12 is a block diagram illustrating the internal configuration of an SC chip in the server 10. The packets used for communication between the SC chip and an XB chip are protected by an ECC, and an error is latched at an error latch when a multi-bit error is detected.

The logical OR signal of the latches output from multiple error latches is output to an FPGA as an interrupt signal. Furthermore, these error latches may be read from the FPGA through the JTAG.

In addition, a FACEmap register for setting a domain and a configuration register (CFR) that control the connection with the XB may be set up using the JTAG. Note that the CFR, which will be described later, allows to enable/disable each of XB ports #0 and #1.

FIG. 20 is diagram illustrating a specific example of a FACEmap in the server 10, wherein the FACEmap is configured as a register containing the information depicted in FIG. 20. In the example depicted in FIG. 20, the FACEmap is configured to include the fields of "Offset", "Valid", "DID", "DIMM valid", "IOC valid," and "IOC#."

Note that although two entries up to the offset+4 is depicted in FIG. 20 in the example, eight entries up to offset+28 are actually present in this example, wherein the entry of offset+0 corresponds to the CPU #0 of the CMU#0, the entry of offset+4 corresponds to the CPU #1 of the CMU#0, and so on.

The "Valid" field is information indicating whether the corresponding CPU is used or not, and the "DID" is an ID identifying a domain D (domain ID). One domain is established from CPUs 11 having the same domain ID.

The "DIMM valid" field is information indicating which DIMM is to be used in the bit-map format, and, for example, the data "0b00000001" illustrated in FIG. 20 indicates that the CMU#0 and the CPU #0 uses the DIMM #0.

In addition, the "IOC#" field is the IOC number corresponding to the CPU 11 of that entry, and the "IOC valid" field is information indicating whether the IOC is to be used or not. The service processors 20 control the address maps of each CPU, DIMM, and IOC corresponding to the domain setting defined in the FACEmap to monitor access to these resources to prohibit any access from the other domain. Note that the SCs are configured to respond with an error when such an access request is issued from a CPU 11 or an IOC.

Figure 13:
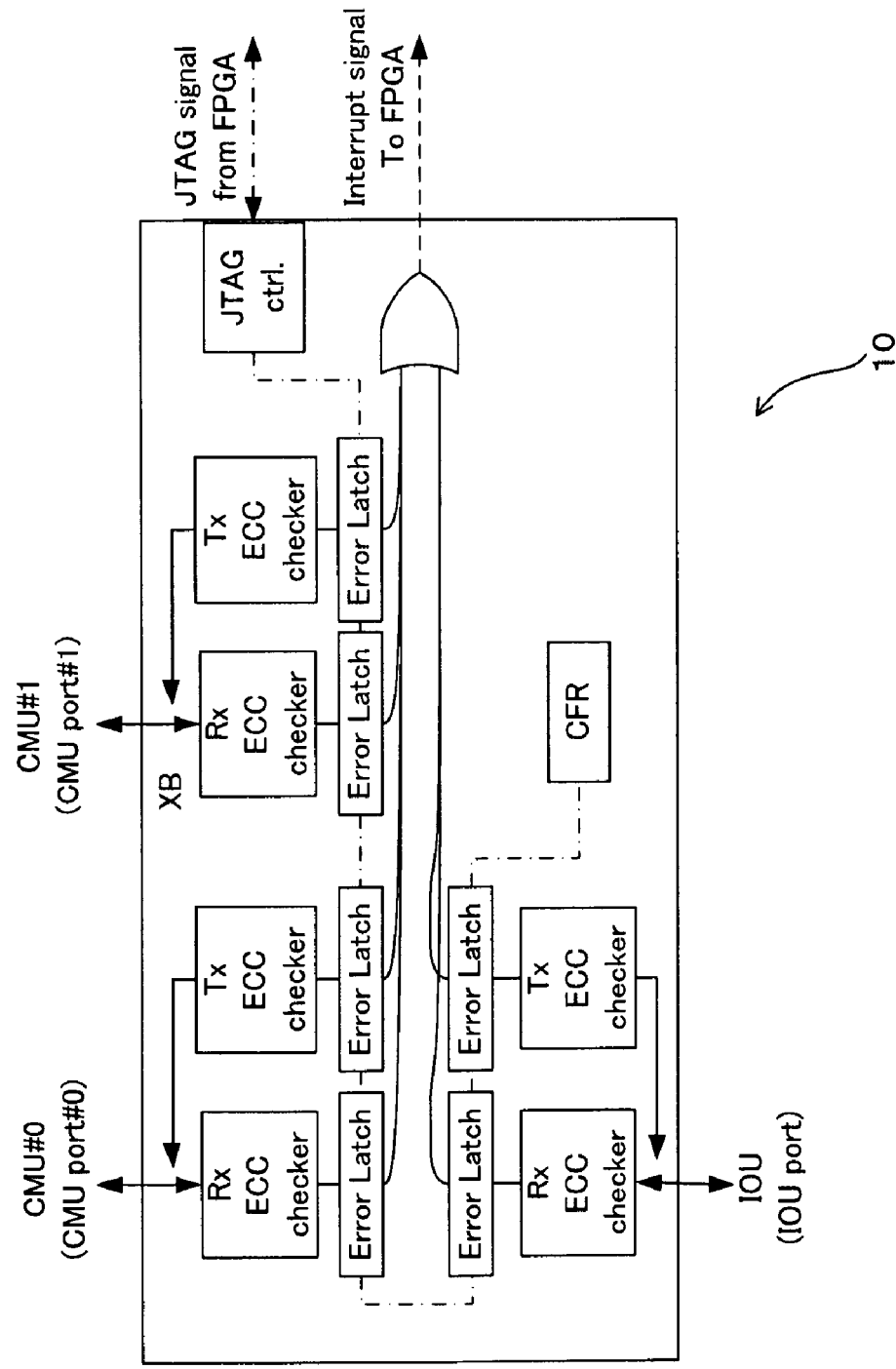
FIG. 13 is a block diagram illustrating an example of the internal configuration of a cross bar (XB) chip in the server as one example of an embodiment.

FIG. 13 is a block diagram illustrating an example of the internal configuration of the XB chip in the server 10. In the example depicted in FIG. 13, an ECC checker that checks an ECC on the bus in the similar manner as an SC is provided.

Unlike an SC, however, respective ECC checkers are provided for both transmission and reception, thereby making it possible to determine whether an ECC error occurs internal or external to the XB chip. For example, when an error occurs at the transmission ECC checker from a XB chip, it can be determined that the error occurs within the XB chip. Furthermore, a CFR that manages connection relationship between CMUs/IOUs is provided, and the CFR is adapted to be set to disable or enable each of the CPU port#0, the CPU port #1, and the IOU port.

Figure 14:
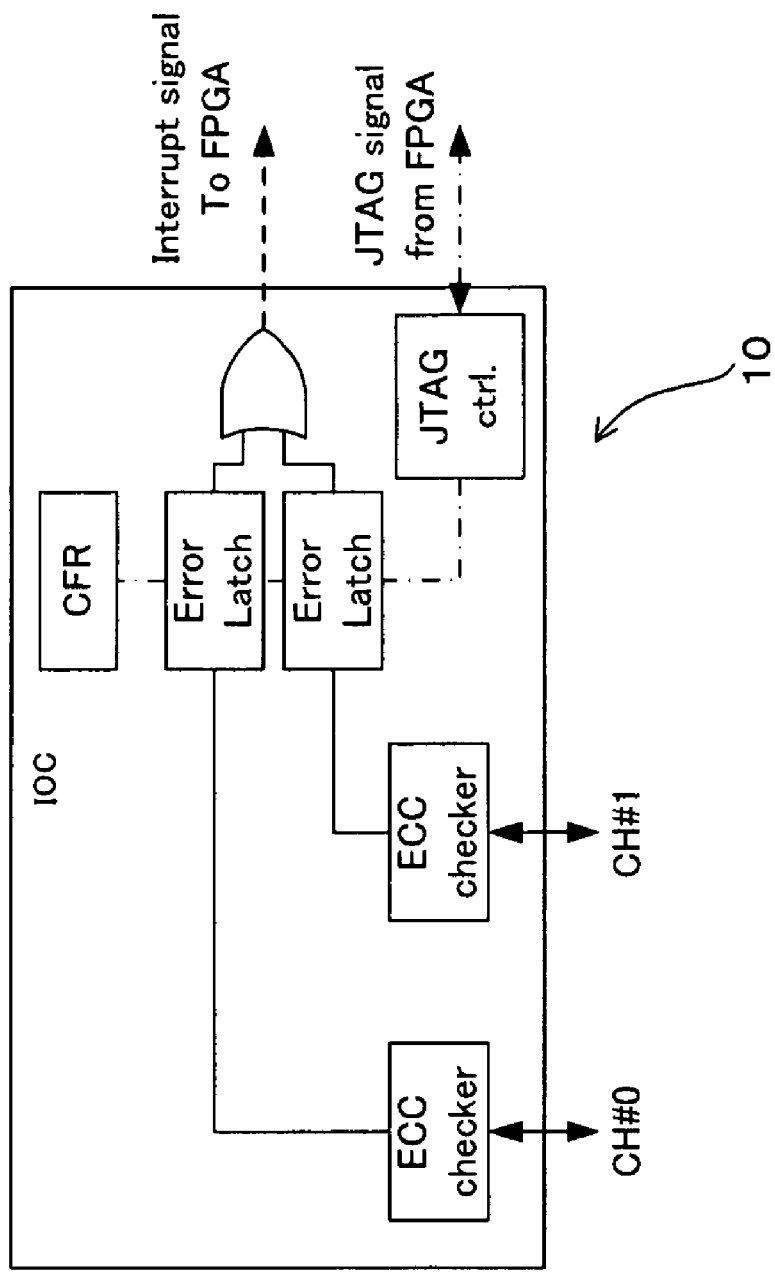
FIG. 14 is a block diagram illustrating example of the internal configuration of an I/O controller (IOC) chip in the server as one example of an embodiment.

FIG. 14 is a block diagram illustrating example of the internal configuration of an IOC chip in the server 10. As depicted in FIG. 14, similar to the SCs, ECC checkers that checks ECCs on the bus and a CFR are provided, wherein the CFR is adapted to enable or disable CH#0/CH#1.

Figure 15:
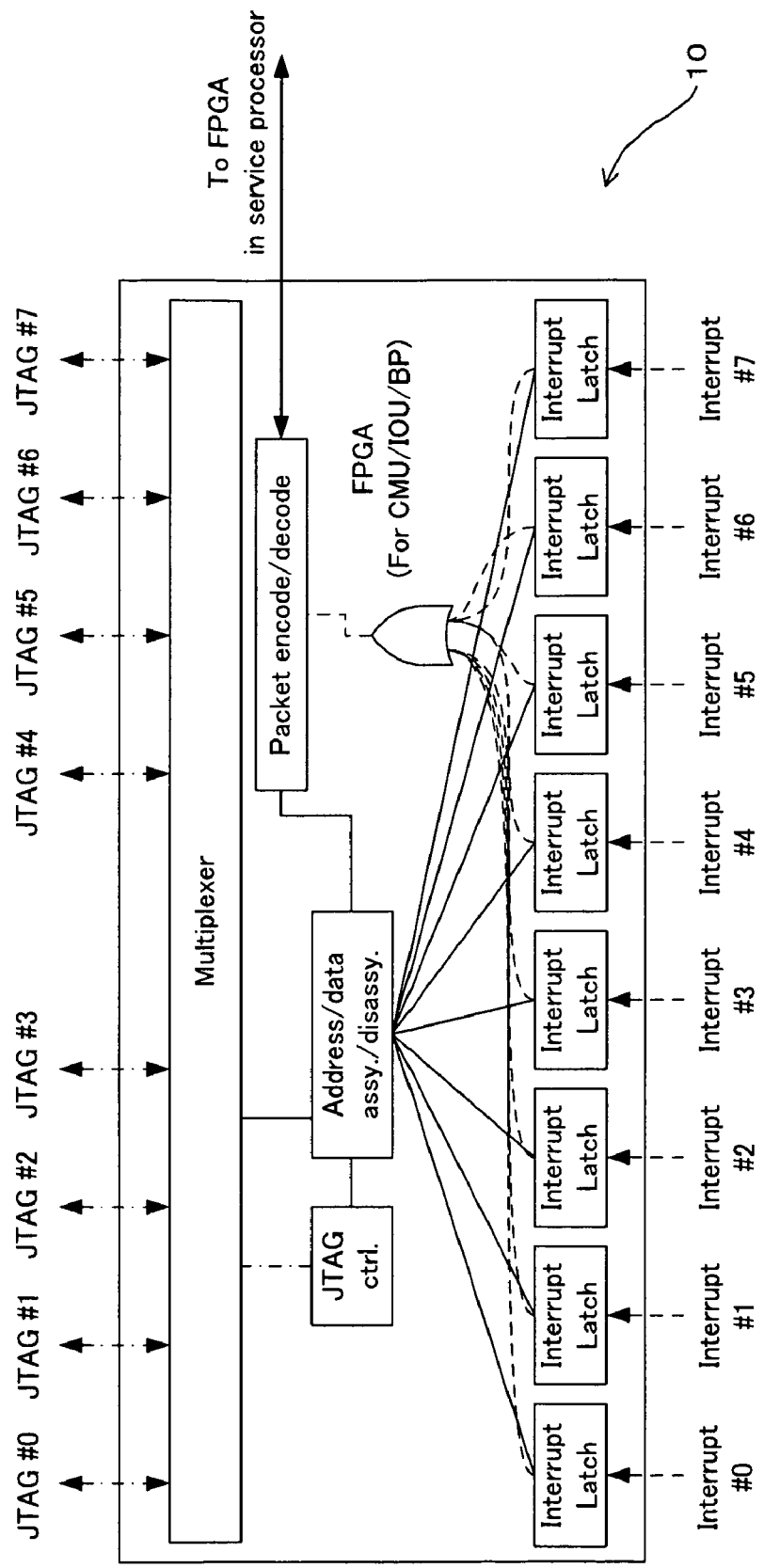
FIG. 15 is a block diagram illustrating the internal configuration of an FPGA mounted on the CMUs, IOUs, BPs (Back-Planes) as one example of an embodiment, wherein "IOU" is the name of a system board for controlling the I/O in this embodiment.

FIG. 15 is a block diagram illustrating the internal configuration of an FPGA mounted on the CMUs, IOUs, and BPs in the server 10. In the example depicted in FIG. 15, the FPGA for the CMUs, IOUs, and BPs are configured to carry out serial communication with the FPGA 0 of the service processor 20 (see FIG. 11), and to analyze received packets at a packet encode and decode portion.

Note that packets can be broadly classified into interrupt notifying packets, access request packets, and data response packets. The multiple interrupt latches are adapted to receive an interrupt signal from the CPU s11, the common unit 14a or 14b, or the like, and when the logical OR of multiple interrupt latches are turned on, an interrupt notifying packet is generated at the packet encode and decode portion and is sent to the FPGA 0.

The service processor 20 is configured to identify a chip in which the error has occurred by checking the interrupt latches and determining where the interrupt comes from, and then identify the error by reading registers within the chips by means of the JTAG controller 22.

When an access request packet is received from the FPGA 0, the packet is sent to an address/data assemble and disassemble portion. When the access type of the packet is "write," data is written into the address specified in the packet. Note that the address specifies one of the interrupt latches, the multiplexer, and the JTAG control irrespective of whether the access is read or write.

On the other hand, when the access type of the packet is "read," a read request is issued for the address specified in the packet. The data obtained in response to the read request is transmitted to the packet encode and decode portion via the address/data assemble and disassemble portion and a data response packet is generated. Thereby, the data is sent to the FPGA 0.

The JTAG control portion is configured to control the JTAGs of the CMUs, IOUs, and BPs. The JTAG control portion is configured to carry out JTAG communication by setting up the multiplexer to determine on which chip a JTAG access is to be executed.

Figure 16:
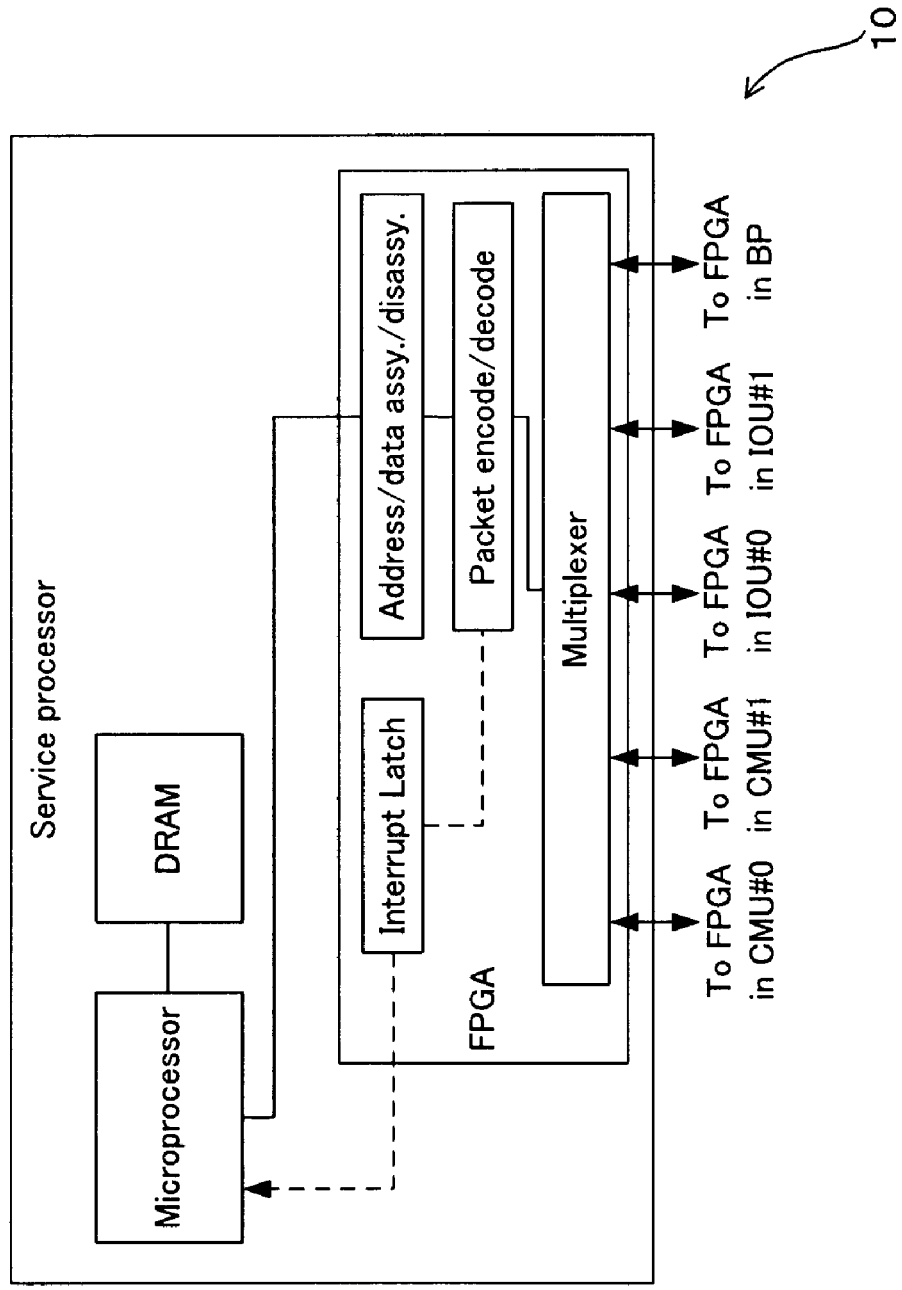
FIG. 16 is a block diagram illustrating the structure of the service processor and the chip of the FPGA in the service processor in the server as one example of an embodiment.

FIG. 16 is a block diagram illustrating the structure of a service processor 20 and the chip of the FPGA (FPGA 0) within the service processor 20 in the server 10.

The multiplexer selects an FPGA to be accessed from those on the CMUs, IOUs, and BPs. When an interrupt notifying packet is received from each unit, a signal is sent to the interrupt latch after a packet encode and decode portion recognizes that it is an interrupt notification. Thereby, an interrupt signal is asserted to the microprocessor. Upon receiving a "read" or "write" request from the microprocessor, only the address in the case of a "read" request, or the address and data to be written in the case of a "write" request, are packed by the address/data assemble and disassemble portion, which is sent to the packet encode and decode portion. The packet encode and decode portion generates and sends an access request packet. When the access request is "read," the data is sent to the microprocessor via the packet encode and decode portion since a data response packet is sent from the target FPGA.

Figure 17:
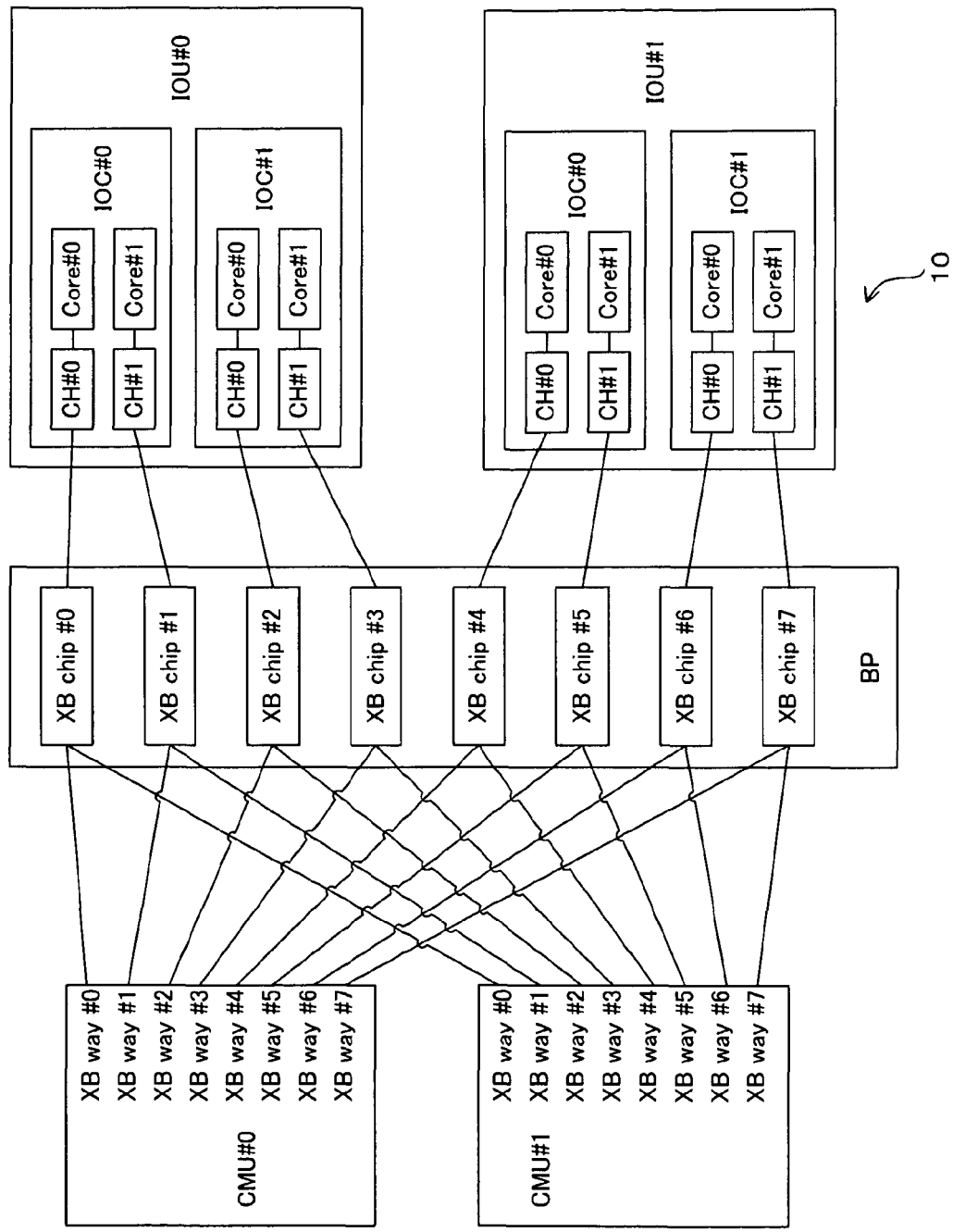
FIG. 17 is a diagram illustrating a XB degeneration technique in the server as one example of an embodiment.
Figure 18:
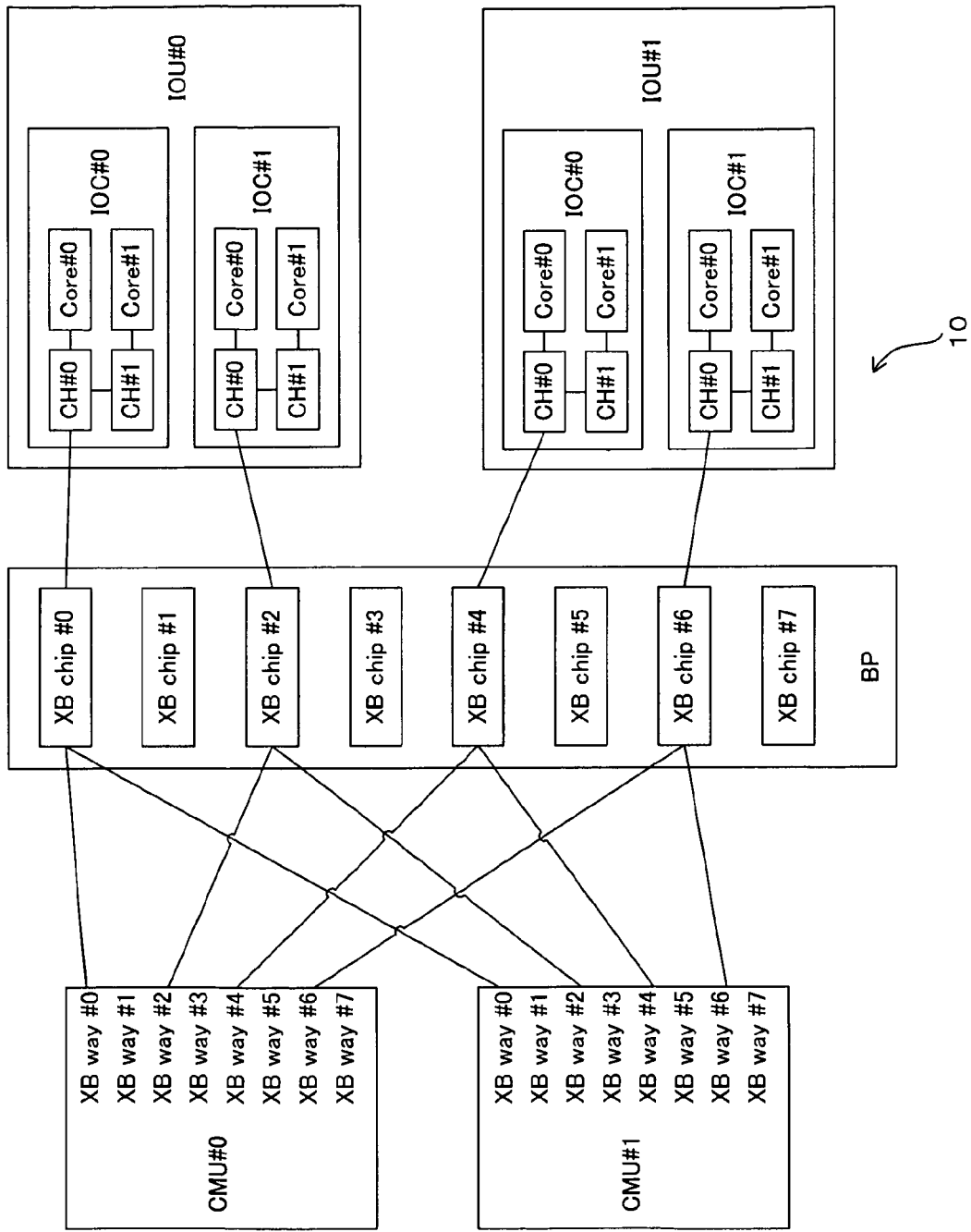
FIG. 18 is a diagram illustrating the XB degeneration technique in the server as one example of an embodiment.
Figure 19:
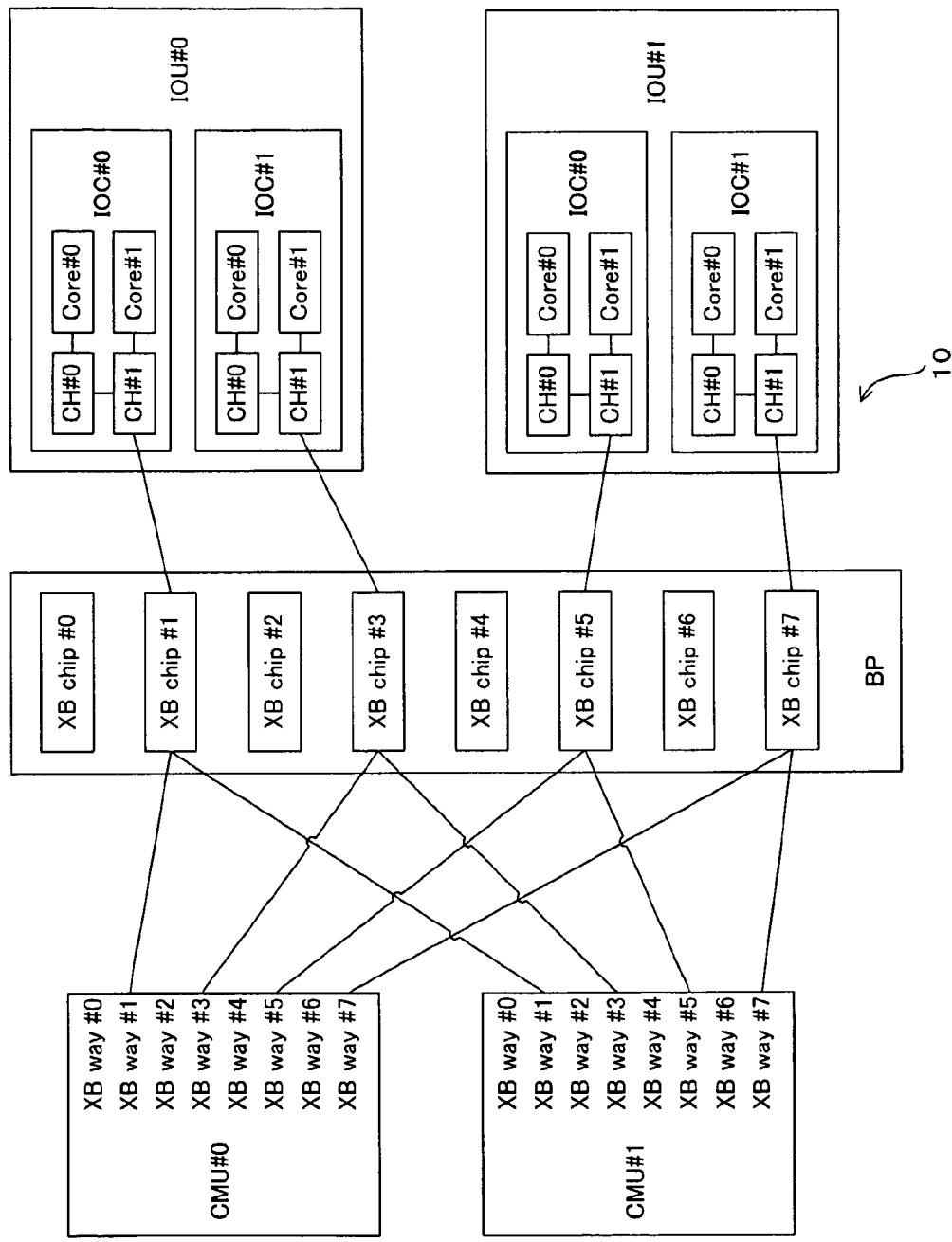
FIG. 19 is a diagram illustrating the XB degeneration technique in the server as one example of an embodiment.

FIGS. 17-19 are drawings illustrating the XB degeneration technique in the server 10. FIG. 17 illustrates the normal state (before degeneration), and FIGS. 18 and 19 illustrate the status after the degeneration.

Note that all of the ports and channels (CHs) on the CMU, IOU, and XB chips are all enabled by the CFR.

If an abnormality occurs one of XB chips #1, #3, #5, and #7 and degeneration is needed, the failed XB chips #1, #3, #5, and/or #7 is isolated and the situation depicted in FIG. 18 is obtained.

The XB port #1 of each SC is disabled by the setting of the CFR in the SC from the service processor 20. Similarly, the CH #1 of each IOC is disabled by the setting of the CFR in the IOC.

Note that in the examples depicted in FIGS. 17 and 18, the XB chips #0-#7 are established by using two cross bars in parallel, namely, the first cross bar having the XB chips #0, #2, #5, #4, #5, and #6 and the second cross bar having the XB chips #1, #3, #5, and #7, wherein one of the first and second cross bars are isolated if an error occurs in that cross bar.

The SC is configured to send packets to the XB port #0, but to send to port #1 once the port #0 is disabled. In addition, when the CH #1 is disabled, the IOC enables the path within the IOC between the CH #0 and CH #1, thereby sending, via this path, packets to the CH #1.

By carrying out such a degeneration, the continued operation of the system is ensured while reducing the bus width by half of the cross bars (XBs).

FIG. 19 illustrates the situation opposite to the example in FIG. 18, wherein the XB chips #0, #2, #4, and #6 are degenerated. Since the behavior of the system in the situation depicted in FIG. 19 is similar to that depicted in FIG. 18, except that the disabled ports are opposite, detailed description thereof will be omitted.

In FIGS. 17-19, the XB chips #0-#7 that are established by using two cross bars in parallel, namely, the first cross bar having the XB chips #0, #2, #5, #4, #5, and #6 and the second cross bar having the XB chips #1, #3, #5, and #7 depicted in FIG. 17 corresponds to first system common unit, and the remaining first cross bar (XB chips #0, #2, #5, #4, #5, and #6) after the second cross bar (XB chips #1, #3, #5, and #7) is degenerated, or the remaining second cross bar (XB chips #1, #3, #5, and #7) after the first cross bar (XB chips #0, #2, #5, #4, #5, and #6) is degenerated corresponds to the second common unit.

Next, various processing in the server 10 as one example of an embodiment will be explained with reference to the flowcharts depicted in FIGS. 21-49.

Figure 21:
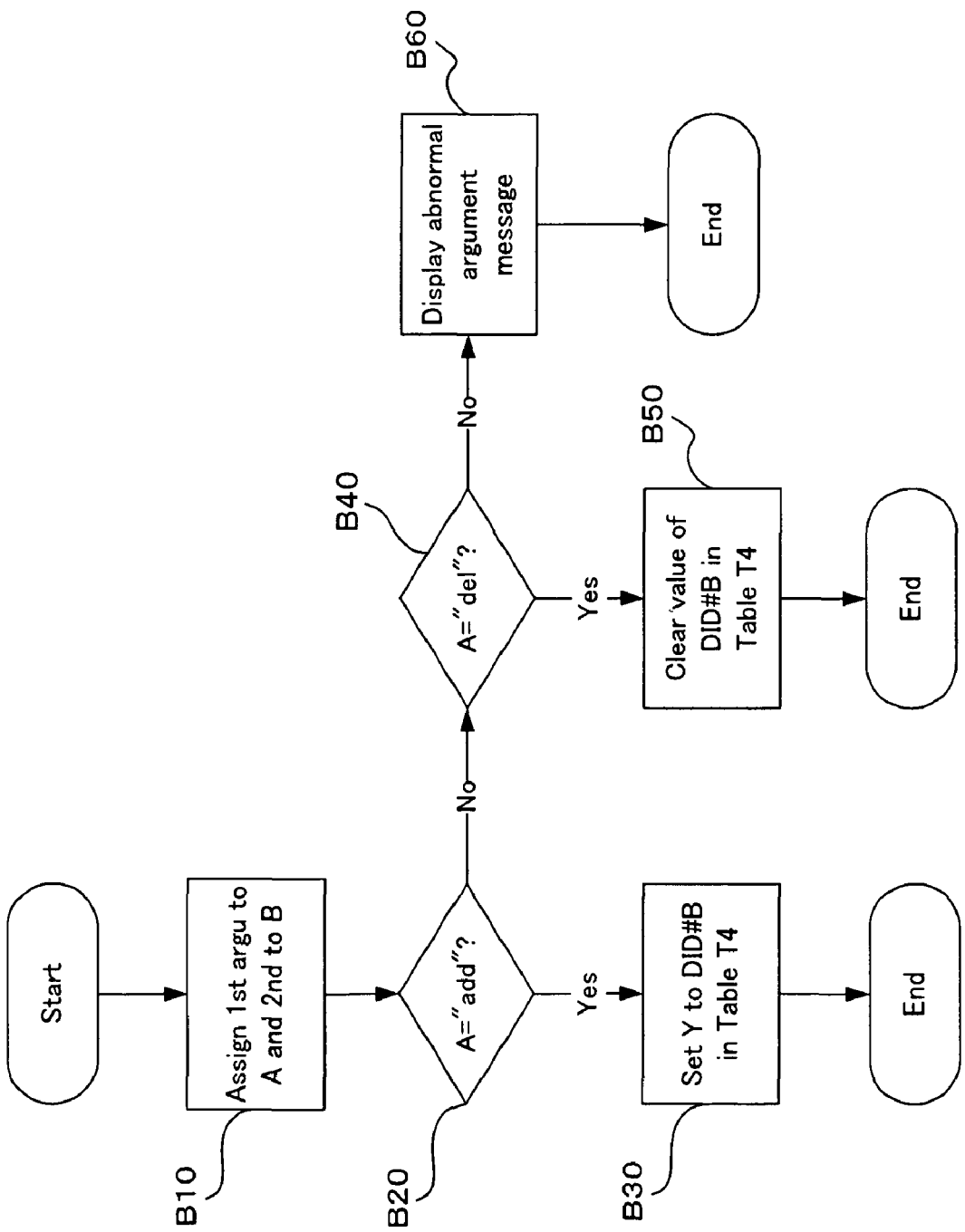
FIG. 21 is a flowchart illustrating the technique for the setting into the Table T4 in the server as one example of an embodiment.

FIG. 21 is a flowchart illustrating the technique for the setting into the Table T4 in the server 10 (Steps B10-B60).

The user signs on to the embedded OS being operated on the service processor 20, and initiates a command on the OS.

The first argument of the command is assigned to the variable A, and the second argument is assigned to the variable B (Step B10). The allowed value for the first argument of the command is "add" (to establish setting) or "del" (to delete the setting), and the second argument represents the domain ID of the domain to which the significance flag is turned on.

Thereafter, it is determined whether or not the variable A is "add" (Step B20). If the variable A is "add" (see the "yes" route from Step B20), the value "Y" is set to the DID #B on the Table T4 (Step B30) and the processing is terminated.

Otherwise, the variable A is not "add" (see the "no" route from Step B20), it is determined whether or not variable A is "del" (Step B40). When the variable A is "del" (see the "yes" route from Step B40), the value of DID#B in the Table T4 is cleared (Step B50) and the processing is terminated.

Furthermore, if the variable A is not "del" (see the "no" route from Step B40), an argument abnormal message is displayed (Step B60) and the processing is terminated.

By executing the above-identified command, the setting as of which domain is regarded as significant is established in the Table T4.

Figure 22:
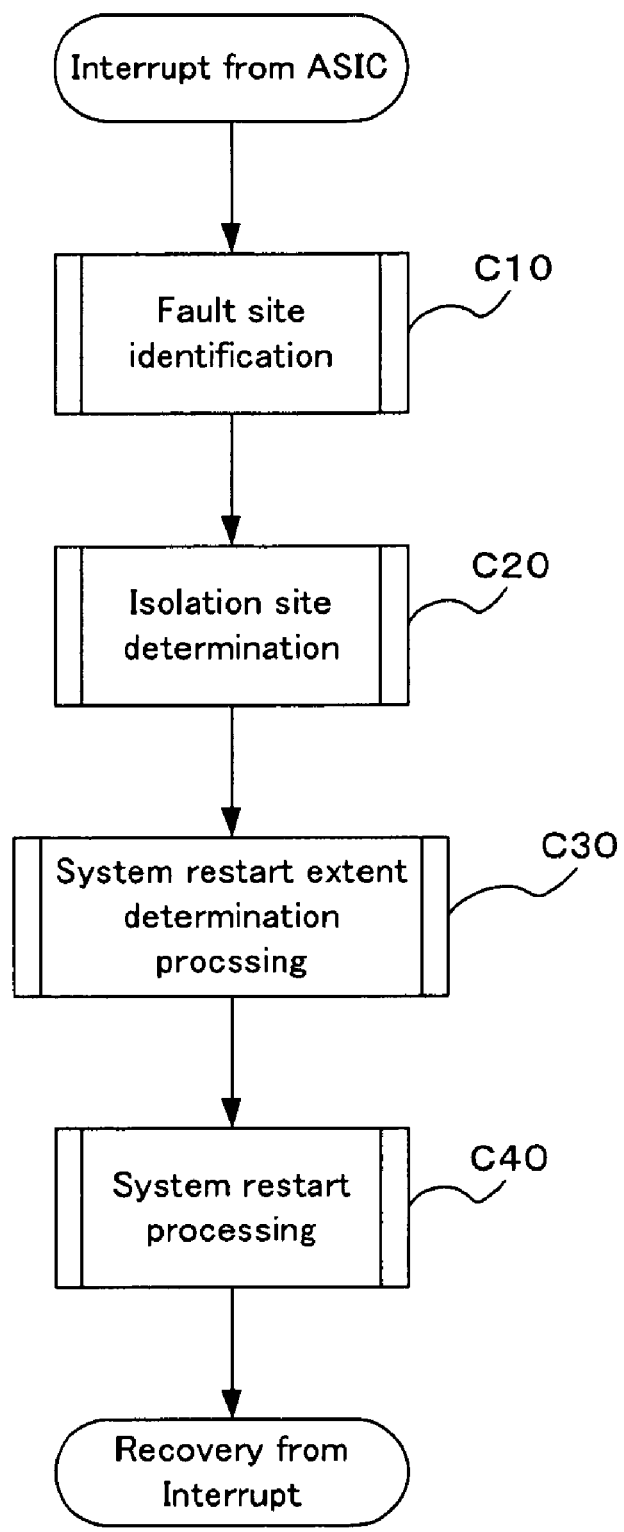
FIG. 22 is a flowchart illustrating exemplary processing upon occurrence of a hardware abnormality in the server as one example of an embodiment.
Figure 23:
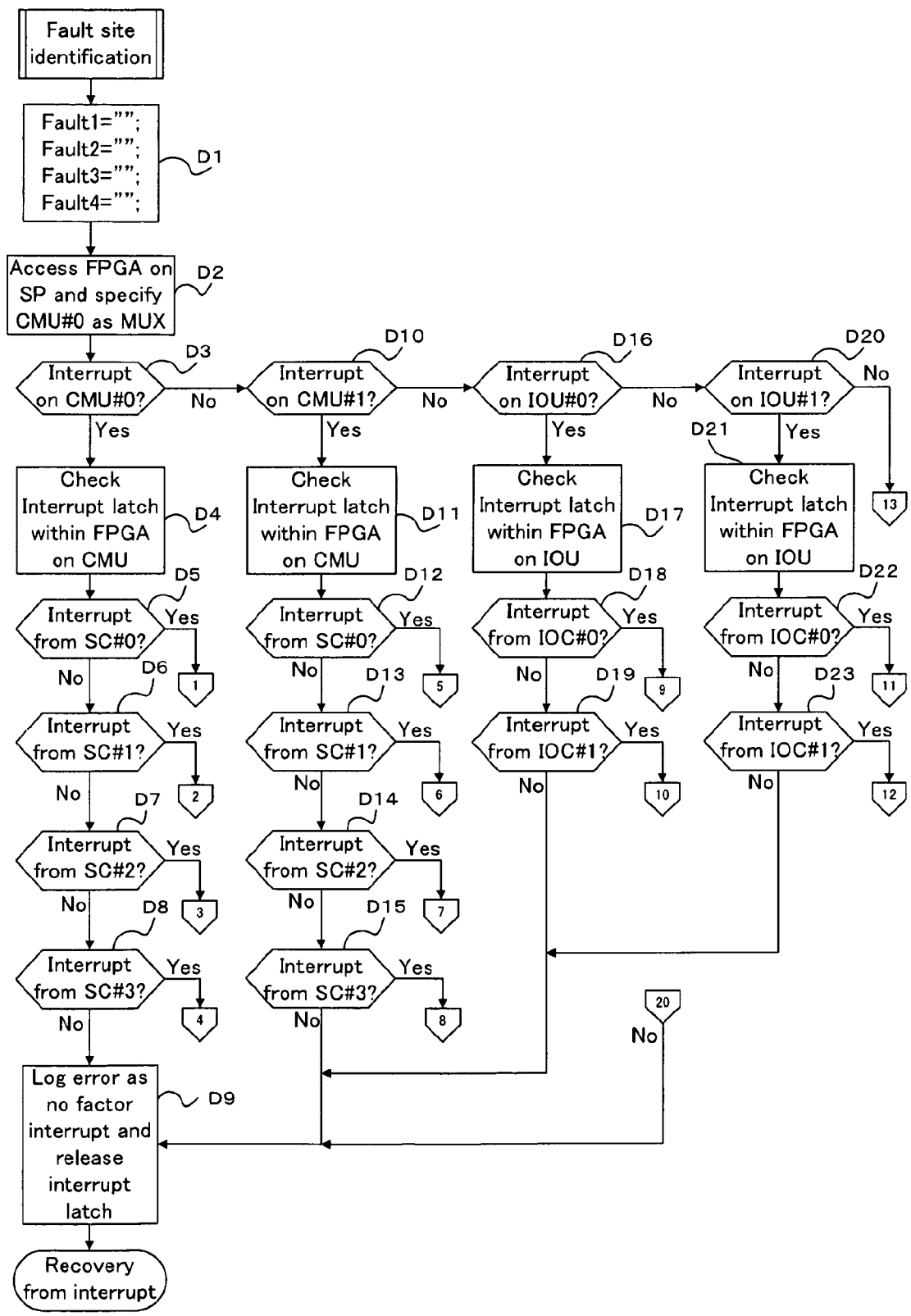
FIG. 23 is a flowchart illustrating a fault site identification technique in the server as one example of an embodiment.
Figure 24:
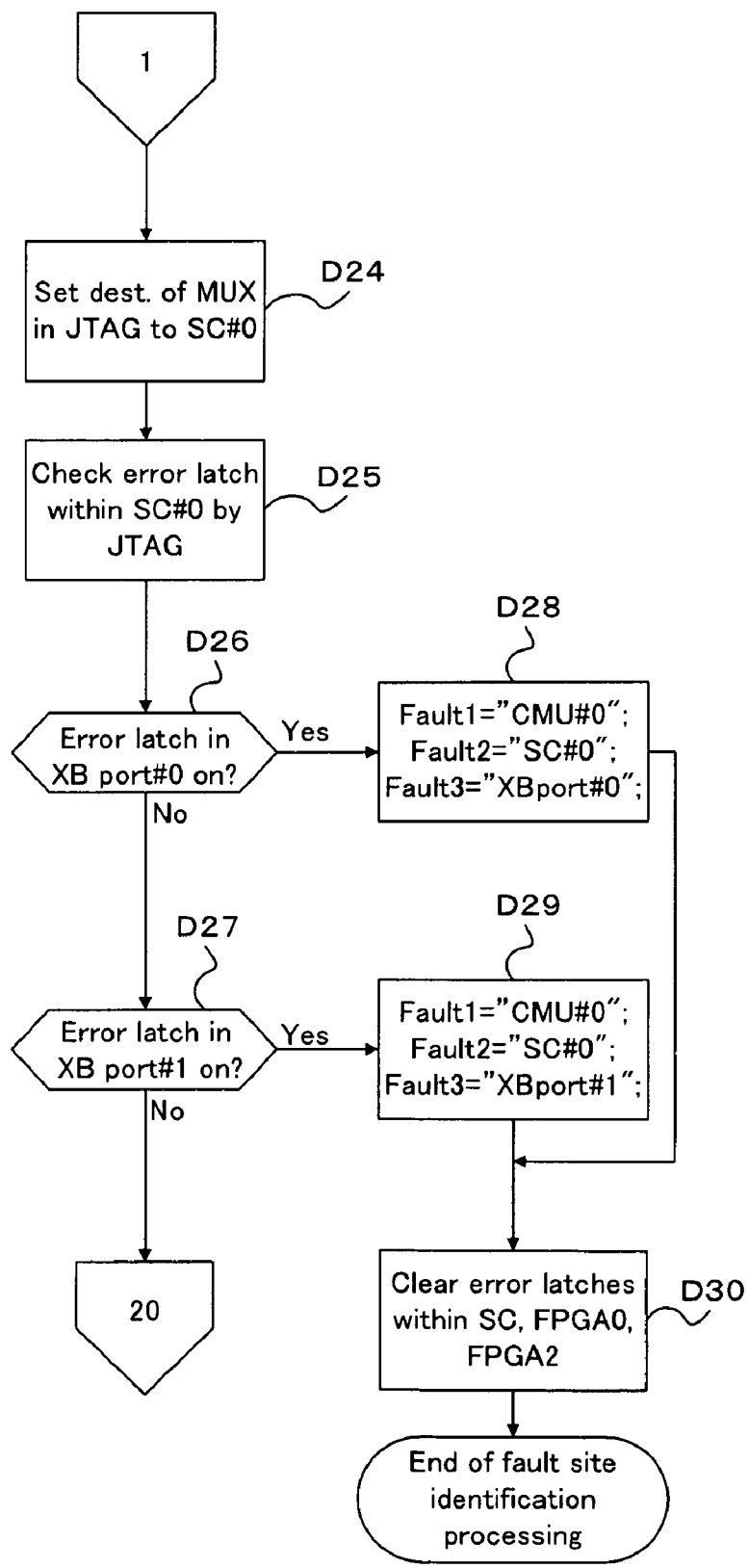
FIG. 24 is a flowchart illustrating the fault site identification technique in the server as one example of an embodiment.
Figure 25:
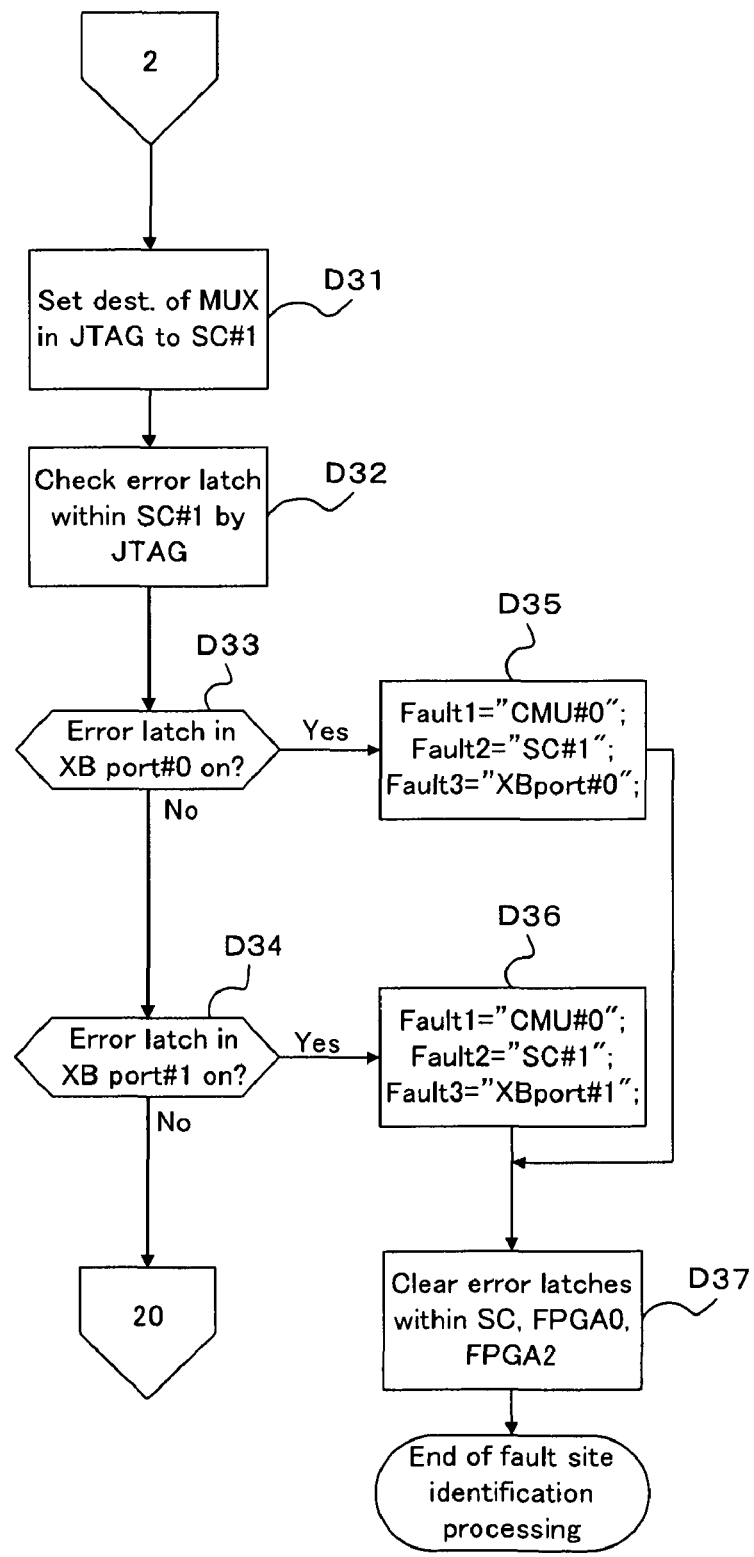
FIG. 25 is a flowchart illustrating the fault site identification technique in the server as one example of an embodiment.
Figure 26:
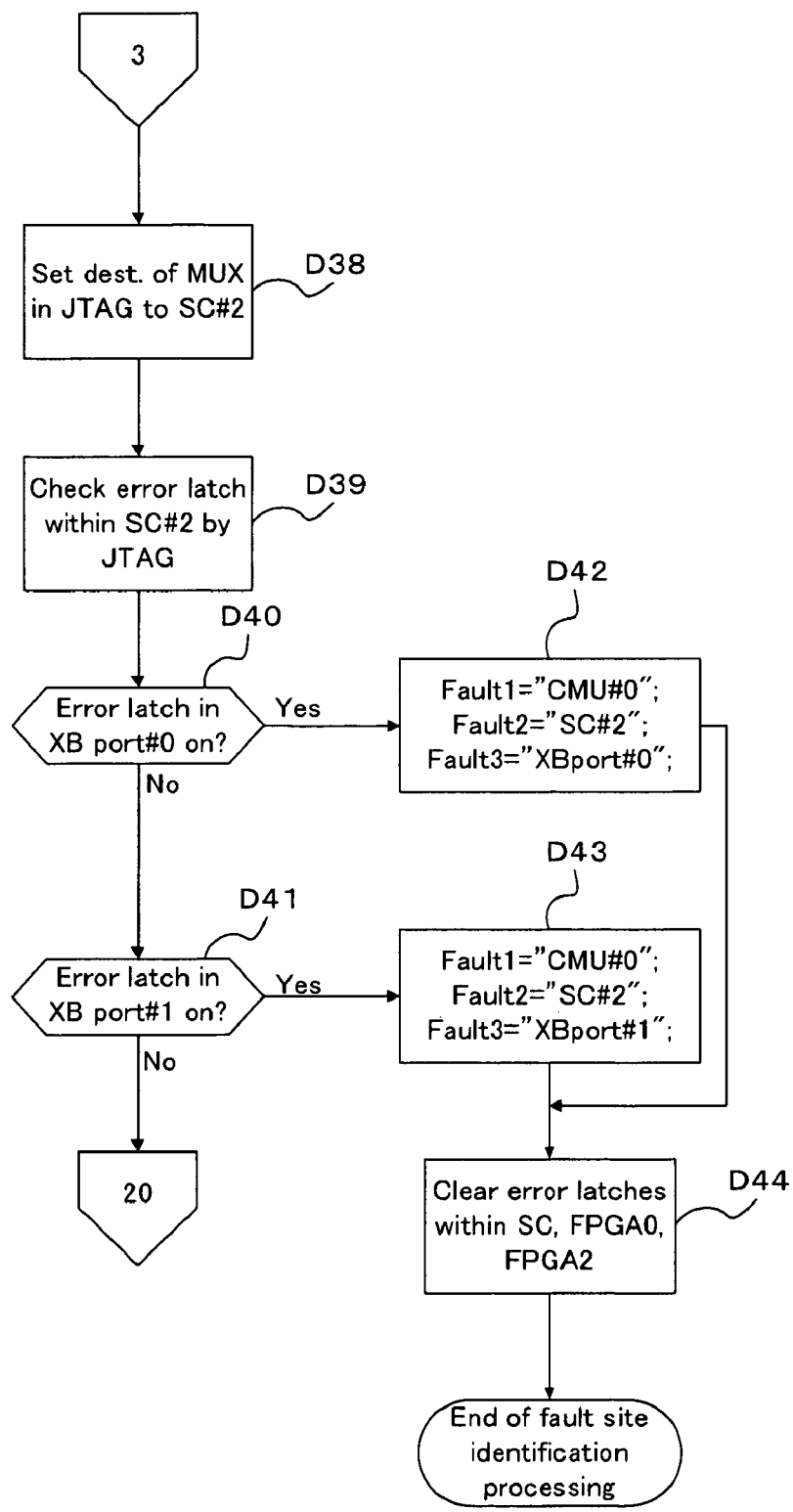
FIG. 26 is a flowchart illustrating the fault site identification technique in the server as one example of an embodiment.
Figure 27:
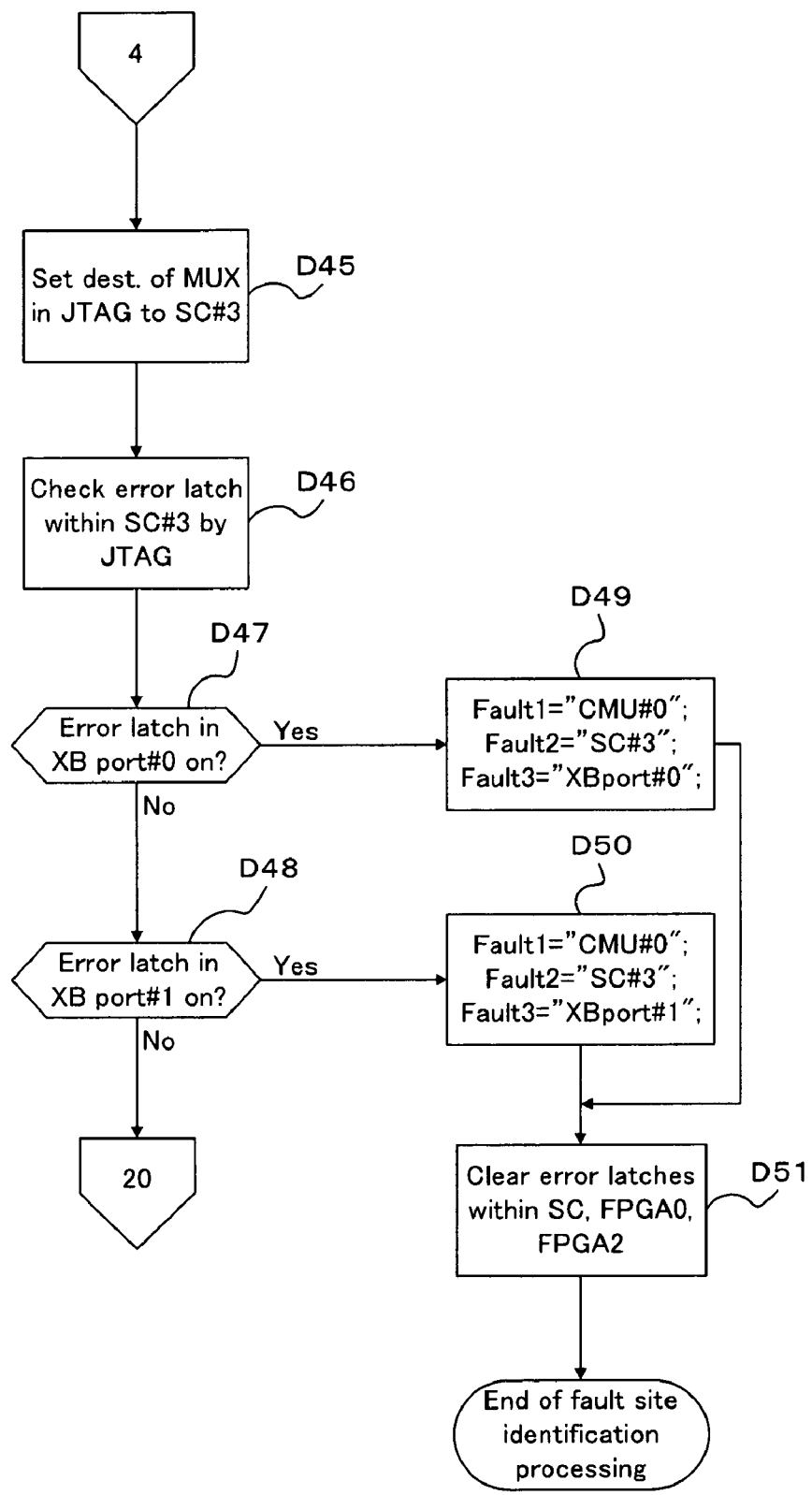
FIG. 27 is a flowchart illustrating the fault site identification technique in the server as one example of an embodiment.
Figure 28:
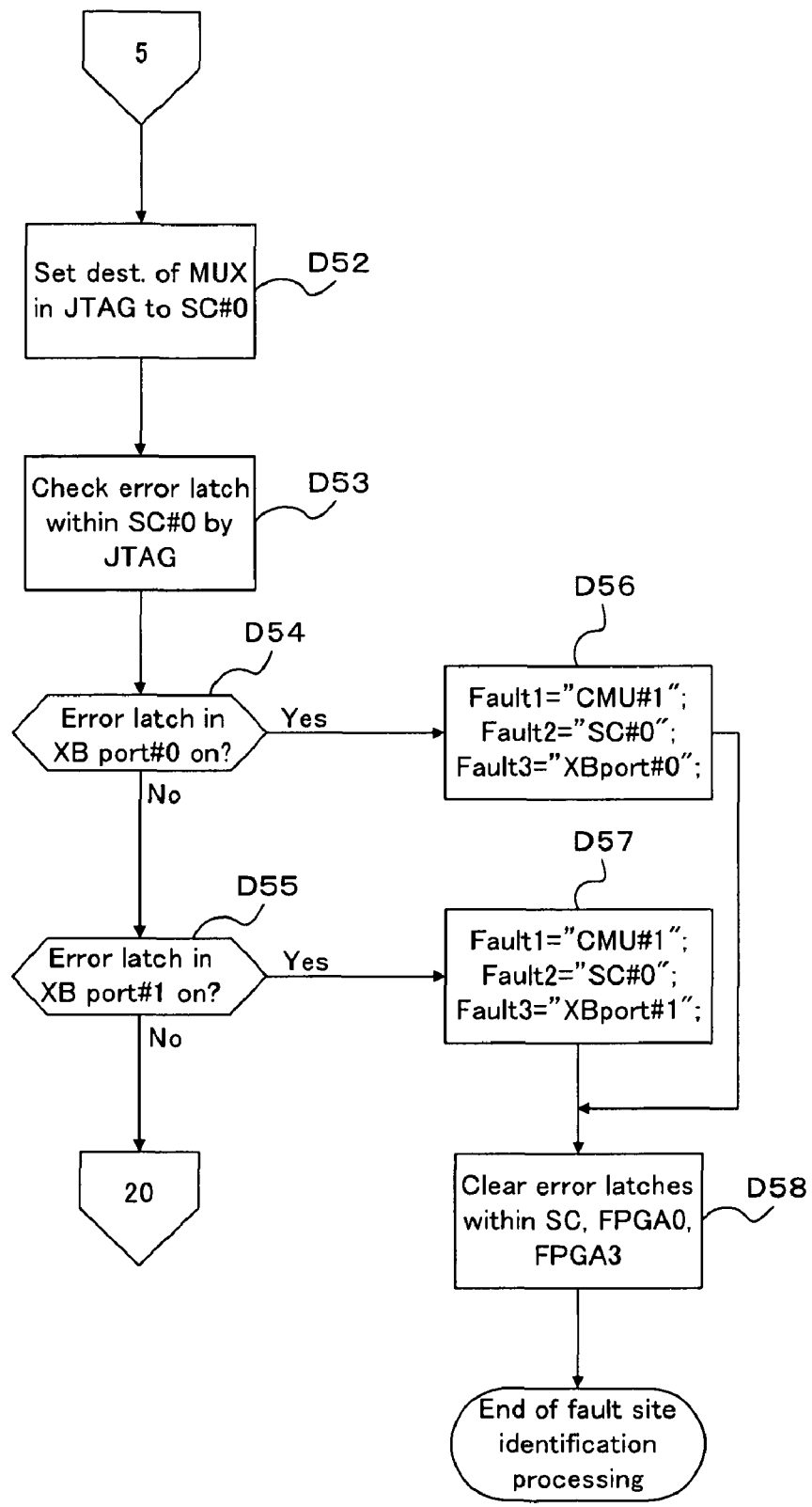
FIG. 28 is a flowchart illustrating the fault site identification technique in the server as one example of an embodiment.
Figure 29:
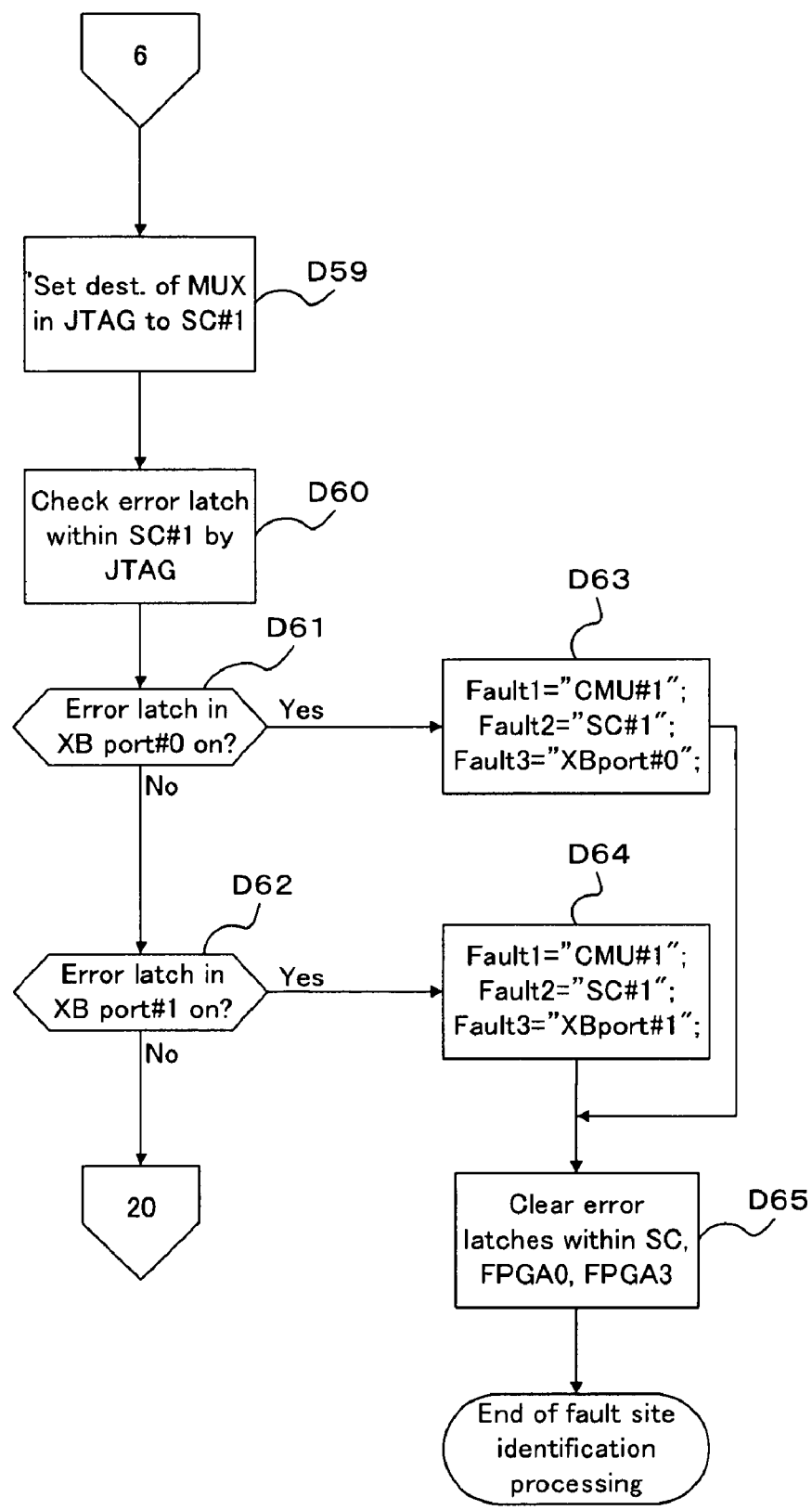
FIG. 29 is a flowchart illustrating the fault site identification technique in the server as one example of an embodiment.
Figure 30:
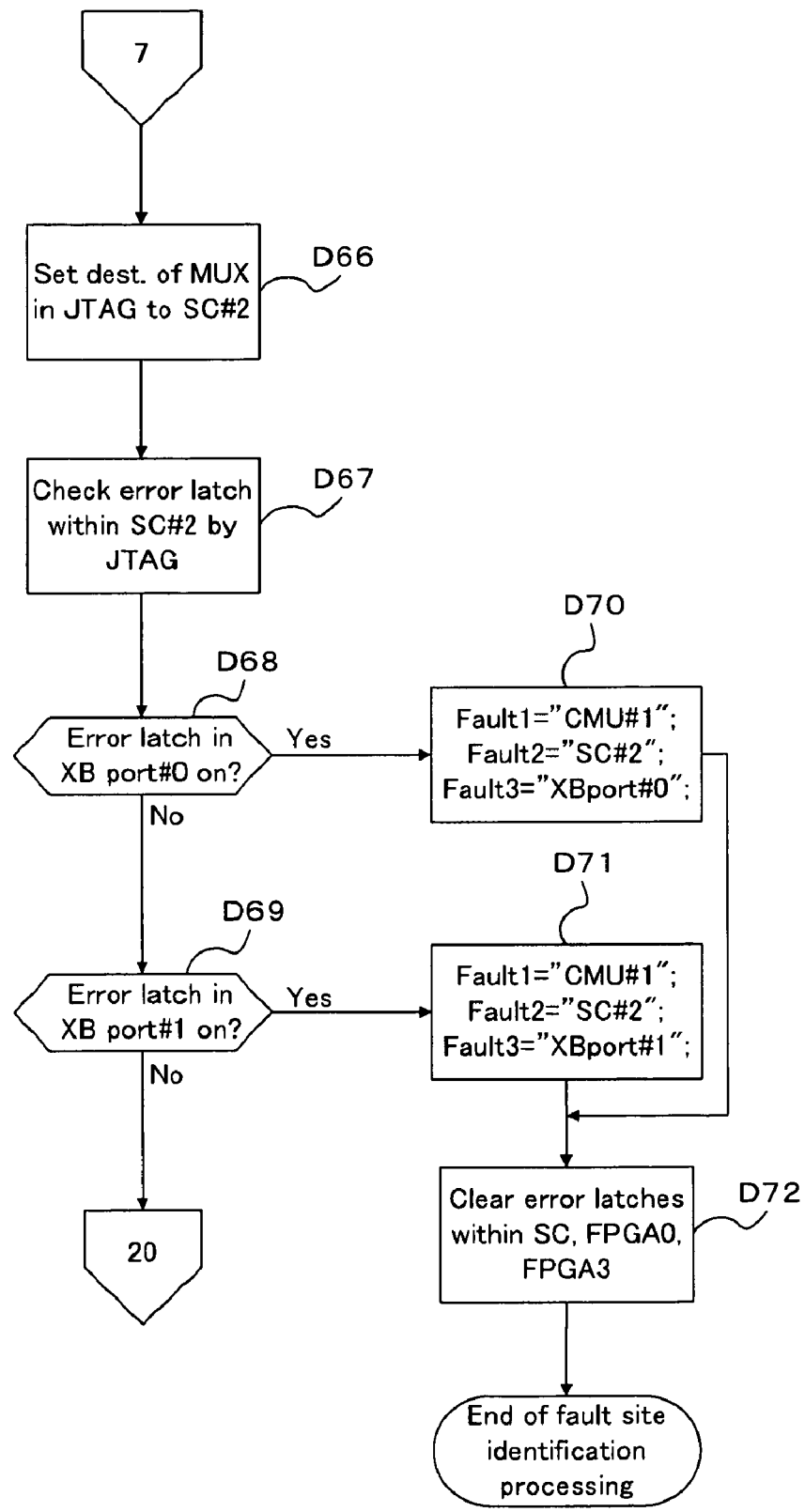
FIG. 30 is a flowchart illustrating the fault site identification technique in the server as one example of an embodiment.
Figure 31:
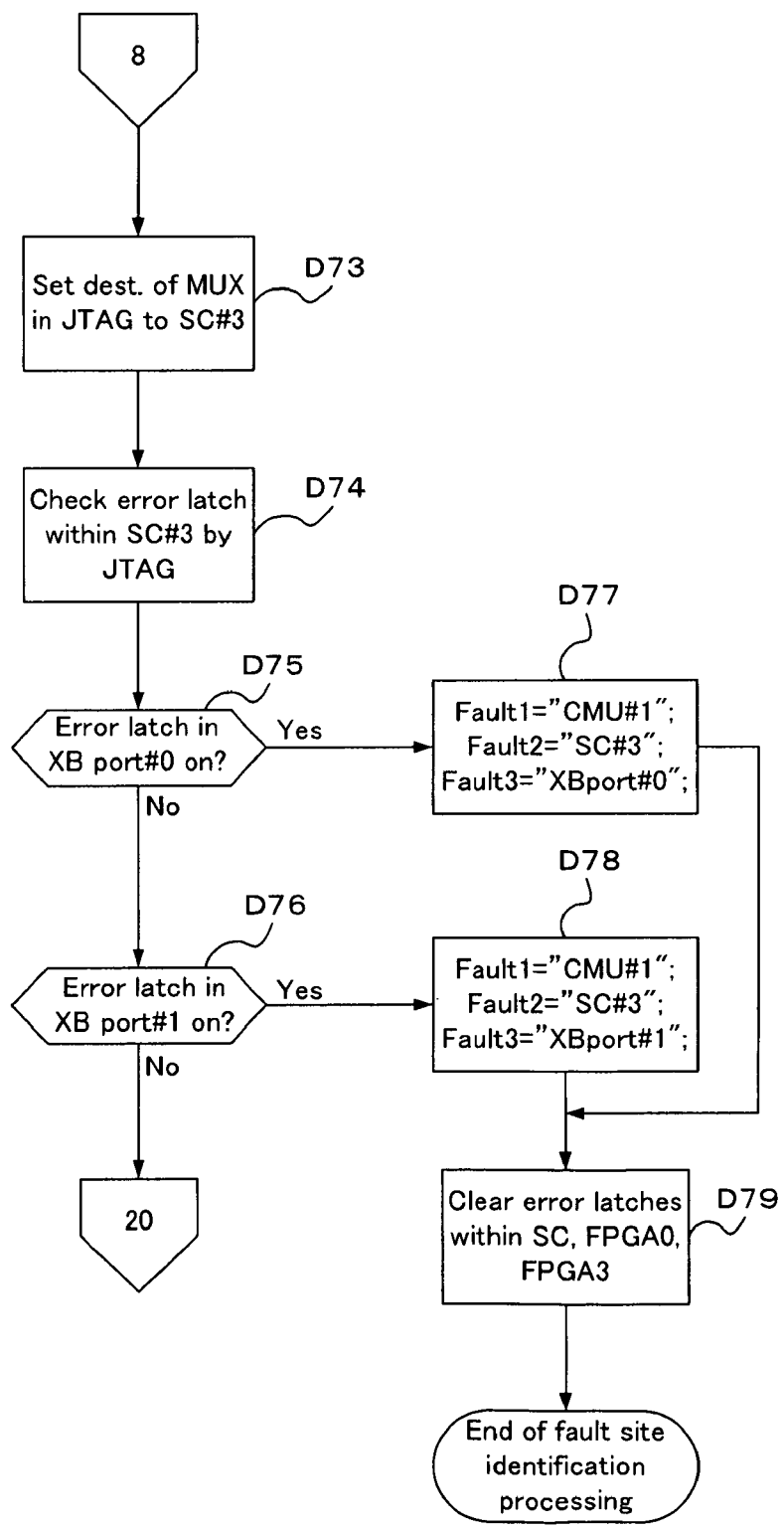
FIG. 31 is a flowchart illustrating the fault site identification technique in the server as one example of an embodiment.
Figure 32:
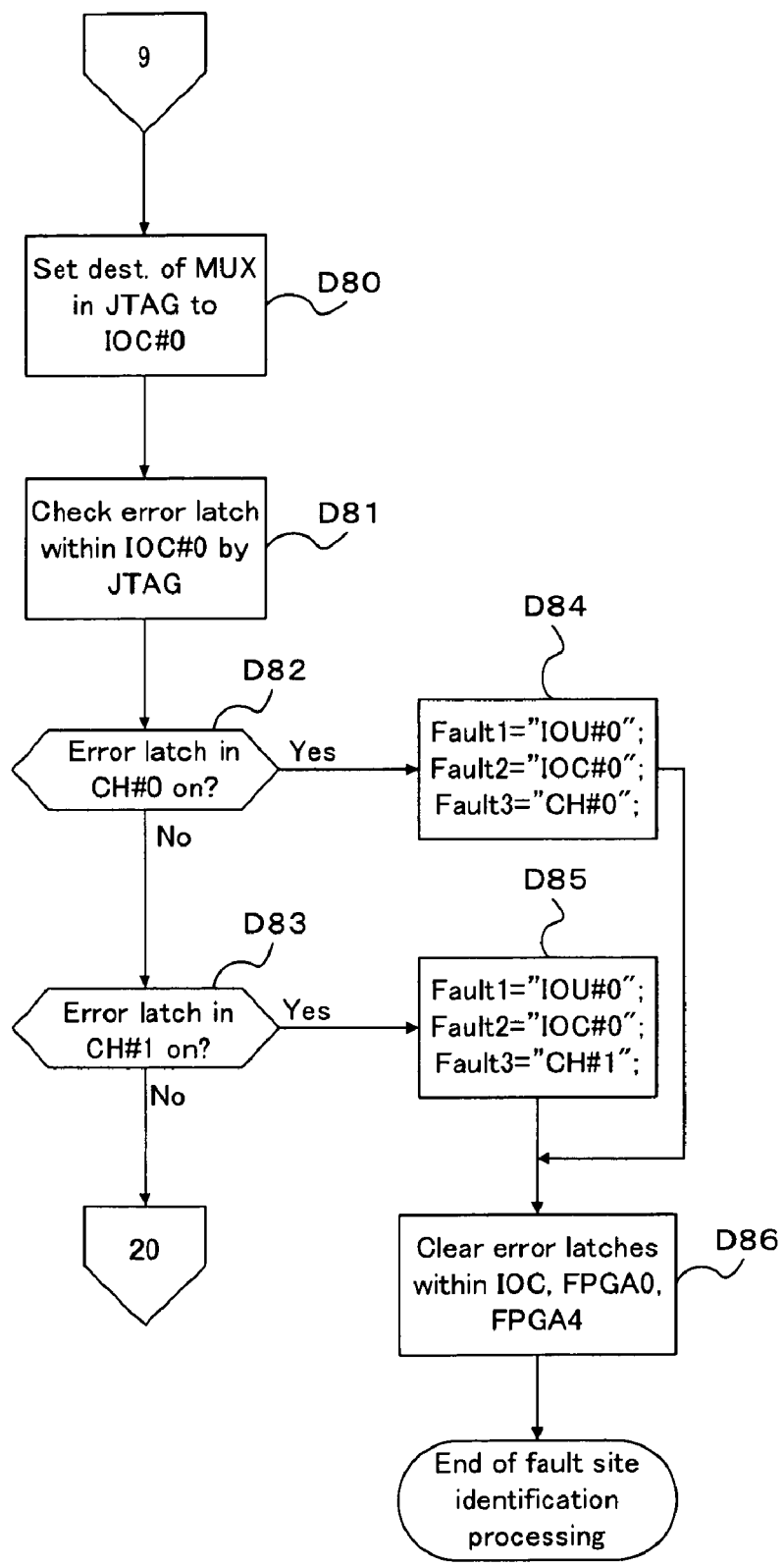
FIG. 32 is a flowchart illustrating the fault site identification technique in the server as one example of an embodiment.
Figure 33:
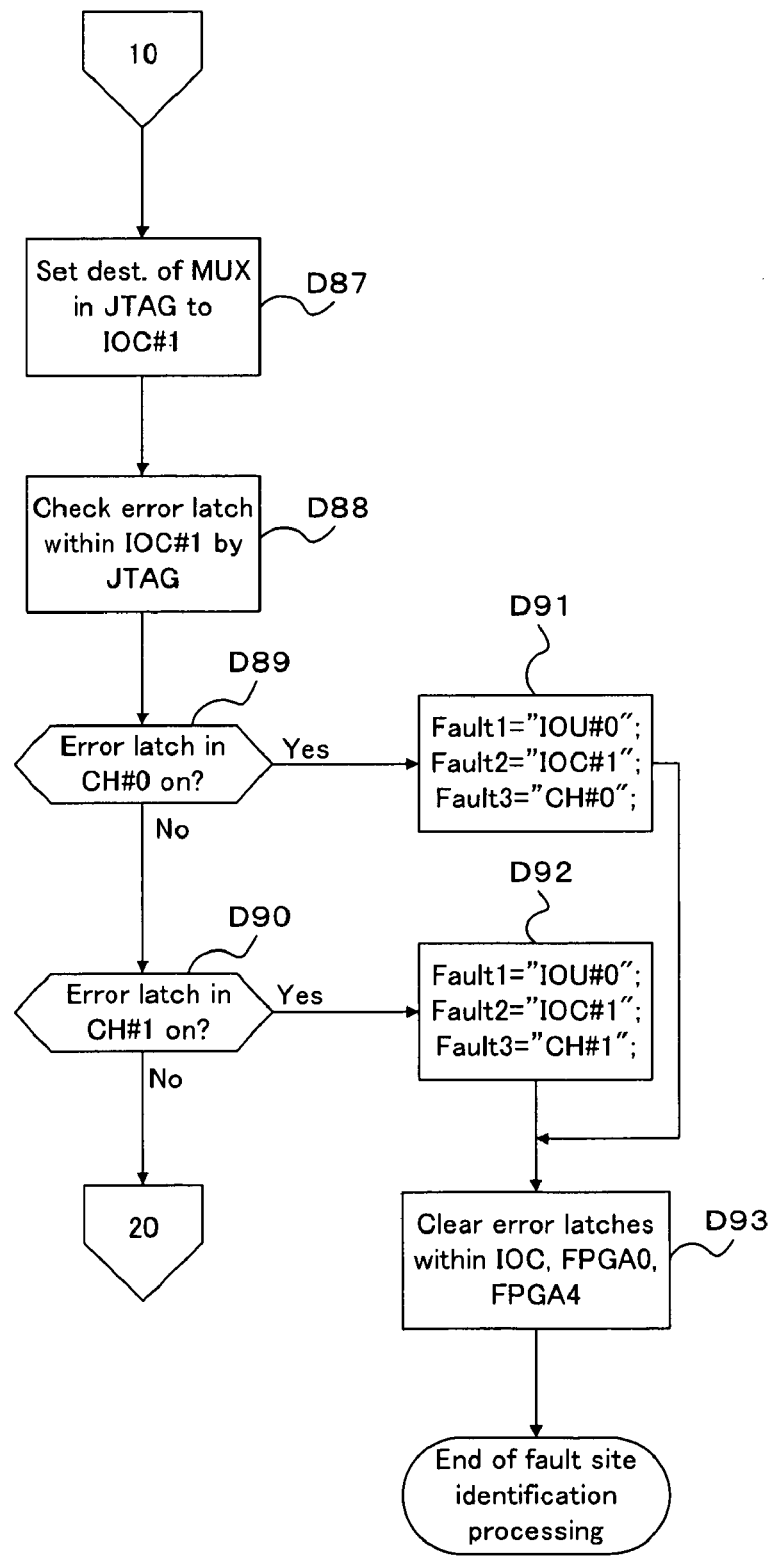
FIG. 33 is a flowchart illustrating the fault site identification technique in the server as one example of an embodiment.
Figure 34:
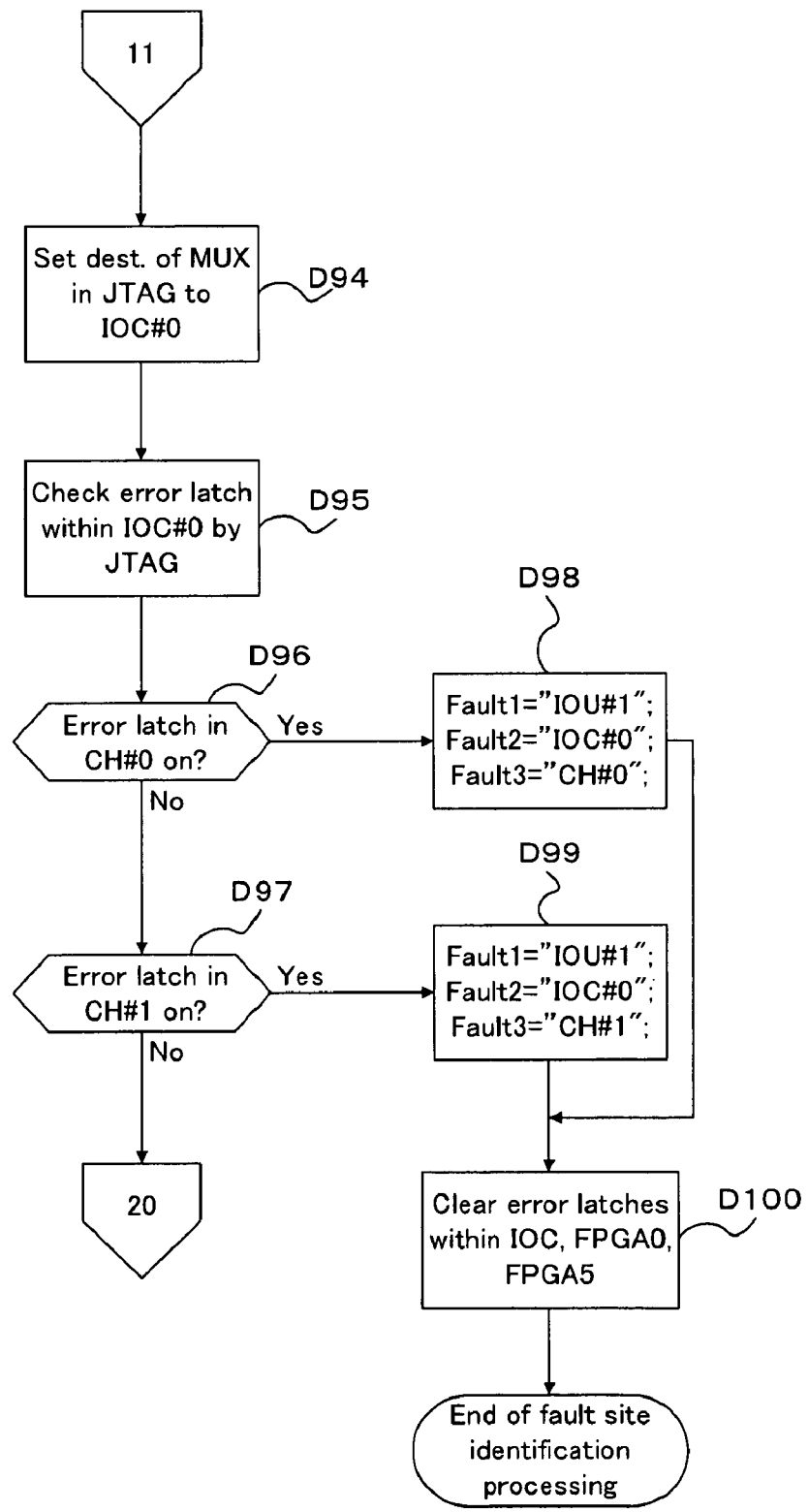
FIG. 34 is a flowchart illustrating the fault site identification technique in the server as one example of an embodiment.
Figure 35:
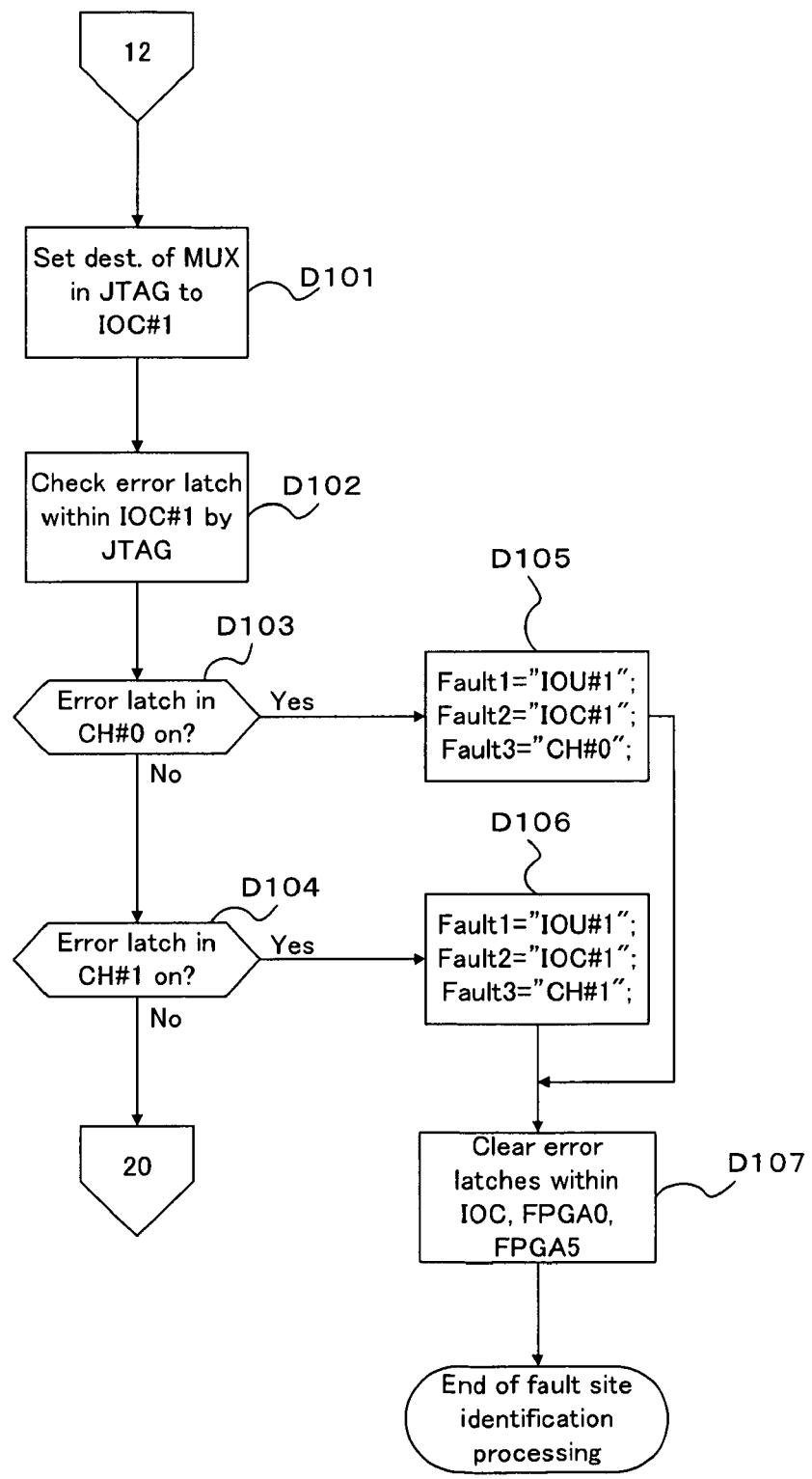
FIG. 35 is a flowchart illustrating the fault site identification technique in the server as one example of an embodiment.
Figure 36:
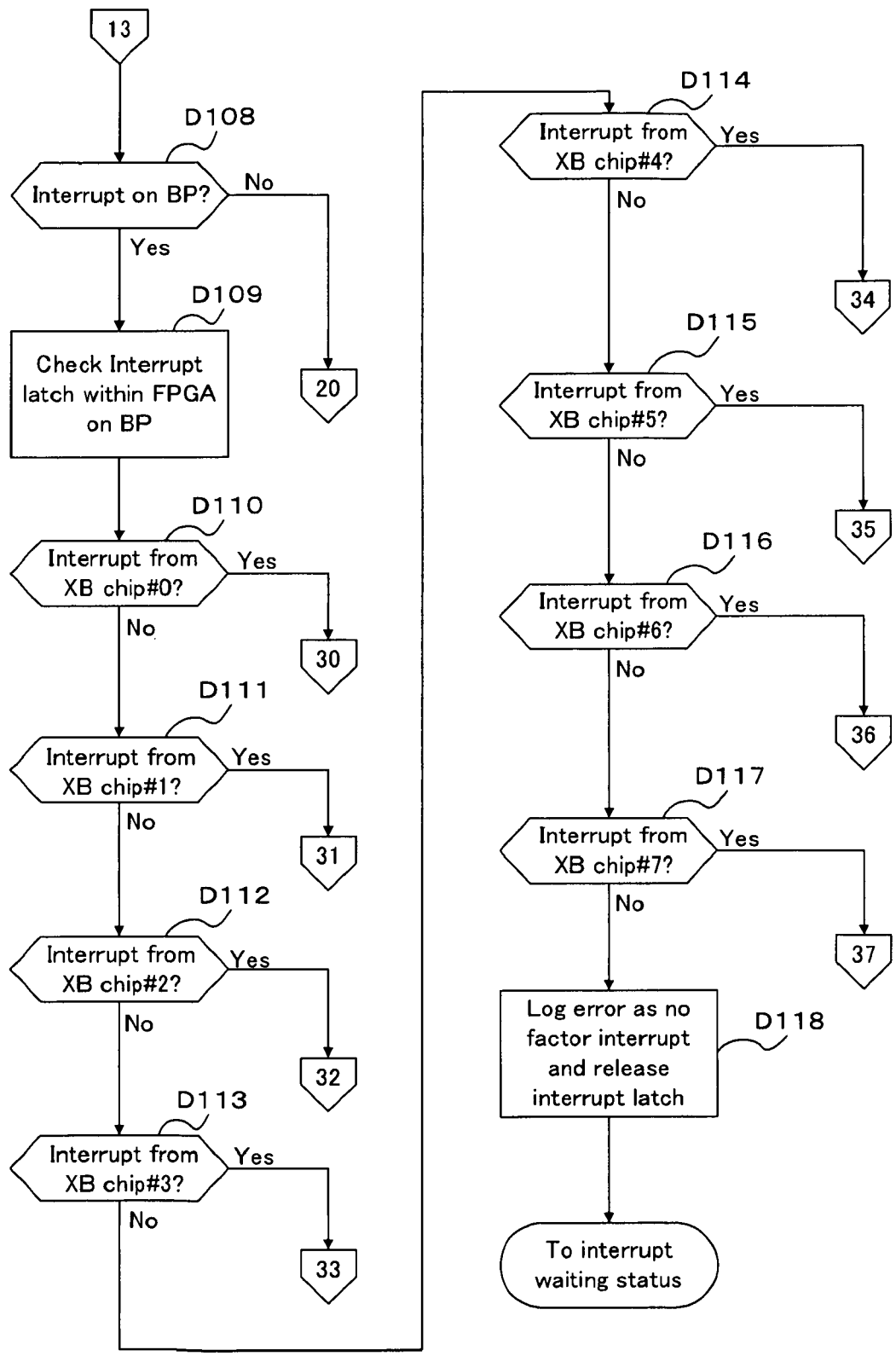
FIG. 36 is a flowchart illustrating the fault site identification technique in the server as one example of an embodiment.
Figure 37:
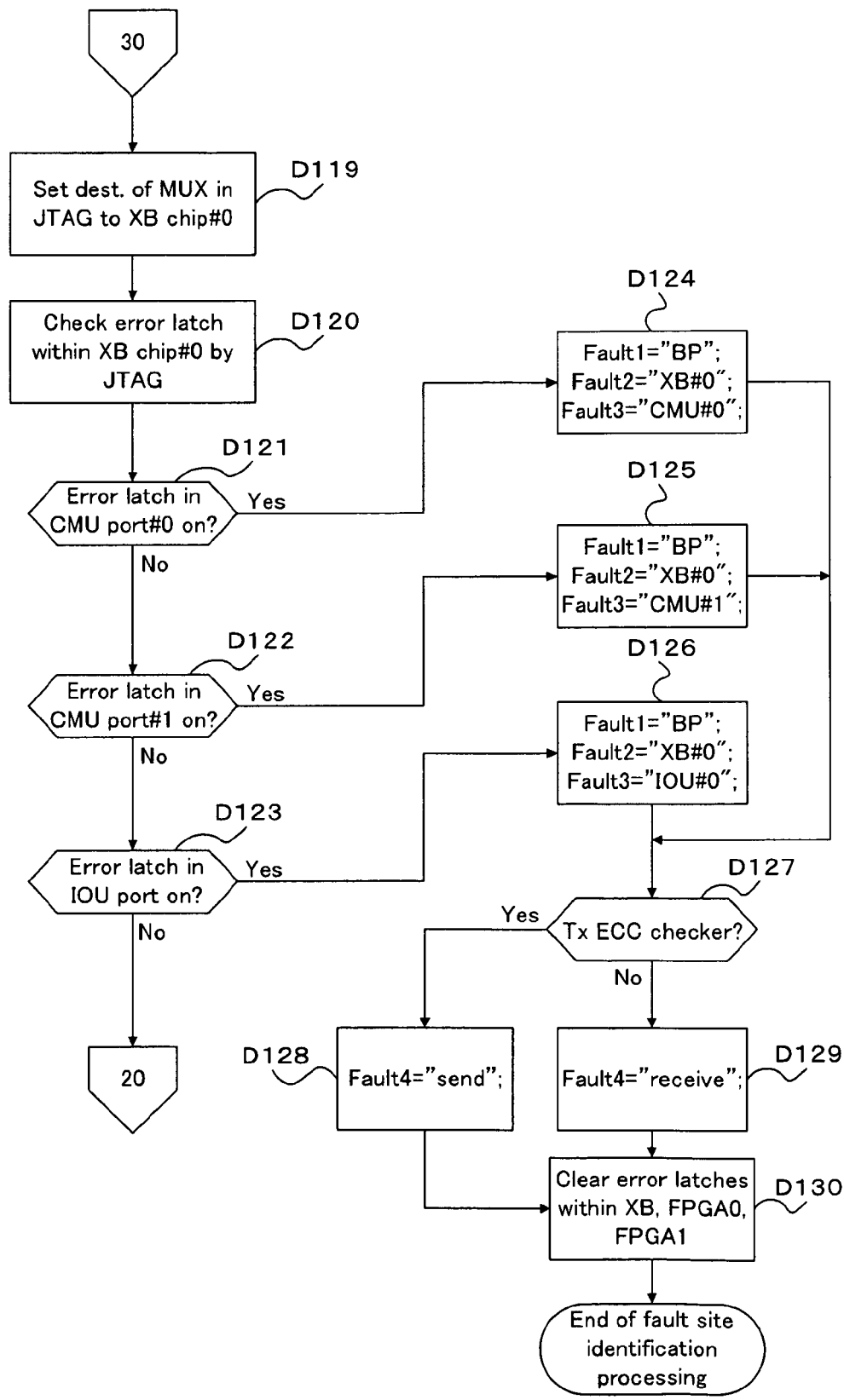
FIG. 37 is a flowchart illustrating the fault site identification technique in the server as one example of an embodiment.
Figure 38:
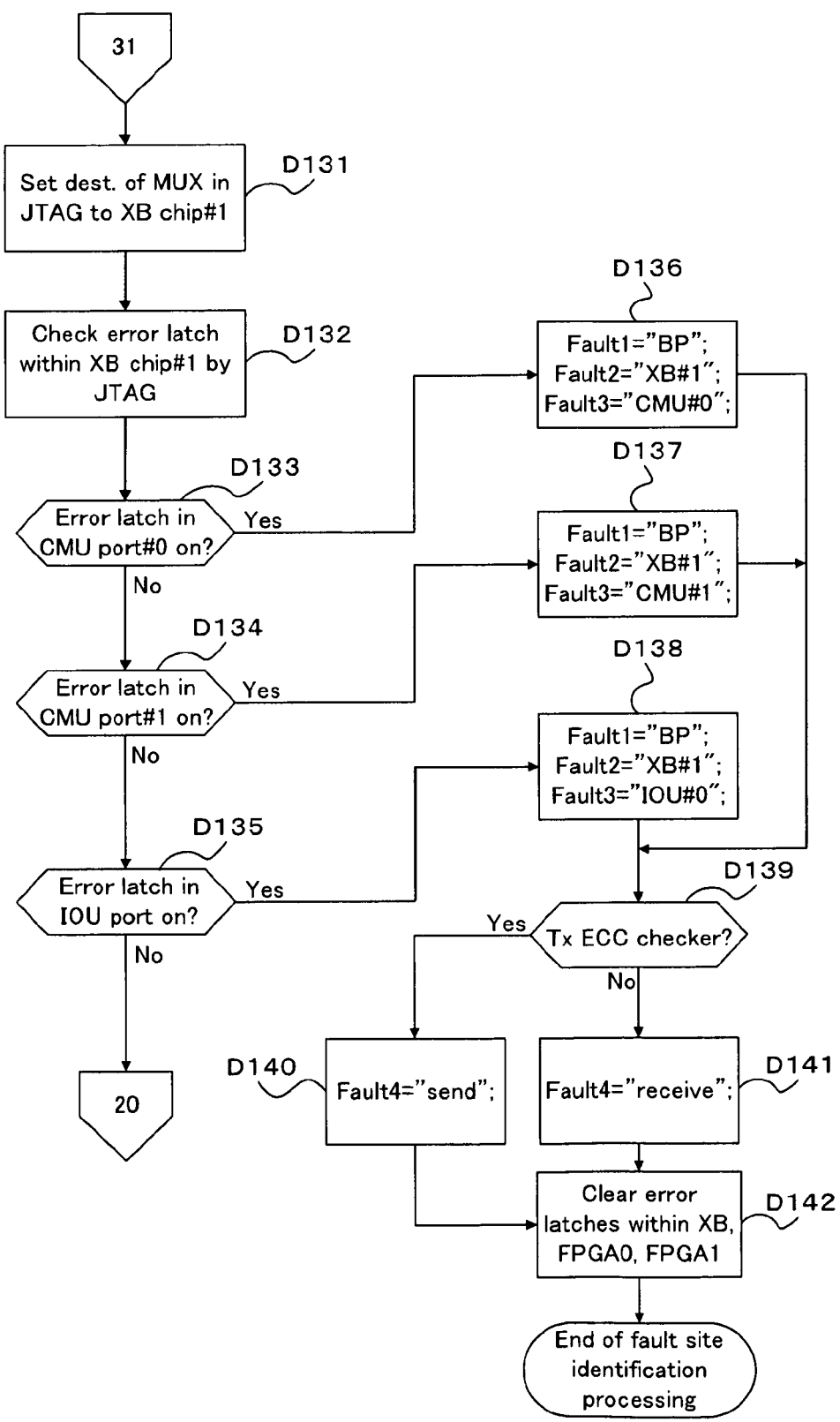
FIG. 38 is a flowchart illustrating the fault site identification technique in the server as one example of an embodiment.
Figure 39:
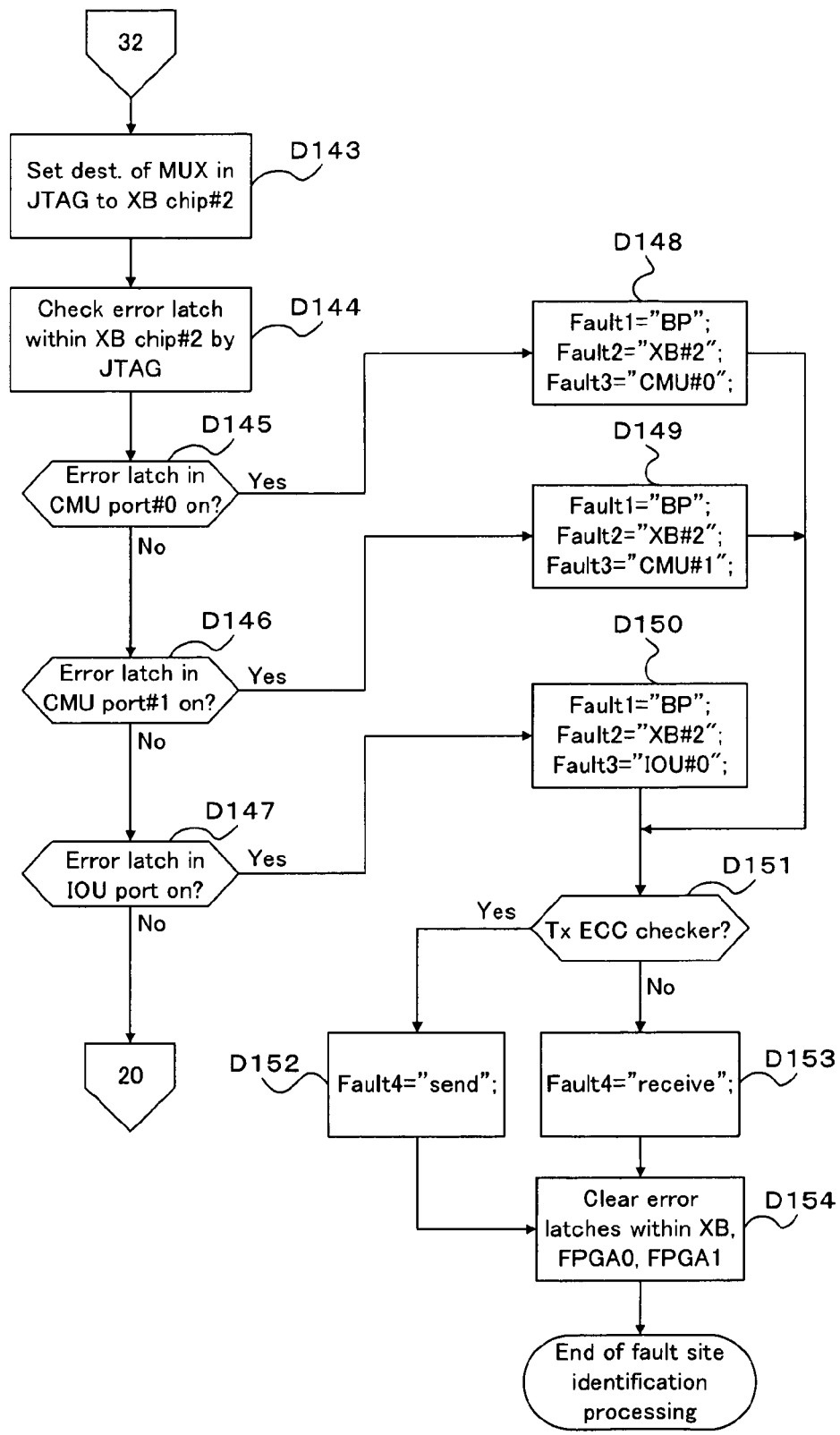
FIG. 39 is a flowchart illustrating the fault site identification technique in the server as one example of an embodiment.
Figure 40:
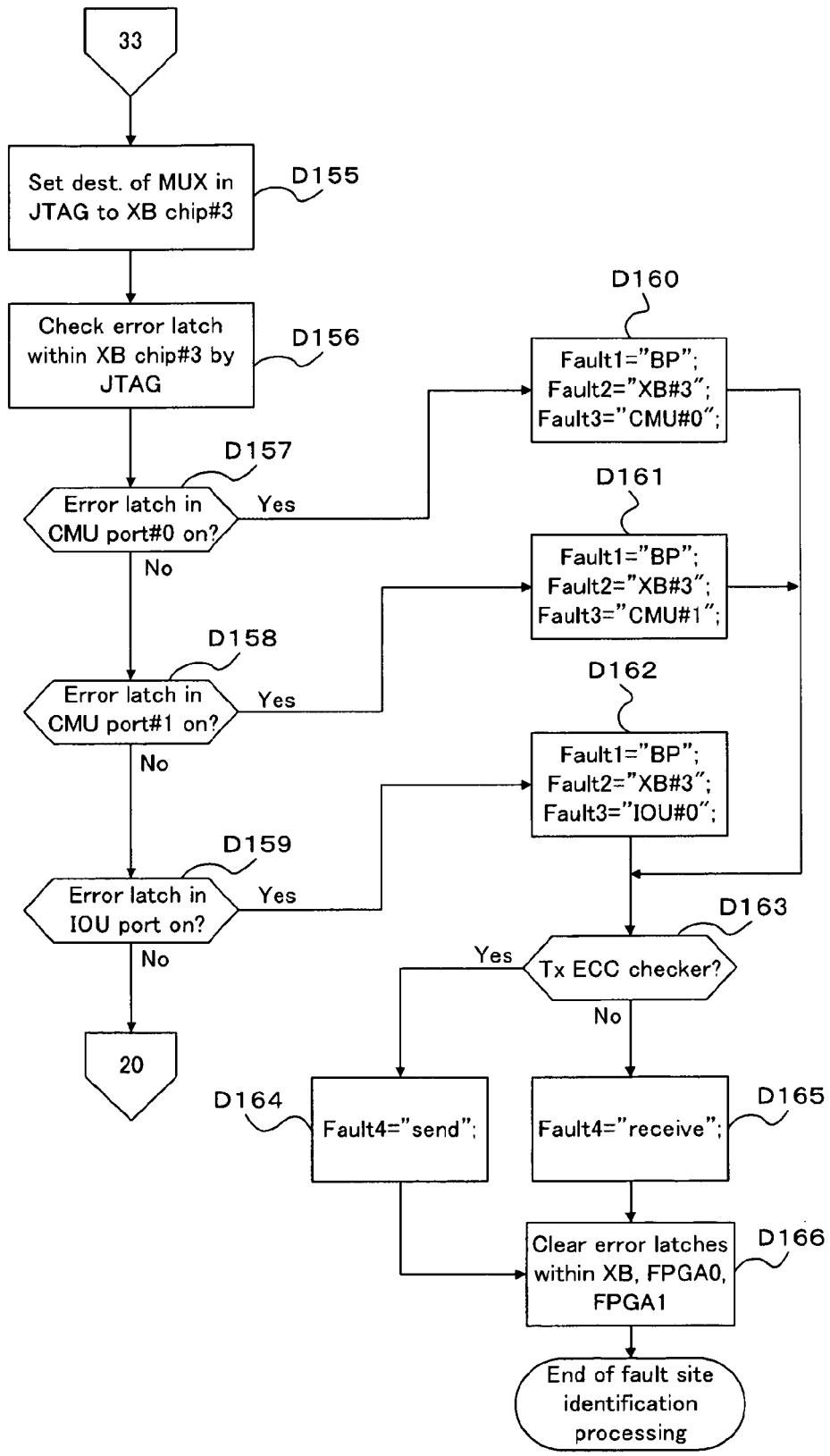
FIG. 40 is a flowchart illustrating the fault site identification technique in the server as one example of an embodiment.
Figure 41:
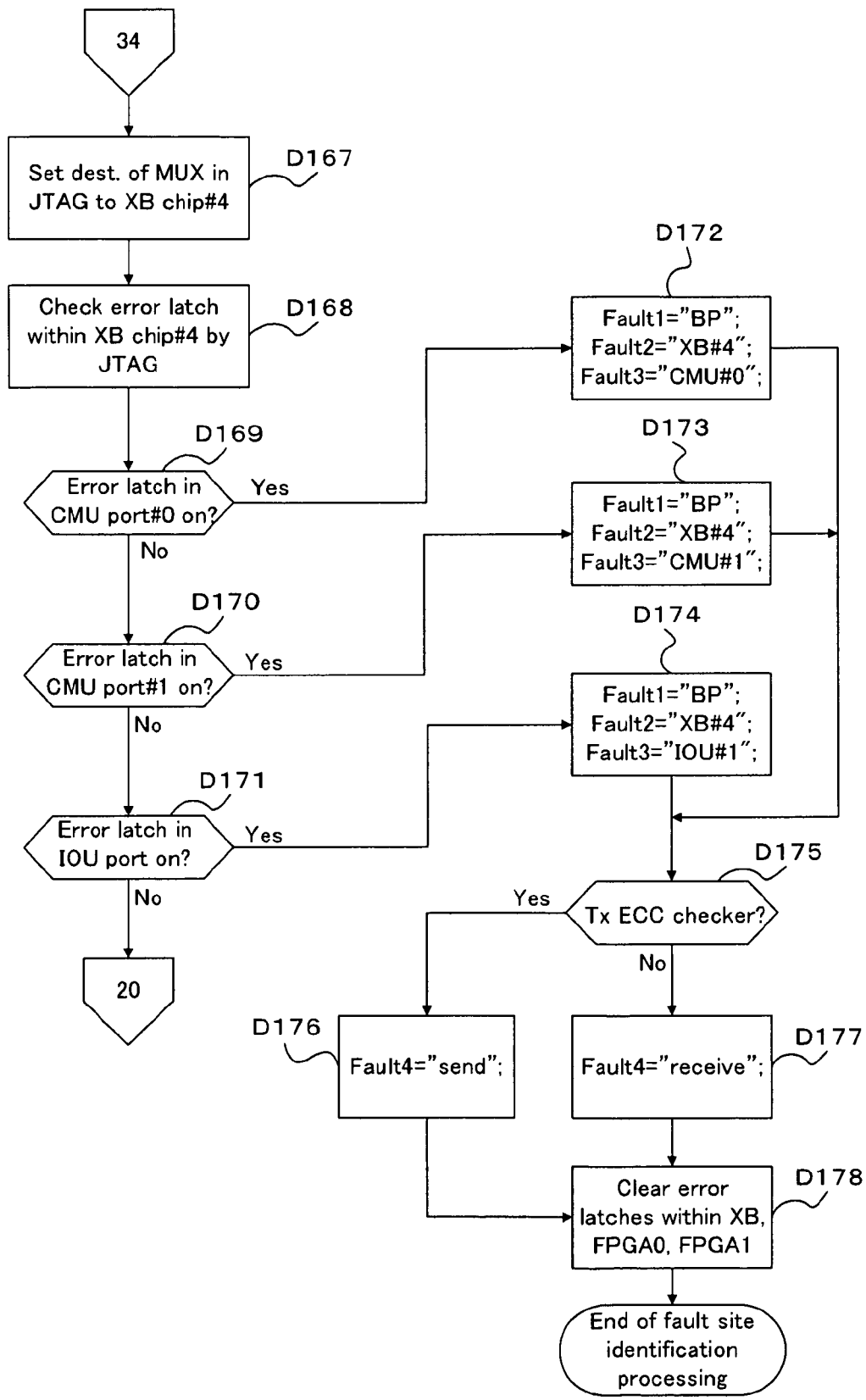
FIG. 41 is a flowchart illustrating the fault site identification technique in the server as one example of an embodiment.
Figure 42:
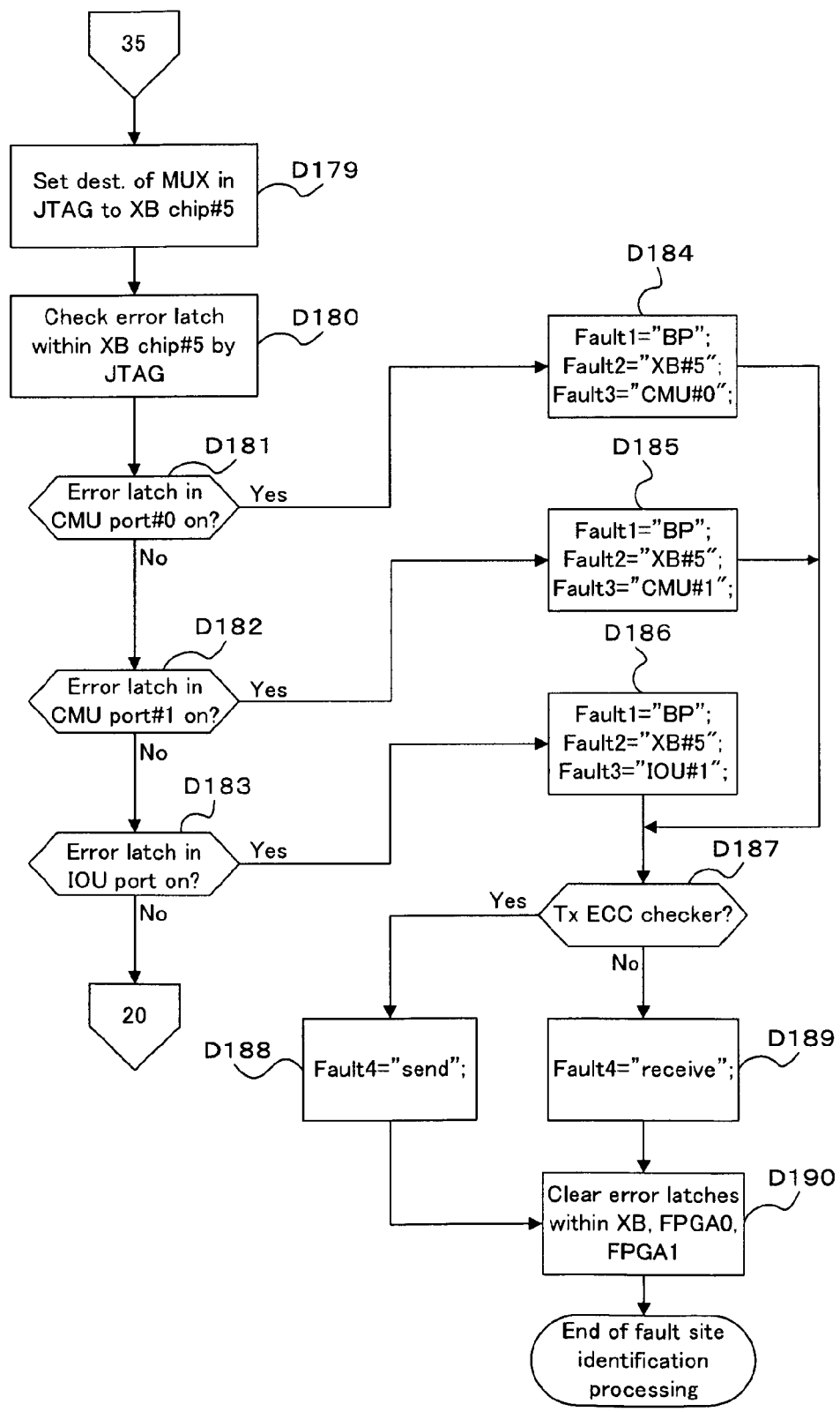
FIG. 42 is a flowchart illustrating the fault site identification technique in the server as one example of an embodiment.
Figure 43:
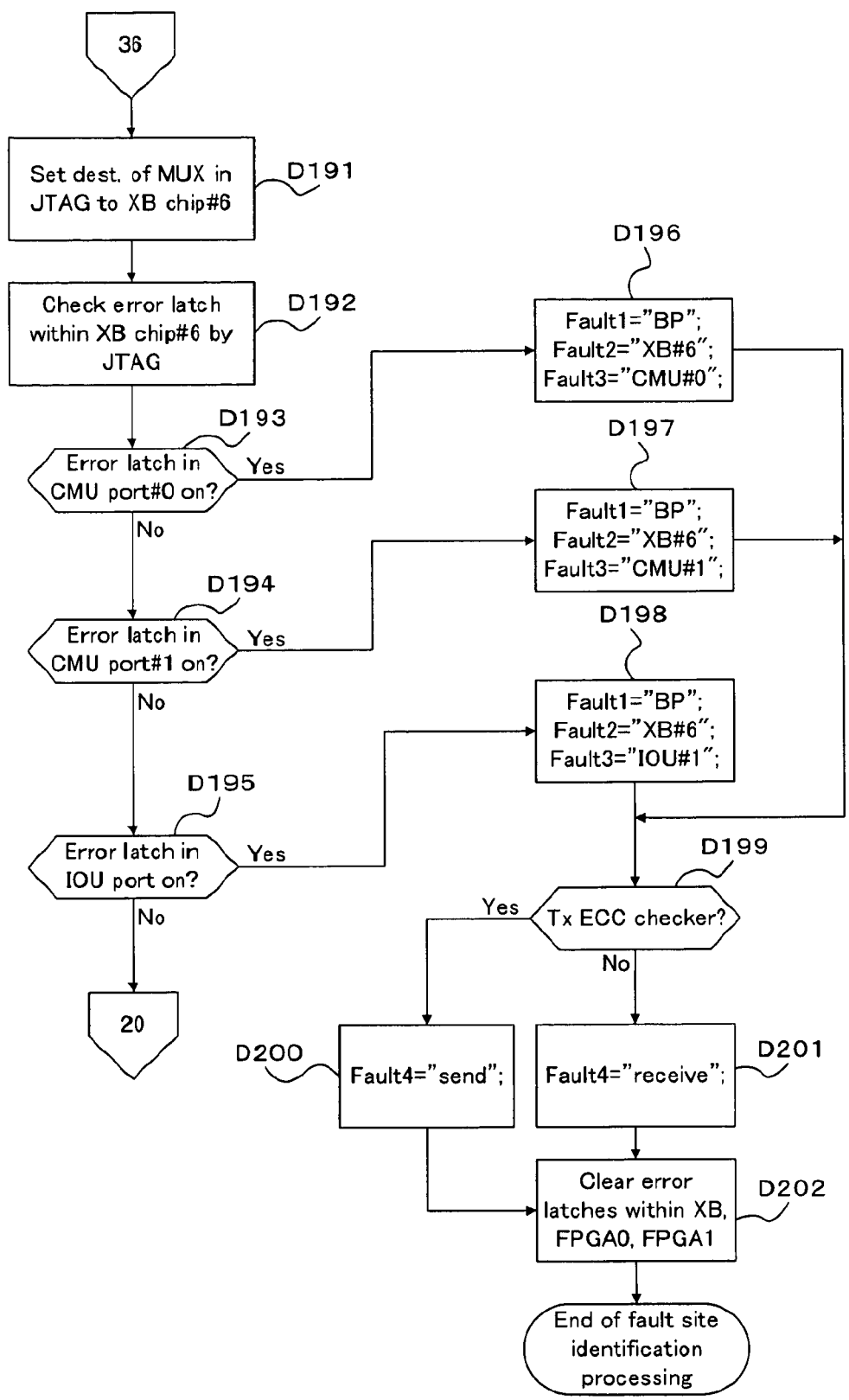
FIG. 43 is a flowchart illustrating the fault site identification technique in the server as one example of an embodiment.
Figure 44:
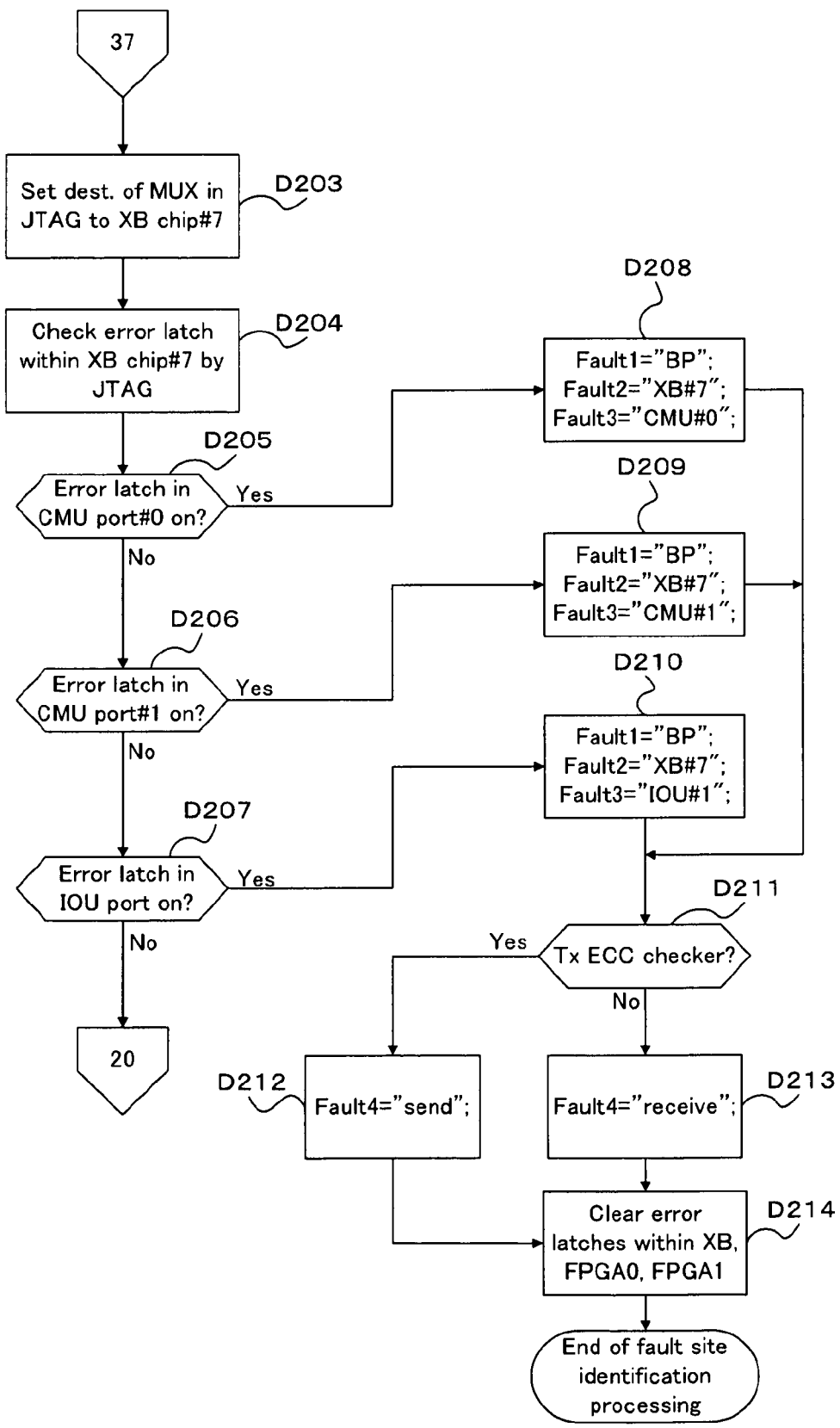
FIG. 44 is a flowchart illustrating the fault site identification technique in the server as one example of an embodiment.

FIG. 22 is a flowchart illustrating exemplary processing upon occurrence of a hardware abnormality in the server 10 (Step C10-C40), illustrating a schematic flow of how the fault site is identified and degenerated is carried out.

When an interrupt is raised by an ASIC, the fault site is identified (Step C10), and the site to be isolated is determined (Step C20). Then system restart extent determination processing is executed (Step C30), and the system restart processing is executed (Step C40), thereby achieving a recovery from the interrupt.

Each of the techniques in Steps C10-C40 depicted in FIG. 22 will be described in detail. Hereinafter, the respective flowcharts, Fault1, Fault2, Fault3, Fault4, Target[ ] array, and Degrade are all global variables whereas variables represented by one lower-case alphabetical character represent local variables.

The fault site identification technique in Step C10 in the flowchart depicted in FIG. 22 will be described with reference to flowcharts depicted in FIGS. 23-44 (steps D1-D214).

When a failure (an ECC multi-bit error on the bus) occurs, an interrupt is raised to the service processor 20 through the FPGA. In response, the program on the microprocessor 21 controls the multiplexer in the FPGA 0, and identifies the error latch on which FPGA is turned on (steps D1-D23). This process enables to identify the interrupt is raised from which chip in which unit.

Then, the multiplexer of the FPGA of each unit is controlled, and the JTAG of the chip raising the interrupt is accessed to check the error latch in the chip (steps D24-D214). This processing enables to identify which bus (for example, the XB port #0 in the XB chip #3) is related to the abnormality.

In addition, during the above-identified processing, the identified fault site and bus are set to the global variables Fault1, Fault2, Fault3, and Fault4. The details of the processing for fault site identification have been described.

Figure 45:
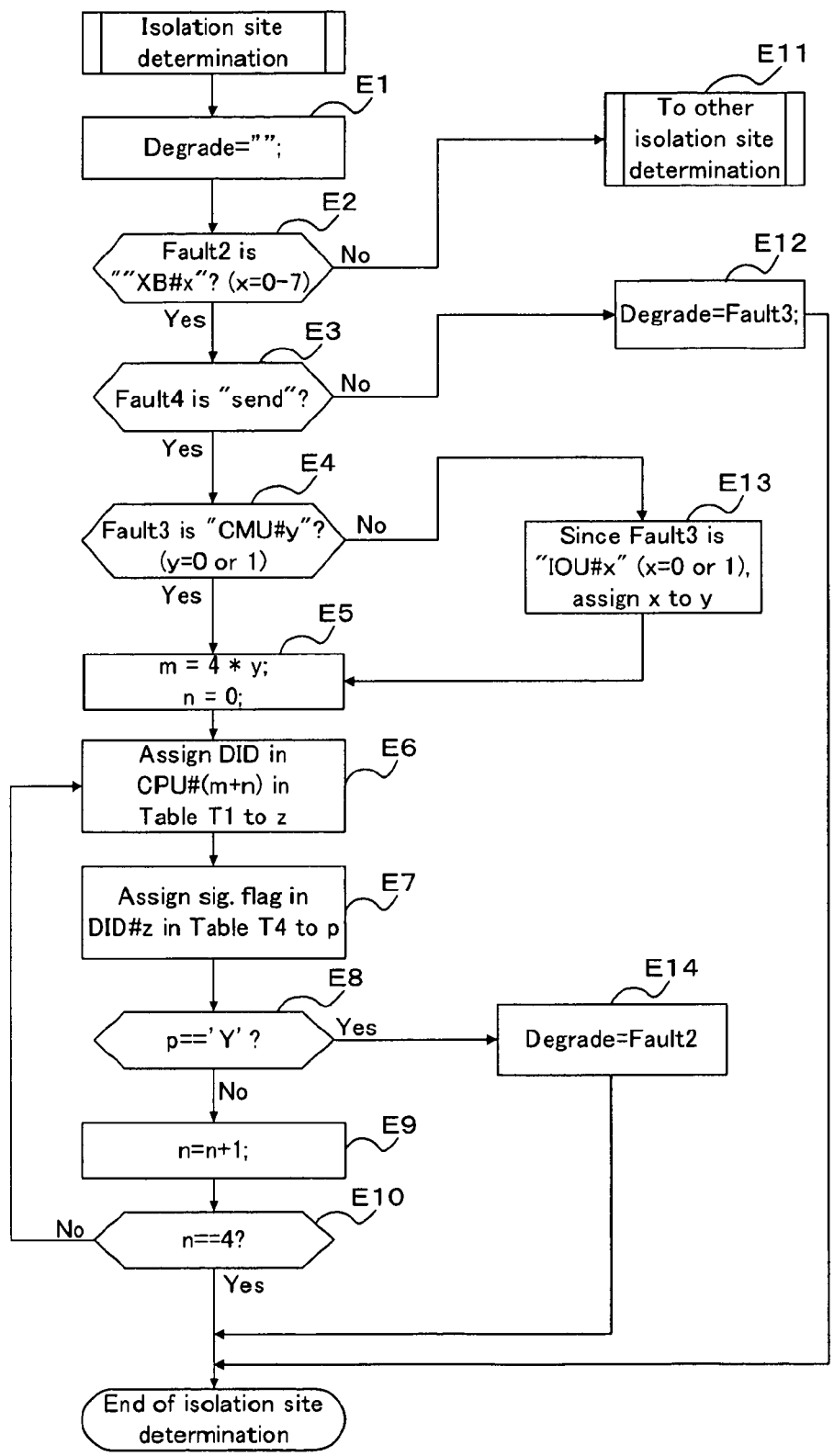
FIG. 45 is a flowchart illustrating isolation site determination processing in the server as one example of an embodiment.

The isolation site determination technique in Step C20 in the flowchart depicted in FIG. 22 will be described with reference to a flowchart depicted in FIG. 45 (steps E1-E14).

Since this embodiment focuses on processing upon occurrence of a failure in the common unit 14a in the server 10, the description will be provided in the context of an abnormality in the common unit 14a, i.e., the XB chip.

First, the variable Degrade is defined wherein the unit to be degraded is set to the variable Degrade (Step E1).

The valuable Fault2 is checked to see whether Fault2 is XB#x (x is an integer from 0 to 7), i.e., Fault2 is one of XB#0-XB#7 (Step E2). If Fault2 is not one of XB#0-XB#7 (see the "no" route from Step E2), the flow transitions to the other isolation site determination processing (Step E11).

Otherwise, if Fault2 is one of XB#0-XB#7 (see the "yes" route from Step E2), it is determined whether or not the variable Fault4 is "send" (Step E3). If Fault4 is not "send," i.e., Fault4 is "receive" (see the "no" route from Step E3), the variable Degrade is set to Fault3. As described above, since the failure has occurred outside of the XB chip, i.e., on the side of the SC, the failure is not treated as a failure in the common unit 14a.

Otherwise, if Fault4 is "send" (see the "yes" route from Step E3), it is determined that the abnormality has occurred in the common unit 14a and then it is checked whether or not Fault3 is CMU#y (y is 0 or 1) (Step E4). If Fault3 is CMU#0 or CMU#1 (see the "yes" route from Step E4), m=4*y and n=0 are set (Step E5).

If Fault3 is neither CMU#0 nor CMU#1 (see the "no" route from Step E4), x is assigned to y since Fault3 is IOU#x (x is 0 or 1), and the flow transitions to Step E5.

Since the abnormality has occurred related to the unit and XB indicated by Fault3, the domain that is present on the unit is determined. More specifically, the DID number corresponding to the CPU #(m+n) in the Table T1 (see FIG. 2) (the numerical value following DID#) is assigned to valuable z (Step E6).

The significance flag in the column DID#z in the Table T4 (see FIG. 5) is assigned to valuable p (Step E7), and the significance flag of the domain affected by the failure is checked by using the Table 4 by determining whether p==y is evaluated as true (Step E8).

If p==y is evaluated as true, i.e., the significance flag is on (see the "yes" route from Step E8), the entire system is suspended. Accordingly, the value "XB#x" (x is one integer from 0 to 7) to the variable Degrade for indicating the entity to be isolated (Step E14). Note that if the entity to be isolated is an XB, the system restart extent determination processing that will be described later is applied for the entire system.

Otherwise, if p==y is evaluated as false (see the "no" route from Step E8), the variable n is incremented by one (n=n+1) (Step E9), and determines whether or not n==4 is evaluated as false (see the "no" route from Step E10), and the flow goes back to Step E6. Otherwise, if n==4 is evaluated as true (see the "yes" route from Step E10), the isolation site determination process is completed and the value set in the variable Degrade now indicate the unit to be isolated.

Next, the system restart extent determination processing technique in Step C30 in the flowchart depicted in FIG. 22 will be described with reference to flowcharts depicted in FIG. 46 (Steps F1-F16). The system restart extent determination processing determines the domain(s) to be restarted, and the domain(s) affected by the abnormality and to be restarted is set in the global array variable Target[ ].

The value "−1" is set to the global array variables Target[0], Target[1], Target[2], and Target[3] (Step F1), and it is determined whether or not Degrade==XB#x is evaluated as true (x is one integer from 0-7) (Step F2). If Degrade==XB#x holds true (x is one integer from 0-7) (see the "yes" route from Step F2), the value 99 is set to Target[0] (Step F6) and processing is terminated. Target[0] is set to 99 for restarting the entire system.

If Degrade==XB#x is evaluated as false (x is one integer from 0-7) (see the "no" route from Step F2), it is evaluated whether Fault1==CMU#y holds true (y is 0 or 1) (Step F3). If Fault1==CMU#y is evaluated as true (y is 0 or 1) (see the "yes" route from Step F3), m=4*y, n=0, and p=0 are set (Step F4), the DID number corresponding to the CPU # (m+n) (the column of CPU #(m+n)) (the numerical value following DID#) in the Table T1 (see FIG. 2) is assigned to the valuable z (Step F5).

If Fault1==CMU#y is evaluated as false (y is 0 or 1) (see the "no" route from Step F3), it is evaluated whether or not Fault1==IOU#y holds true (y is 0 or 1) (Step F7).

If Fault1==IOU#y is evaluated as false (y is 0 or 1) (see the "no" route from Step F7), it is evaluated whether or not Fault1==CMU#y holds true (y is 0 or 1) (Step F8).

In the case when Fault1==IOU#y (y is 0 or 1) holds true (see the "yes" route from Step F7), or Fault1==CMU#y (y is 0 or 1) holds true (see the "yes" route from Step F8), the flow transitions to Step F4.

Otherwise, if Fault1==CMU#y is evaluated as false (y is 0 or 1) (see the "no" route from Step F8), x is assigned to y (Step F9) since Fault3 is IOU#x (x is 0 or 1), and the flow transitions to Step F4.

Thereafter, it is evaluated whether or not z==Target[0] holds true (Step F10), and if z==Target[0] is evaluated as false (see the "no" route from Step F10), z==Target[1] is evaluated (Step F11) if z==Target[1] holds false (see the "no" route from Step F11), z==Target[2] is evaluated (Step F12). If z==Target[2] holds false (see the "no" route from Step F12), z==Target[3] is evaluated (Step F13), and if z==Target[3] hold false (see the "no" route from Step F13), the value z is assigned to Target[p] (Target [p]=z) and the variable p is incremented by one (p=p+1) (Step F14); then n is incremented by one (n=n+1) (Step F15).

Note that when z==Target[0] holds true (see the "yes" route from Step F10), or when ==Target[1] holds true (see the "yes" route from Step F11), or z==Target[2] holds true (see the "yes" route from Step F12), or z==Target[3] holds true (see the "yes" route from Step F13), the flow transitions to Step F15.

Then it is checked whether or not n==4 holds true (Step F16), when n==4 is evaluated as false (see the "no" route from Step F16), the flow goes back to Step F10. Otherwise, when n==4 holds true (see the "yes" route from Step F16), processing is terminated.

In this embodiment, since the unit to be degenerated and the unit to be restarted both agrees, except for the case of the entire system restart, a domain(s) to be restarted are selected using the Degrade variable as a key. Note that the reason why processing is executed on the domain basis is that the CPU #0 of the CMU#0 is also needed to be restarted if, for example, the CPU #0 of the CMU#0 and the CPU #1 of the CMU#1 belong to the same domain and the unit to be restarted is the CMU#1.

Figure 47:
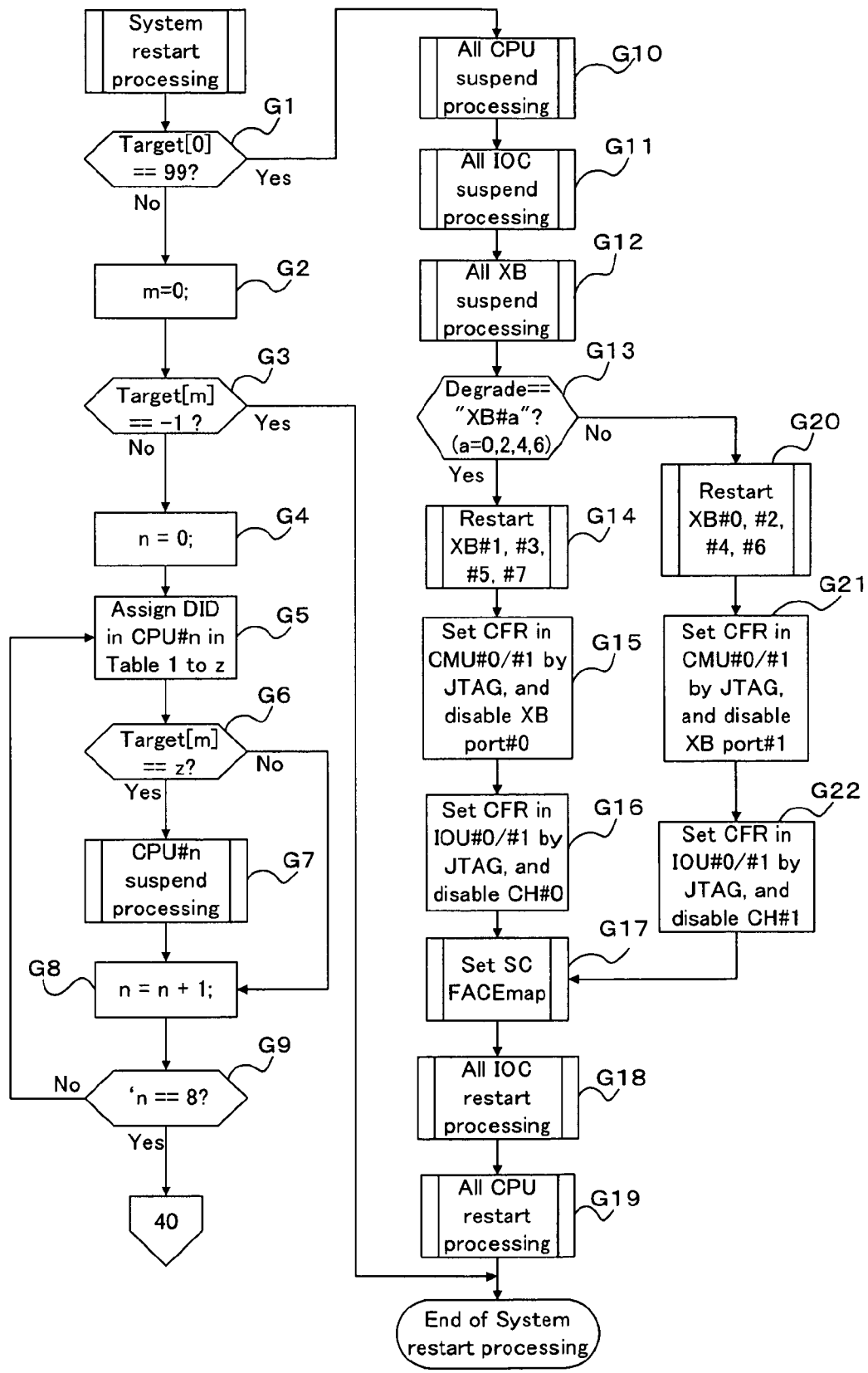
FIG. 47 is a flowchart illustrating the system restart processing technique in the server as one example of an embodiment.
Figure 48:
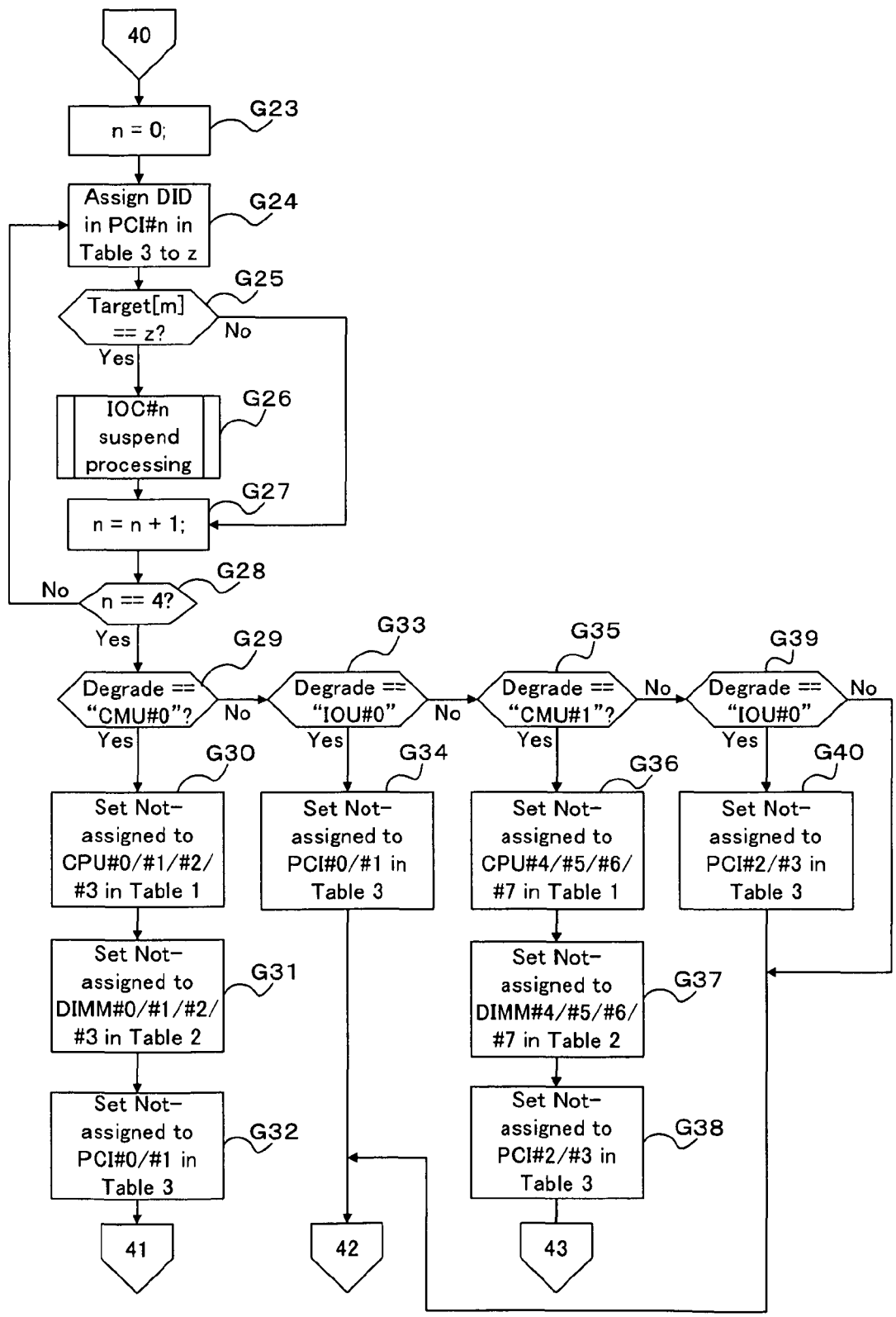
FIG. 48 is a flowchart illustrating the system restart processing technique in the server as one example of an embodiment.
Figure 49:
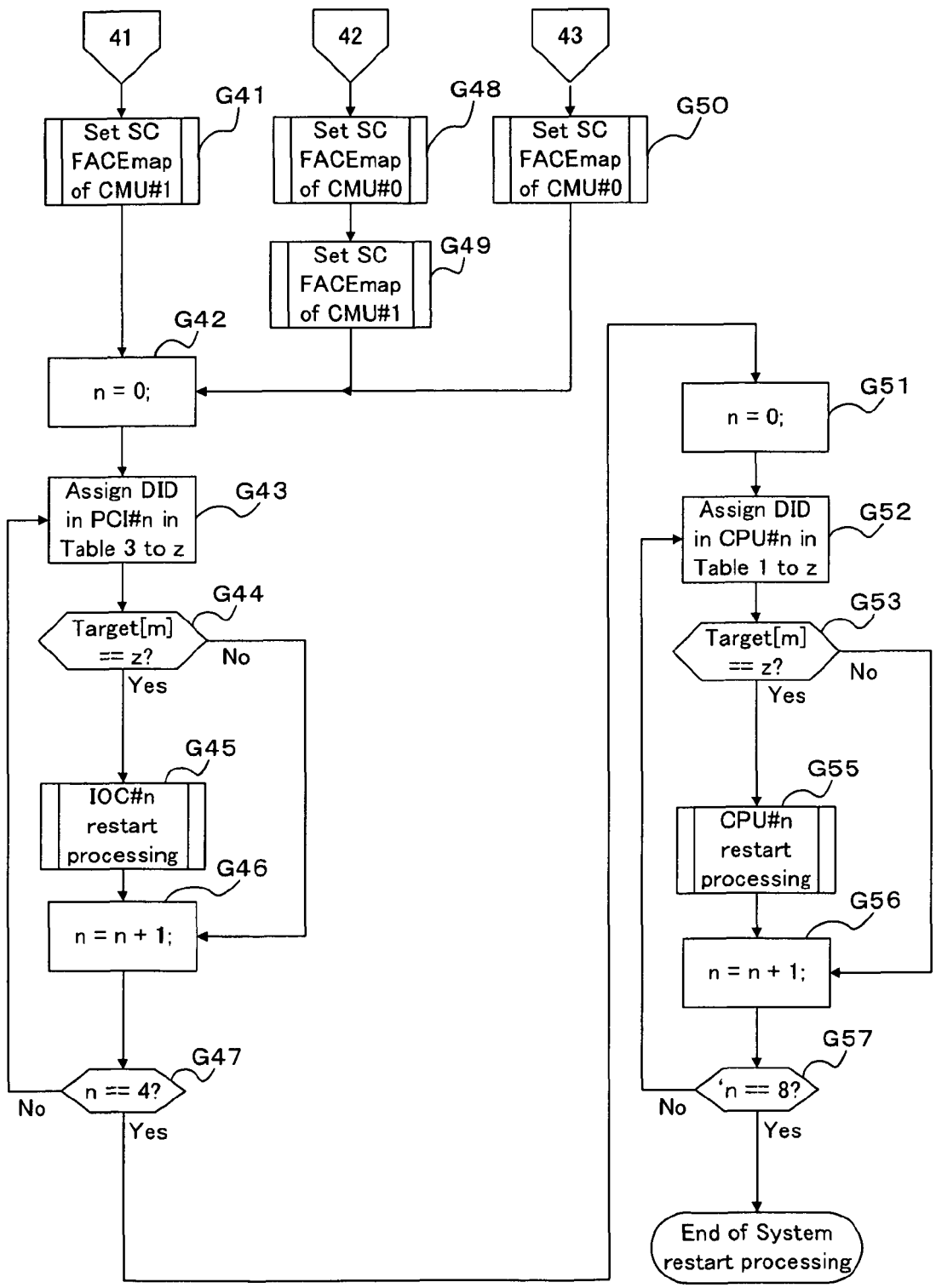
FIG. 49 is a flowchart illustrating the system restart processing technique in the server as one example of an embodiment.
Figure 50:
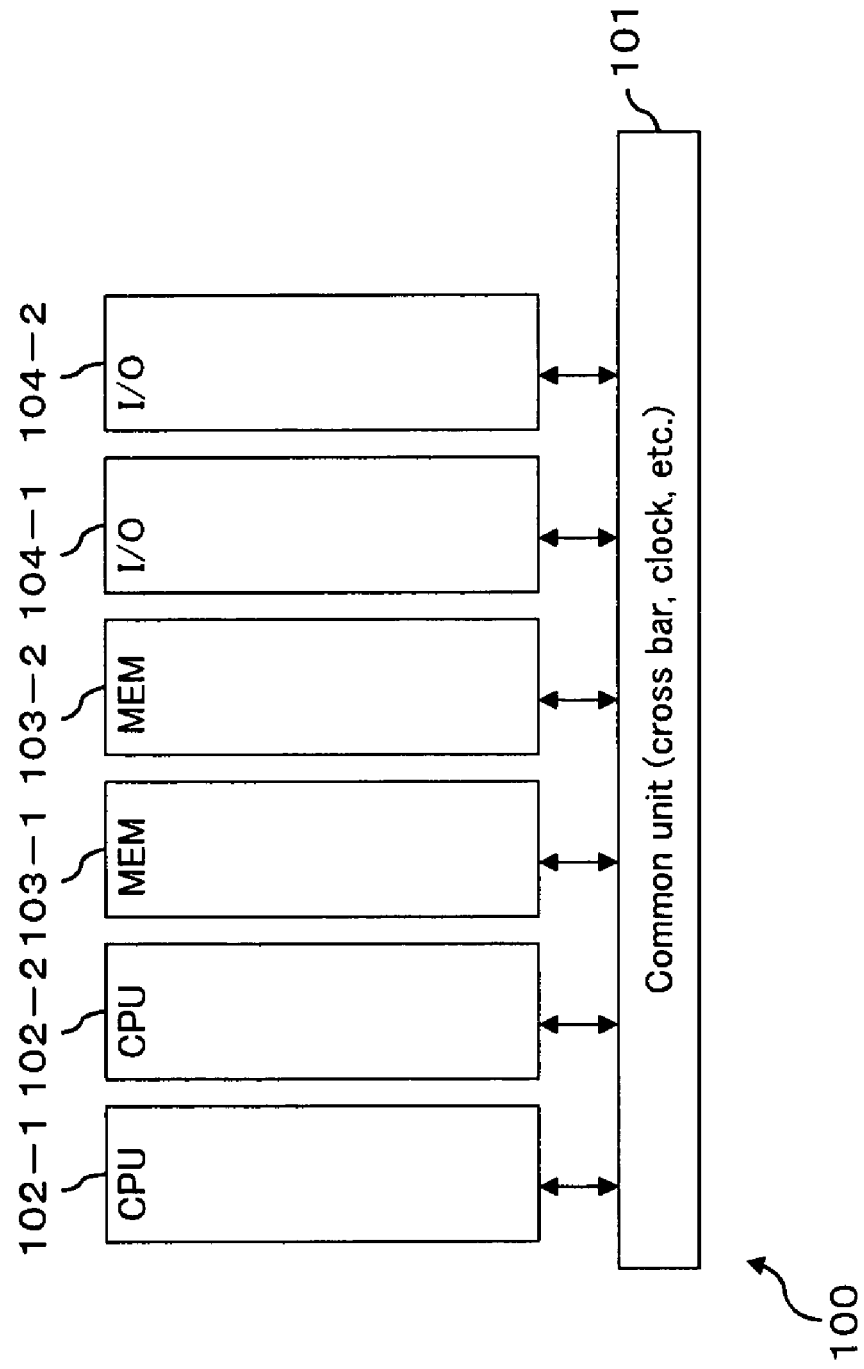
FIG. 50 is a diagram illustrating an exemplary configuration of a multi-domain system in a server system.
Figure 51:
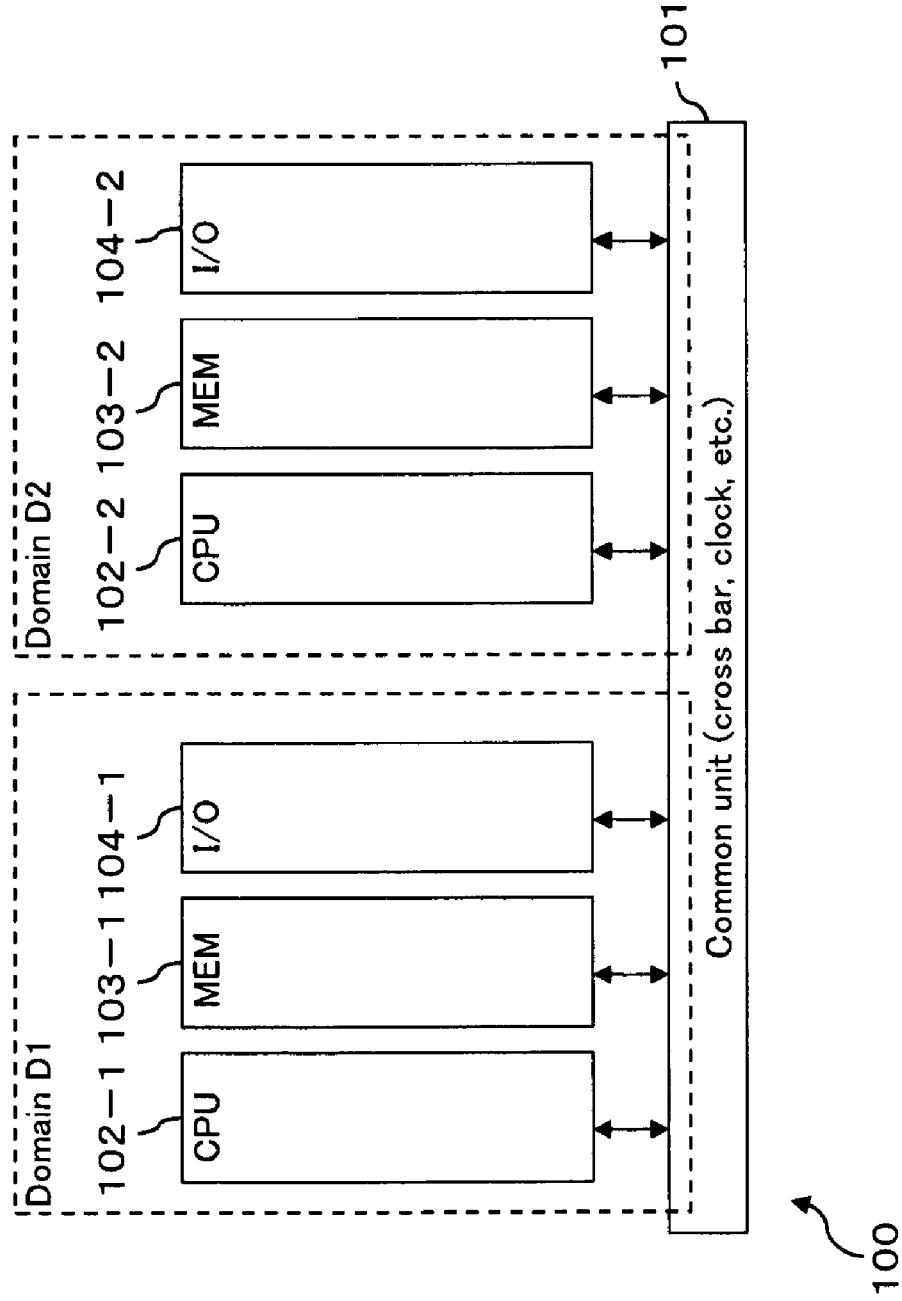
FIG. 51 is a diagram illustrating an exemplary configuration of a multi-domain system in a server system.
Figure 52:
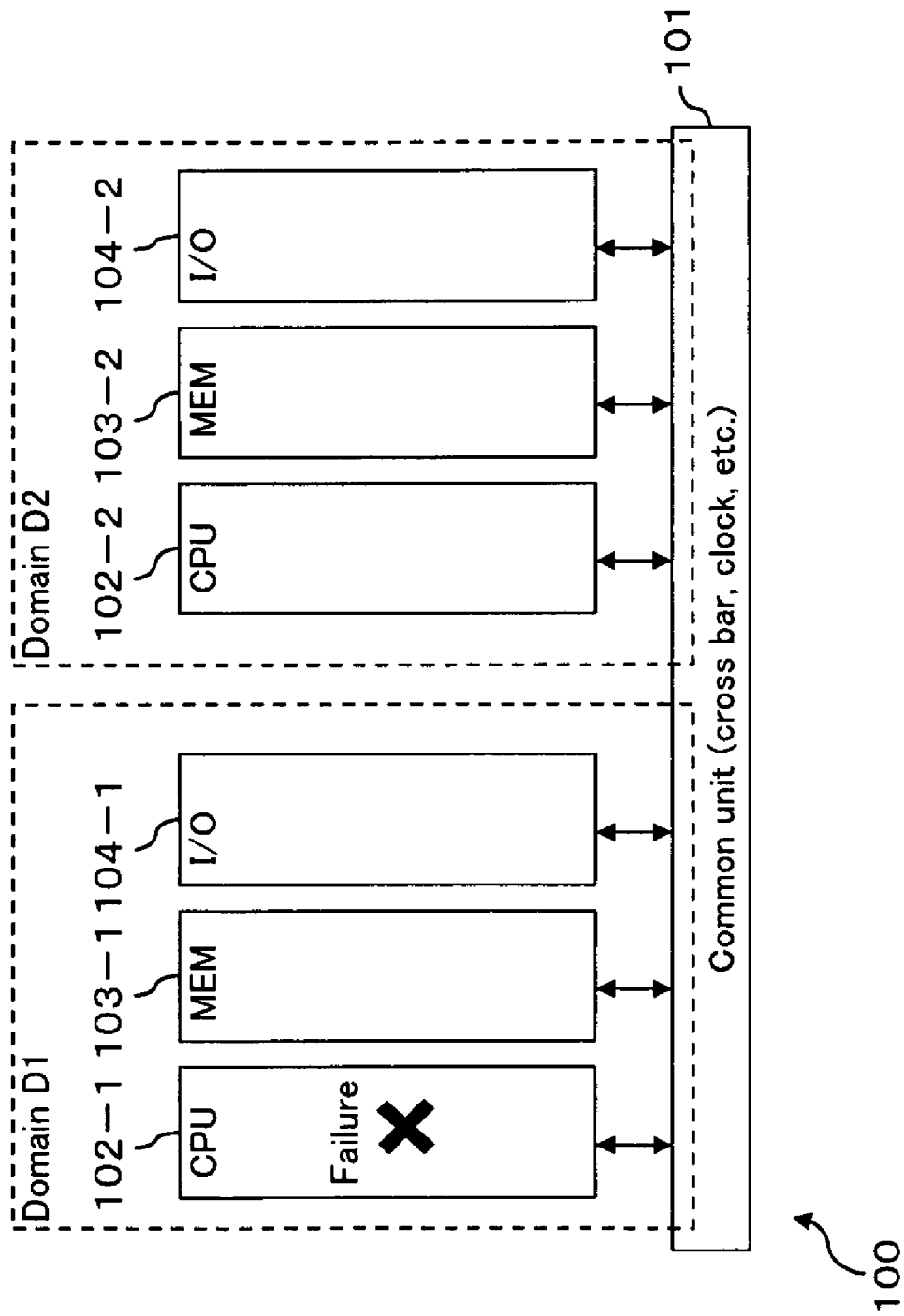
FIG. 52 is a diagram illustrating an example when a fault occurs in a portion other than a common unit in a multi-domain system.
Figure 53:
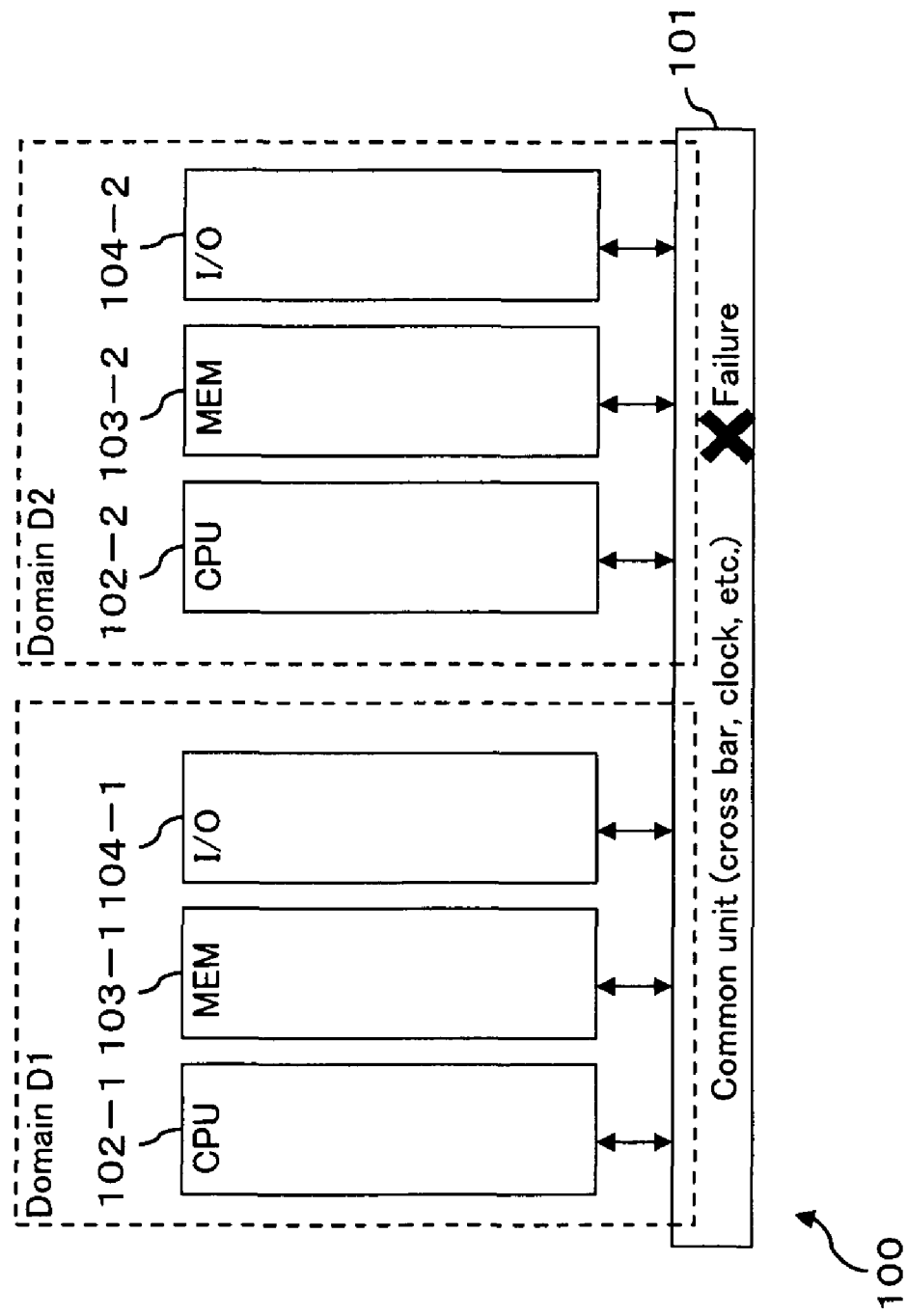
FIG. 53 is a diagram illustrating an example when a fault occurs in the common unit in a multi-domain system.

Next, the system restart extent technique in Step C40 in the flowchart depicted in FIG. 22 will be described with reference to flowcharts depicted in FIGS. 47-49 (Steps G1-G57).

The system restart processing is carried out on the basis of the setting of the Target[ ] variable (Step G1), and, for example, when Target[0]==99 holds true (see the "yes" route from Step G1), all of the CPU 11s, IOCs, XBs, or the like are suspended (Step G10-G12). Based on the value of the variable Degrade that has been obtained during the isolation site determination process; after a part of the XBs are degenerated (Steps G13-G17, and G20-G22), restart processing is carried out on the CPU 11 and IOCs (Steps G18 and G19).

Figure 46:
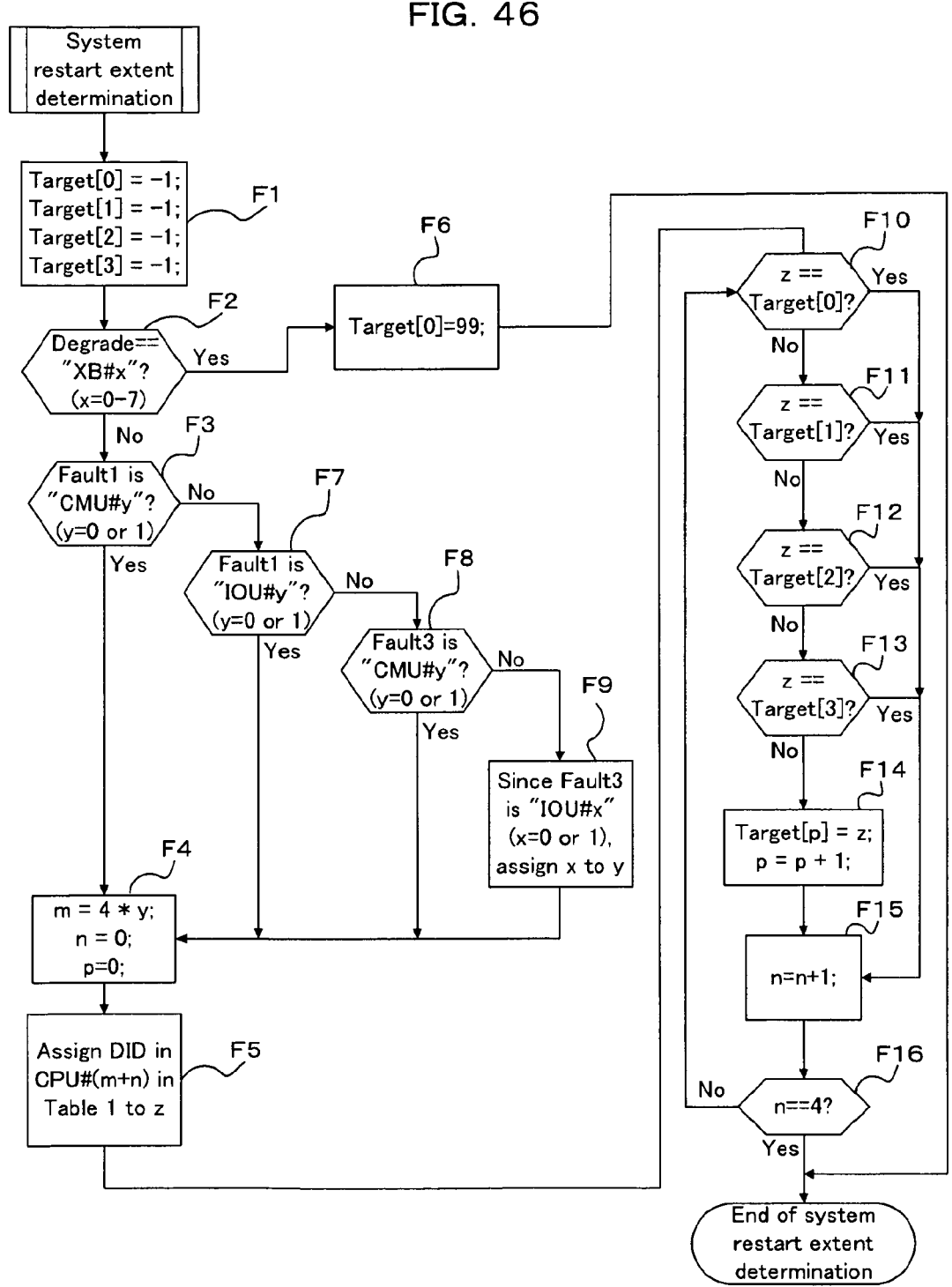
FIG. 46 is a flowchart illustrating the system restart extent determination processing technique in the server as one example of an embodiment.

Otherwise, when Target[0]==99 is evaluated as false (see the "no" route from Step G1), the CPUs and the IOCs are all isolated and then are restarted (Steps G2-G9, and G23-G57) for the system restart extend that is determined in the flowchart depicted in FIG. 46.

Furthermore, for isolating the units here, the setting in the Tables T1-T3 are updated on the basis of the Degrade variable (Steps G29-G38). Note that suspend and startup processing for the respective CPUs, IOCs, and XBs are similar to suspend and startup processing for those used in general mainframe computers, and thus detailed description thereof will be omitted.

As described above, according to the server 10 as one example of an embodiment, when an abnormality of the common unit 14a is detected by the system control means 211, suspend processing on the server 10 is carried out if the abnormality is detected in a domain D the significance flag of which in the Table T4 is set to flag "Y (priority indication)." In addition, degeneration processing is carried out for suspending the operation of the common unit 14a while switching to the common unit 14b. Thus, the server 10 can be recovered quickly, and any processing that has been executed on the domain D having the significance flag of the flag "Y" in the in the Table T4 can be restarted rapidly.

When an abnormality is detected in a domain D other than the domain D having the significance flag set to the flag "Y" in the Table T4, degeneration processing is carried out on the domain D in which the abnormality was detected. Thereby, any processing that has been executed on that domain D can be continued without suspending the domain D having the "Y" flag.

Furthermore, each of the CPU 11 and the common unit 14a included in a domain D includes an interrupt notifying means, and the system control means 211 detects an abnormality in the domain D and the common unit 14a on the basis of the interrupt notification from the interrupt notifying means. This enables quick detection of any abnormalities in the domains D and the common unit 14a.

Each of the CPU 11 and the common unit 14a included in a domain D includes the scan chain means for reading internal information on the CPU 11 and the common unit 14a, and the system control means 211 controls the scan chain means to detect an abnormality in the domain D and the common unit 14a. This enables quick detection of any abnormalities in the domains D and the common unit 14a.

The present invention is not limited to the embodiments described above, and various modifications may be made without departing from the spirit of the present invention.

Although the embodiments described above have been described in the context where the common units 14a and 14b are cross bars, this not limiting, for example, and the present invention may be applied to faults of other elements provided in a computer, such as clocks.

In addition, although the CPU 11 and/or the common unit 14 detect an abnormality of the domain D and the common unit 14 using the scan chain function in the above-described embodiments, this not limiting and various techniques may be used to detect an abnormality (fault) in the domain D and the common unit 14.

Note that those ordinary skilled in the art can practice and manufacture the present invention from the disclosure of the present invention.

The present invention includes at least one of the following advantages:

(1) When an abnormality is detected in the first system common unit, suspend processing on the information processing apparatus is carried out if the abnormality is detected in a partitioned portion to which a priority indication is set. In addition, degeneration processing is carried out for suspending the operation of the first system common unit while switching to the second system common unit. The information processing apparatus can be recovered quickly, and any processing that has been executed on the partitioned portion to which the priority indication is set can be restarted rapidly.

(2) When an abnormality is detected in a partitioned portion other than the partitioned portion to which the priority indication is set, degeneration processing is carried out on the partitioned portion in which the abnormality is detected. Thereby, any processing that has been executed on the partitioned portion to which the priority indication is set can be continued without suspending the partitioned portion to which the priority indication is set.

(3) Each of the processing unit and the first or second system common unit included in said partitioned portions includes an interrupt notifying means that detects an abnormality and issues an interrupt, and the system control means detects an abnormality in the partitioned portions and the system common units by the interrupt from the interrupt notifying means in the processing units and the system common units. This enables quick detection of any abnormalities in the partitioned portions and the system common units.

(4) Each of the processing unit and the system common unit included in said partitioned portions further comprises a scan chain means that reads internal information of the processing units and the system common units, and the system control means detects an abnormality in the partitioned portions or the system common units by controlling the scan chain means. This enables quick detection of any abnormalities in the partitioned portions and the system common units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A degeneration method for an information processing apparatus comprising a plurality of partitioned portions each having a processing unit assigned thereto, a first system common unit shared by the multiple partitioned portions, a second system common unit shared by the partitioned portions, a storage portion, and a system control portion for controlling a system, the method comprising:
   detecting an abnormality in the first system common unit by the system control portion;
   reading a priority indication, from the storage portion, indicating whether or not the first system common unit is to be degenerated when an abnormality occurs in the first system common unit for each of the partitioned portions;
   carrying out, when an abnormality is detected in a partitioned portion to which the priority indication is set, suspend processing on the information processing apparatus by the system control portion; and
   carrying out degeneration processing for suspending operation of the first system common unit and switching to the second system common unit.

2. The degeneration method according to claim 1, further comprising carrying out, when abnormality is detected in a partitioned portion other than the partitioned portion to which the priority indication is set, degeneration processing by the system control portion on the partitioned portion in which the abnormality is detected.

3. The degeneration method according to claim 1, further comprising carrying out restart processing on the information processing apparatus after the carrying out the degeneration processing.

4. The degeneration method according to claim 3, wherein the carrying out restart processing comprises executing reconfiguration processing for allocating the processing unit to any of the partitioned portions.

5. A degeneration method for an information processing apparatus comprising a plurality of partitioned portions each having a processing unit assigned thereto, a first system common unit shared by the plurality of partitioned portions, a second system common unit shared by the partitioned portions, a storage portion, and a system control portion for controlling a system, the method comprising:
   detecting an abnormality in the first system common unit by the system control portion;
   detecting an abnormality in the partitioned portion common unit by the system control portion;
   searching for an priority indication, by the system control portion, indicating whether or not the system common unit is to be degenerated when an abnormality occurs in the first system common unit from the storage portion using identification indication of the partitioned portion in which the abnormality is detected;
   carrying out suspend processing on the information processing apparatus when the priority indication that is found by the system control portion is set for a partitioned portion corresponding to the identification indication; and
   carrying out degeneration processing for suspending operation of the first system common unit and switching to the second system common unit.

6. The degeneration method according to claim 5, further comprising carrying out, when abnormality is detected in a partitioned portion other than the partitioned portion to which the priority indication is set, degeneration processing by the system control portion on the partitioned portion in which the abnormality is detected.

7. The degeneration method according to claim 5, further comprising carrying out restart processing on the information processing apparatus after the carrying out the degeneration processing.

8. The degeneration method according to claim 7, wherein the carrying out restart processing comprises executing reconfiguration processing for allocating the processing unit to any of the partitioned portions.

9. An information processing apparatus comprising:
   a plurality of partitioned portions including processing units;

a first system common unit that is shared by the plurality of partitioned portions and executes normal operation;

a second system common unit that is shared by the plurality of partitioned portions and is stood by for degeneration;

a system control portion comprising:
- a system control means that detects an abnormality in the plurality of partitioned portions and the first system common unit;
- a storage means that stores identification indications provided to each of the plurality of partitioned portions, and priority indications corresponding to each of the identification indications and indicating whether or not the first system common unit is to be degenerated when an abnormality occurs in the first system common unit for each identification indication;
- a partition degeneration control means that controls degeneration for suspending the partitioned portion in which the abnormality is detected and switching to other normal partitioned portion; and
- a system control portion that carries out degeneration processing for suspending operation of the first system common unit and switching to the second system common unit.

10. The information processing apparatus according to claim 9, wherein
- each of the processing units included in the partitioned portions and the first and second system common units further comprises an interrupt notifying means that detects an abnormality and issues an interrupt, and
- the system control means detects an abnormality in the partitioned portions and the system common units by the interrupt from the interrupt notifying means in the processing units and the system common units.

11. The information processing apparatus according to claim 9, wherein
- each of processing units included in the partitioned portions and the system common units further comprises a scan chain means that reads internal information of the processing units and the system common units, and
- the system control means detects an abnormality in the partitioned portions or the system common units by controlling the scan chain means.

12. The degeneration method according to claim 10, further comprising a reconfiguration processing means that allocates the processing unit to any of the partitioned portions.

* * * * *